US012481053B2

(12) United States Patent
Steinberg et al.

(10) Patent No.: US 12,481,053 B2
(45) Date of Patent: Nov. 25, 2025

(54) NAVIGATION AND POSITIONING SYSTEM IN GPS-DENIED ENVIRONMENTS USING QUANTUM-INSPIRED AND ADAPTIVE SENSOR FRAMEWORKS

(71) Applicants: Gregory M. Steinberg, Austin, TX (US); Samuel H. Steinberg, Port Orange, FL (US)

(72) Inventors: Gregory M. Steinberg, Austin, TX (US); Samuel H. Steinberg, Port Orange, FL (US)

( * ) Notice: Subject to any disclaimer, the term of this patent is extended or adjusted under 35 U.S.C. 154(b) by 0 days.

(21) Appl. No.: 19/213,992

(22) Filed: May 20, 2025

(65) Prior Publication Data
US 2025/0283995 A1 Sep. 11, 2025

Related U.S. Application Data

(63) Continuation of application No. 18/951,541, filed on Nov. 18, 2024, now Pat. No. 12,306,291, which is a
(Continued)

(51) Int. Cl.
G01S 13/88 (2006.01)
H04B 1/713 (2011.01)
H04L 9/06 (2006.01)

(52) U.S. Cl.
CPC .............. G01S 13/88 (2013.01); H04B 1/713 (2013.01); H04L 9/0631 (2013.01)

(58) Field of Classification Search
CPC ..... H04W 4/029; H04W 4/025; H04W 4/023; H04W 64/00; G01S 13/222; G01S 13/24;
(Continued)

(56) References Cited

U.S. PATENT DOCUMENTS 5,748,669 A * 5/1998 Yada ................ H04L 1/02
375/135
7,068,715 B2 * 6/2006 Hoctor ................ H04B 1/7183
375/E1.001
(Continued)

FOREIGN PATENT DOCUMENTS

KR 101748136 B1 6/2017
WO 2019156625 A1 8/2019
WO 2020259202 A1 12/2020

OTHER PUBLICATIONS

Beuchelt, Gerald; Leveraging MFA to Reduce the Risks of a Remote Workforce and What is Multi-Factor Authentication; https://www.cio.com/article/191112/leveraging-mfa-to-reduce-the-risks-of-a-remote-workforce.html; Dec. 15, 2020.
(Continued)

Primary Examiner — Peter M Bythrow
(74) Attorney, Agent, or Firm — HULSEY P.C.

(57) ABSTRACT

A navigation system and method are disclosed for operation in GPS-denied environments using quantum-inspired sensor fusion, dynamic virtual anchor points (VAPs), and predictive environmental modeling. The system represents multiple position hypothesis using wavefunction-like expansions and integrates VAP-based triangulation for drift correction. A predictive modeling module ingests solar, geomagnetic, and environmental data to proactively adjust sensor weighting. A cybersecurity module employs quantum-algebraic key generation and location-derived ephemeral keys to secure inter-device communication. The system includes an augmented reality (AR) interface to visualize and edit anchor references, and a neurofeedback module that adapts the AR interface based on real-time physiological signals from the user. The method further enables anchor optimization via AI-driven repositioning and supports low-power edge execution using approximate amplitude filtering. Additional
(Continued)

modules may include fractal antennas, neuromorphic processors, and adaptive forecasting layers to maintain positional accuracy and user experience in subterranean, multi-floor, or magnetically complex environments.

20 Claims, 36 Drawing Sheets

Related U.S. Application Data continuation-in-part of application No. 18/595,198, filed on Mar. 4, 2024, now abandoned, which is a continuation-in-part of application No. 18/223,409, filed on Jul. 18, 2023, now abandoned.

(60) Provisional application No. 63/390,272, filed on Jul. 18, 2022.

(58) Field of Classification Search
CPC ...... G01S 5/011; G01S 5/0263; G01S 5/0273; G01S 13/88; H04B 1/713; H04L 9/0631
See application file for complete search history.

(56) References Cited

U.S. PATENT DOCUMENTS

| | | | |
|---|---|---|---|
| 7,082,153 B2 * | 7/2006 | Balachandran | H04B 1/7176 375/138 |
| 7,496,128 B2 * | 2/2009 | Giannakis | H04B 1/719 375/138 |
| 8,220,034 B2 | 7/2012 | Hahn et al. | |
| 9,680,812 B1 | 6/2017 | Emaminouri et al. | |
| 10,387,632 B2 | 8/2019 | Wallace et al. | |
| 10,637,871 B2 | 4/2020 | Balakrishnan et al. | |
| 10,812,460 B2 | 10/2020 | Kurian et al. | |
| 10,873,830 B2 * | 12/2020 | Markhovsky | G01S 5/10 |
| 11,057,374 B1 | 7/2021 | Smith et al. | |
| 11,134,079 B2 * | 9/2021 | Rakshit | G06V 40/10 |
| 11,140,155 B2 | 10/2021 | Alhawaj et al. | |
| 11,218,460 B2 | 1/2022 | Linecker et al. | |
| 11,310,230 B2 | 4/2022 | Wallace et al. | |
| 2002/0041622 A1 * | 4/2002 | Steed | H04B 1/713 375/132 |
| 2003/0161411 A1 * | 8/2003 | McCorkle | H04B 1/69 375/295 |
| 2004/0071118 A1 * | 4/2004 | Dabak | H04B 1/71637 370/335 |
| 2004/0156421 A1 * | 8/2004 | Yamaguchi | H04B 1/719 375/130 |
| 2004/0225880 A1 | 11/2004 | Mizrah | |
| 2005/0192727 A1 * | 9/2005 | Shostak | G07C 5/0808 701/1 |
| 2009/0003490 A1 * | 1/2009 | Nadler | H04W 64/00 375/316 |
| 2011/0111751 A1 * | 5/2011 | Markhovsky | G01S 13/878 455/423 |
| 2011/0296513 A1 | 12/2011 | Kasad | |
| 2012/0011365 A1 * | 1/2012 | Schmidt | H04W 24/02 713/168 |
| 2014/0273918 A1 * | 9/2014 | Gilbert | G01S 5/0018 455/404.2 |
| 2015/0040193 A1 | 2/2015 | Clemons | |
| 2015/0260835 A1 * | 9/2015 | Widmer | B60L 53/124 342/27 |
| 2017/0248678 A1 * | 8/2017 | Markhovsky | G01S 13/74 |
| 2020/0028689 A1 | 1/2020 | Vadassery et al. | |
| 2021/0397683 A1 | 12/2021 | Liem et al. | |
| 2023/0341510 A1 * | 10/2023 | Zou | G01S 13/288 |

OTHER PUBLICATIONS

Cisco; What is Multi-Factor Authentication (MFA)?; https://www.cisco.com/c/en/us/products/security/what-is-multi-factor-authentication.html#~methods.

cybertraining365.com; Authentication; https://www.cybertraining365.com/cybertraining/Topics/Authentication.

* cited by examiner

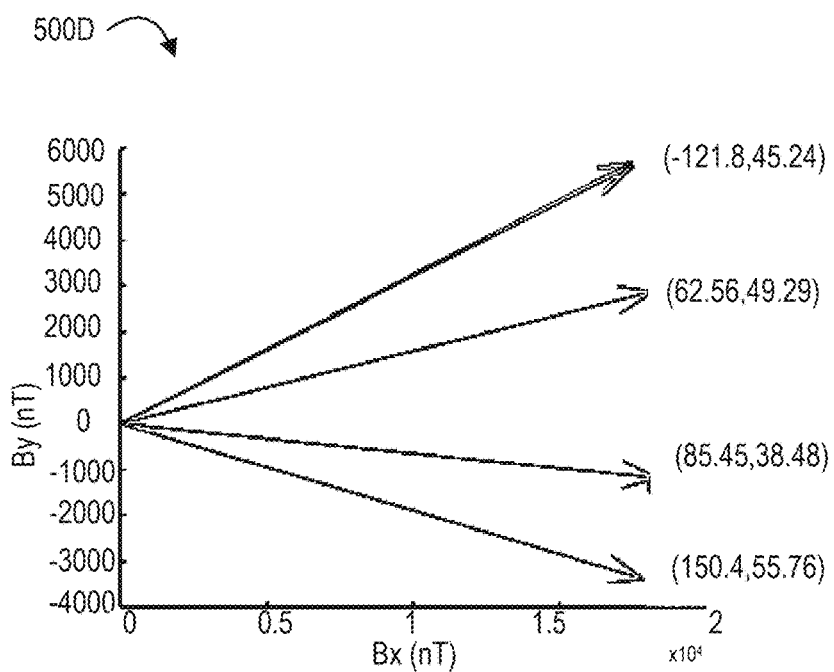
FIG. 5D
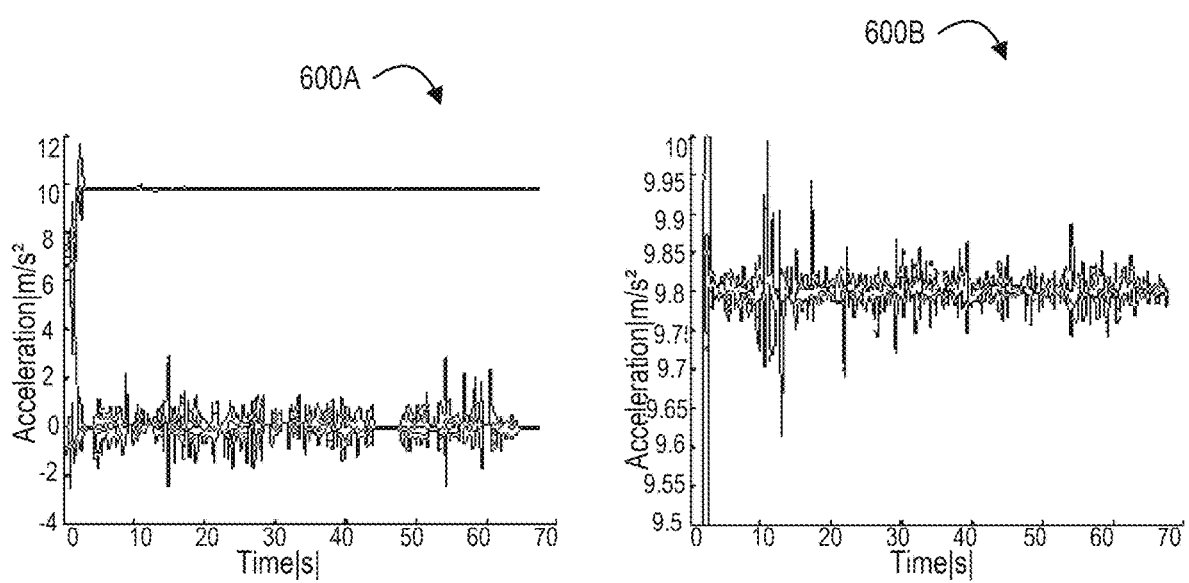
FIG. 6A
FIG. 6B

NAVIGATION AND POSITIONING SYSTEM IN GPS-DENIED ENVIRONMENTS USING QUANTUM-INSPIRED AND ADAPTIVE SENSOR FRAMEWORKS

RELATED APPLICATION

This present application is a continuation-in-part of U.S. patent application Ser. No. 18/951,541, filed Nov. 18, 2024, titled "SYSTEM AND METHOD FOR PROVIDING LOCATION-BASED POSITIONING AND NAVIGATION IN GPS-DENIED ENVIRONMENTS"; which is a continuation-in-part of U.S. patent application Ser. No. 18/595,198, filed Mar. 4, 2024, titled "ADVANCED LOCATION INTELLIGENCE SYSTEM FOR LOCATION AUTHENTICATION USING NON-SATELLITE NAVIGATION AND TIMING"; which is a continuation-in-part of U.S. patent application Ser. No. 18/223,409, filed Jul. 18, 2023, titled "THREE-FACTOR AUTHENTICATION"; which claims the benefit of U.S. Provisional Application. No. 63/390,272 titled "THREE-FACTOR AUTHENTICATION," filed on Jul. 18, 2022.

FIELD OF THE PRESENT DISCLOSURE

Embodiments of the present disclosure generally relate to the field of providing positioning information. Embodiments of the present disclosure relate to a system and method for providing location-based positioning and navigation in GPS-denied environments.

BACKGROUND OF THE DISCLOSURE

In the early days of computing, user location was not a factor in system operations. As computing systems and networks became more complex, so did the need for more context-aware solutions. One of the earliest location-sensitive applications was based on Access Control Lists (ACLs) used to control access to specific files or resources. By the 1970s, the development of centralized directory services such as X.500 began to incorporate location metadata as part of user and device records. In the 2000s, location-based services (LBS) emerged, allowing mobile devices to access information and services based on their GPS location. This quickly extended to operational control systems that dynamically adapted behavior based on the user's or device's physical location. The evolution of mobile computing, IoT devices, and cloud systems further increased demand for reliable location data, but also introduced new complexity in ensuring continuous and precise positioning across various environments.

As location-aware systems became critical to both civilian and enterprise operations, ensuring continuous and context-relevant positioning became a central requirement. Traditional GPS has limitations in areas such as underground facilities, urban canyons, or indoor infrastructure, leading to the use of supplementary technologies including inertial sensors, magnetometers, barometers, and environmental sensing for location estimation. These sensors are often fused using probabilistic models to estimate position in the absence of satellite data.

Location inference based on environmental sensing started as early as the 2000s with mobile-based GPS and accelerometer data. Over time, various technologies such as Wi-Fi, Bluetooth beacons, and magnetic mapping became common alternatives or supplements to GPS. Modern systems attempt to combine multiple such sources to maintain tracking continuity. However, each technology has tradeoffs in accuracy, range, power consumption, and dependency on infrastructure.

A U.S. Pat. No. 11,310,230 B2 discloses a mobile-based positioning process where contextual cues such as location and time are used to enhance inference accuracy. The system uses captured image or video data to associate a specific timestamp or location with a device's context. While this aids location correlation, it remains dependent on reliable signal capture and GPS anchoring.

Some other references including US patent application US 2020/0028689 A1, a Korean patent KR 101748136B1, and US patent U.S. Pat. No. 11,134,079 B2 disclose systems where user location is derived using mobile-captured images in combination with GPS or timestamped environmental data. These solutions attempt to infer position by matching environmental patterns with prior data.

Another US patent application US 2020/0028689 A1 teaches a system for location validation using image capture and time correlation. It verifies that a device is present at a known location within a predefined time range. In the U.S. Ser. No. 11/134,079 B2, a computing device infers a user's location and posture using digital images and matches this with prior field-of-view and spatial metadata to validate operational context.

Additional references such as WO 2020259202 A1, U.S. Ser. No. 11/140,155 B2, WO 2019156625 A1, and U.S. Pat. No. 9,680,812 B1 disclose systems for multi-factor validation using spatial and contextual parameters. While these systems may employ GPS or sensor-based data for location determination, they often rely on static models and lack adaptability to real-time environmental changes.

Some references discuss the comparison of sensor-derived location data against a known database of spatial conditions for context inference or decision-making. These systems may use time-of-day, wireless access point proximity, or IP-based triangulation, but they often degrade in low-signal environments. Literature such as "Leveraging MFA to Reduce the Risks of a Remote Workforce and What Is Multi-Factor Authentication?" also explores the use of contextual data such as device IP or coarse location, although not designed for high-precision positioning in GPS-denied zones.

Although many existing systems claim to improve reliability through multiple signal sources or contextual overlays, real-world environments frequently cause interference or misalignment across these inputs. In particular, reliance on cloud-based models or networked ML-based inference introduces latency and vulnerability in mission-critical scenarios. As technology continues to advance, new challenges have emerged, especially in environments where GPS signals are unavailable or unreliable. GPS-denied environments-such as tunnels, indoor industrial spaces, basements, or heavily urbanized regions-create significant obstacles for location-aware systems that depend on satellite data for positioning. Without consistent GPS signals, many systems lose the ability to track or correlate position accurately, reducing overall operational reliability.

Another problem arises from the inability of current systems to dynamically transition between different location-tracking technologies in real time. When switching between GPS and non-GPS methods such as UWB, VLF, magnetometers, or Wi-Fi triangulation, systems often produce inconsistent location estimates due to mismatch in signal formats or sensor noise. Moreover, few systems can manage power consumption effectively when multiple sensor modalities are simultaneously active, leading to rapid battery drain and system failure in extended field operations. Environmental complexity further exacerbates the problem. Signal reflections, magnetic interference, variable barometric pressure, and structural obstacles introduce nonlinearities into the location estimation process. Traditional filtering methods struggle to adapt to such conditions, resulting in increased positional drift or ambiguity in real-time applications.

Accordingly, there remains a pressing need to develop robust navigation and positioning systems that can operate reliably in GPS-denied environments across diverse operational settings and signal conditions.

The information disclosed in this background of the disclosure section is only for enhancement of understanding of the general background of the disclosure and should not be taken as an acknowledgment or any form of suggestion that this information forms existing information already known to a person skilled in the art.

BRIEF SUMMARY OF THE DISCLOSURE

The disclosed subject matter provides a system and method for navigation and positioning in GPS-denied environments, such as underground facilities, indoor structures, or signal-obstructed urban zones. The system is centered around a quantum-inspired sensor fusion framework capable of maintaining multiple positional hypothesis using wavefunction-like expansions and amplitude-based filtering. It integrates data from various environmental and inertial sensors to evaluate motion trajectories in parallel, allowing real-time position estimation even when conventional satellite signals are unavailable or unreliable.

The system includes a virtual anchor point (VAP) module configured to define, manage, and dynamically update software-based anchor references derived from environmental features, such as magnetic anomalies or sensor field patterns. These anchor references support drift correction and improve localization accuracy by adapting to environmental conditions. Enhancements such as persistent topological feature extraction, manifold-based embedding, and multi-resolution homology contribute to robust anchor point management in complex spatial domains.

The predictive modeling module receives solar, geomagnetic, and environmental data to dynamically adjust sensor weighting and fallback positioning strategies. By analyzing forecasted disturbances such as solar flares or geomagnetic anomalies, the system proactively transitions between magnetometer, inertial, or anchor-based references to ensure resilient performance. A hierarchy of magnetic-anomaly reference maps is maintained at multiple spatial resolutions, allowing convergence optimization based on environmental complexity.

The system also includes a cybersecurity module that employs quantum-algebraic key generation and ephemeral key exchange mechanisms derived from local magnetic anomalies, dynamic sensor variance, and calibration metadata. These keys are used to secure inter-device communications and protect sensor fusion operations from spoofing or data injection attacks. Secure consensus mechanisms allow multiple agents to share partial amplitude data or high-likelihood positioning hypothesis and arrive at a distributed agreement on relative or absolute positioning, even in infrastructure-less environments.

A user interface module is integrated into the system, comprising an augmented reality (AR) overlay engine that visualizes and allows editing of virtual anchor points. The AR interface is dynamically adapted based on estimated operator cognitive load, which is inferred using physiological signals such as EEG, eye-tracking, or heart rate variability. The system adjusts the density, complexity, or saliency of the visual overlay to maintain optimal usability in cognitively demanding environments.

The system optionally includes a fractal antenna submodule combining Sierpiński and Koch geometries for multi-band resonance. This antenna functions as both a communications interface and a sensor substrate, supporting secure multi-agent coordination during edge-based operation. Its impedance is adaptively tuned using cognitive AI models that monitor reflection coefficients and voltage standing wave ratios (VSWR) to maintain robust signaling in difficult environments.

A method corresponding to the above-described system is also provided. The method comprises representing multiple positional hypothesis using amplitude-based filtering, dynamically updating VAPs based on environmental cues, adjusting sensor behavior using predictive environmental models, and securing data transmission using location-derived ephemeral keys. The method further includes implementing AR overlays and adapting their complexity based on real-time neurofeedback signals from the user.

Additionally, a method for optimizing virtual anchor points is provided. This method comprises collecting data from inertial and auxiliary sensors, projecting sensor and geospatial states into a quantum-inspired space, and applying artificial intelligence algorithms, including reinforcement learning, genetic evolution, and swarm intelligence, to reposition or reweight anchor references. The anchor optimization process is further enhanced through multi-resolution topological features, and the fusion architecture is designed to execute partially on edge devices using approximate wavefunction models or selective amplitude pruning to preserve real-time performance within power-constrained environments.

The features and advantages of the subject matter hereof will become more apparent in light of the following detailed description of selected embodiments, as illustrated in the accompanying FIGURES. As one of ordinary skill in the art will recognize, the subject matter disclosed herein is capable of modifications in various respects, all without departing from the scope of the invention. Accordingly, the drawings and the description are to be regarded as illustrative.

BRIEF DESCRIPTION OF THE DRAWINGS

The present subject matter will now be described in detail with reference to the drawings, which are provided as illustrative examples of the subject matter to enable those skilled in the art to practice the subject matter. It will be noted that throughout the appended drawings, features are identified by like reference numerals. Notably, the FIGURES and examples are not meant to limit the scope of the present subject matter to a single embodiment, but other embodiments are possible by way of interchange of some or all of the described or illustrated elements and, further, wherein:

FIG. 5D illustrates a graph showing rotation of the user device and yaw angle from the device's gyro, in accordance with an embodiment of the present disclosure;

FIG. 6A illustrates a graph showing running average of accelerometer being steady around gravitational acceleration, in accordance with an embodiment of the present disclosure;

FIG. 6B illustrates the graph zoomed on Az, in accordance with an embodiment of the present disclosure;

DETAILED DESCRIPTION OF THE EMBODIMENTS

Figure 1:
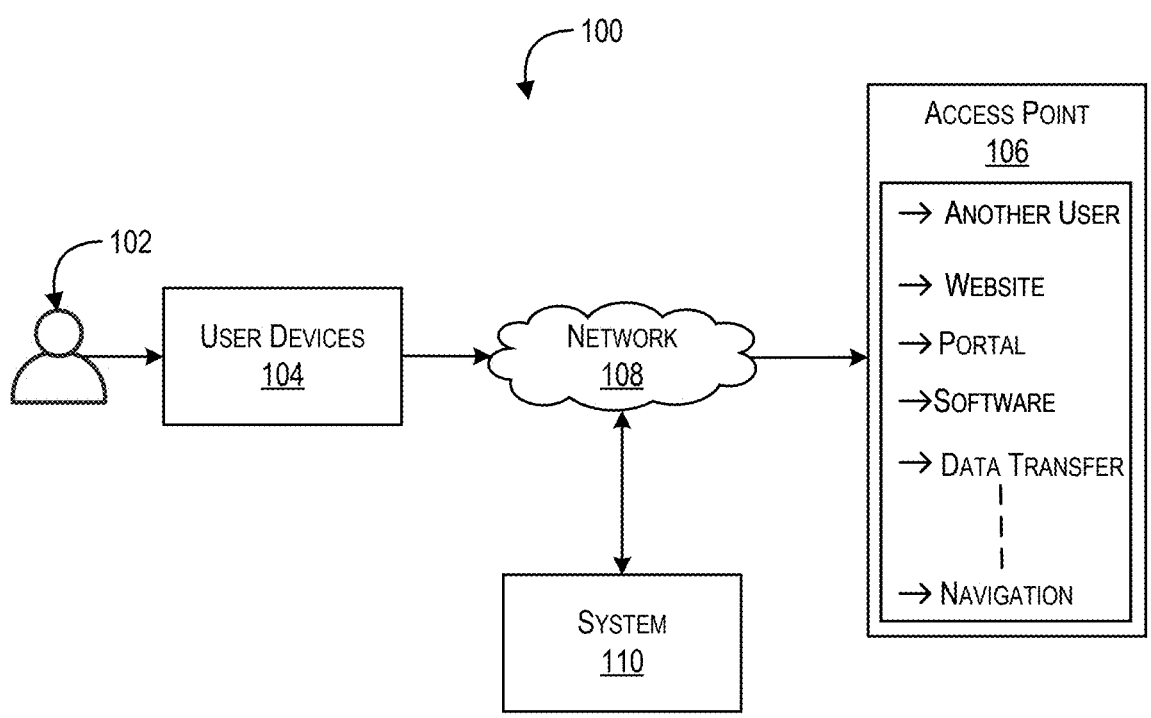
FIG. 1 illustrates an exemplary environment of a system for location-based security verification of users, in accordance with an embodiment of the present disclosure.

The detailed description set forth below in connection with the appended drawings is intended as a description of exemplary embodiments in which the presently disclosed disclosure can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed disclosure. However, it will be apparent to those skilled in the art that the presently disclosed disclosure may be practiced without these specific details. In some instances, well-known structures and devices are shown in block diagram form in order to avoid obscuring the concepts of the presently disclosed disclosure.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and/or firmware.

Embodiments of the present disclosure may be provided as a computer program product, which may include a non-transitory, machine-readable storage medium tangibly embodying thereon instructions, which may be used to program the computer (or other electronic devices) to perform a process. The machine-readable medium may include, but is not limited to, fixed (hard) drives, semiconductor memories, such as Read Only Memories (ROMs), Programmable Read-Only Memories (PROMs), Random Access Memories (RAMs), Erasable PROMs (EPROMs), Electrically Erasable PROMs (EEPROMs), flash memory or other types of media/machine-readable medium suitable for storing electronic instructions (e.g., computer programming code, such as software or firmware).

Various methods described herein may be practiced by combining one or more non-transitory, machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection. Based on the disclosure provided herein, one of ordinary skill in the art will appreciate a variety of ways in which connection or coupling exists in accordance with the definition.

Further, the term "module" may be software or hardware particularly programmed to receive an input, perform one or more processes using the input, and provide an output. The input, output, and processes performed by various modules will be apparent to one skilled in the art based on the present disclosure.

If the specification states a component or feature "may," "can," "could," or "might" be included or have a characteristic, that particular component or feature is not required to be included or have the characteristic.

As used in the description herein and throughout the claims that follow, the meaning of "a," "an," and "the"

includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

It will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular name.

Embodiments of the present disclosure relate to a system and method for processing a payment using an aggregated transaction account. The aggregated transaction account is created by linking all transaction accounts of the user with the aggregated transaction account. Further, the aggregated transaction account is funded using pre-determined funds in the transaction accounts based on transaction rules set for each of the plurality of transaction accounts. When a payment request is received from the merchant via a merchant payment processor (also referred to as merchant device), the payment is processed using the credit balance available in the aggregated transaction account, without the need for the user to select any linked transaction account or without tracking the credit limit or balance of any of the transaction accounts.

In the present specification, an embodiment showing a singular component should not be considered limiting. Rather, the subject matter preferably encompasses other embodiments including a plurality of the same component, and vice-versa, unless explicitly stated otherwise herein.

Moreover, applicants do not intend for any term in the specification or claims to be ascribed an uncommon or special meaning unless explicitly set forth as such. Further, the present subject matter encompasses present and future known equivalents to the known components referred to herein by way of illustration.

It will be understood that in the event parts of different embodiments have similar functions or uses, they may have been given similar or identical reference numerals or descriptions. It will be understood that such duplication of reference numerals is intended solely for efficiency and ease of understanding the present disclosure and are not to be construed as limiting in any way, or as implying that the various embodiments themselves are identical.

Unless defined otherwise, all technical and scientific terms used herein have the same meaning as commonly understood by one of ordinary skills in the art to which the present disclosure belongs. However, some specific definitions are presented below.

The term "user" refers to the individual who interacts with the system primarily via the mobile autonomous device running the client-side application. Users can also be defined as registered users, non-registered users, or persons. The term "users" or "registered users" refers collectively to those individuals who have access to the system of the present disclosure, including employees, administrators, information technology specialists, and end users generally. The term "non-user" refers to any individual who does not have access to either the server-side and/or client-side applications described herein yet may be a recipient of the content generated by the same.

The term "video display" refers to devices upon which information may be displayed in a manner perceptible to a user, such as a computer monitor, cathode ray tube, liquid crystal display, light emitting diode display, touchpad or touchscreen display, and/or other means known in the art for emitting a visually perceptible output. Video displays may be electronically connected to a client device according to hardware and software known in the art.

The term "device" refers to, but is not limited to, vehicles, drones, stand-alone web cameras, cameras on laptops, tablets, mobile devices, doorbells, dashboards, security cameras, robots, autonomous equipment, and virtual, augmented, and mixed reality glasses/headsets.

In an implementation of a preferred embodiment of the disclosure, a "display page" may include a computer file residing in memory which may be transmitted from a server over a network to a mobile device that can store it in memory. A mobile device may receive non-transitionary computer-readable media, which may contain instructions, logic, data, or code that may be stored in the persistent or temporary memory of the mobile device. Similarly, one or more servers may communicate with one or more client devices across a network and may transmit computer files residing in memory. The network, for example, can include the Internet, wireless communication network, or any other network for connecting one or more client devices to one or more servers.

Any discussion of "client-side application" may also apply to a mobile application that is downloaded to or stored on a client device and/or mobile device.

Any discussion of "client", "client device" or "mobile device" may also apply to any type of networked device, including but not limited to phones such as cellular phones (e.g. An iphone, Android, Windows Mobile, Blackberry, or 10 any "smart phone") or location-aware portable phones (such as GPS); embedded or specialty device; or viewing device (such as apple tv, Google TV, Roku, Smart TV, Picture Frame or other viewing device); personal computer, server computer, or laptop computer; personal digital assistants pads) such as Palm-based devices or tablet devices (such as iPad, Kindle Fire, or any tablet device); a roaming device such as a network-connected roaming device or other device capable of communicating wirelessly with a computer network; or any other type of network device that may communicate over a network and handle electronic transactions. Any discussion of any device mentioned may also apply to other devices.

At a client device, the "display page" or "user interface" may be interpreted by software residing on a memory of the client device, causing the computer file to be displayed on a video display in a manner perceivable by a user. The display pages (i.e., Screens) described herein may be created using a software language known in the art such as, for example, the hypertext mark-up language ("HTML"), the dynamic hyper-text mark-up language ("DHTML"), HTML5, the extensible hypertext mark-up language ("XHTML"), the extensible mark-up language ("XML"), or another software language that may be used to create a computer file displayable on a video display in a manner perceivable by a user. Any computer-readable media with logic, code, data, and instructions, may be used to implement any software or steps or meth-otology. Where a network comprises the Internet, a display page may comprise a webpage of a type known in the art. The terms "page" or "display page" may include embedded functions comprising software programs stored on a memory, such as, for example, Cocoa, VBScript routines, Jscript routines, javascript routines, Java applets, ActiveX components, ASP .NET, AJAX, Flash applets, Silverlight applets, Adobe AIR routines, or any other scripting language.

A display page may comprise well-known features of graphical user interface technology, such as, for example, frames, windows, tabs, scroll bars, buttons, icons, menus, fields, and hyperlinks, and well-known features such as a touchscreen interface. Pointing to and touching on a graphical interface button, icon, menu option, or hyperlink also is known as "selecting" the button, icon, option, or hyperlink. Additionally, a "point and gesture" interface may be utilized, such as a hand-gesture-driven interface. Any other interface for interacting with a graphical user interface may be utilized. A display page according to the disclosure also may incorporate multimedia features. For example, a user interface may be provided for a web page or an application. An application may be accessed remotely or locally. A user interface may be provided for a mobile application (e.g. iPhone application), gadget, widget, tool, plug-in, or any other type of object, application, or software Any of the client or server devices described may have tangible computer-readable media with logic, code, or instructions for performing any actions described herein or running any algorithm. The devices with such computer-readable media may be specially programmed to perform the actions dictated by the computer-readable media. In some embodiments, the devices may be specially programmed to perform one or more tasks relating to blood glucose management. In some embodiments, the devices may communicate with or receive data collected from one or more measurement or sensing devices, which may collect physiological data from a subject or a sample collected from a subject. The term "time" refers to a chronological time or time-frame, including but not limited to morning, afternoon, evening, breakfast, lunch, dinner, night time, beginning, end, etc.

Other examples of protocols or standard communications mean between the server and the client included within the scope of this disclosure include, but are not limited to, standard telephone lines, LAN or WAN links (e.g., T1, T3, 56 kb, X.25), broadband connections (ISDN, Frame Relay, ATM), and wireless connections using a variety of communication protocols (e.g. HTTP, HTTPS, XML, JSON, TCP/IP, IPX, SPX, NetBIOS, Ethernet, RS232, messaging application programming interface (MAPI) protocol, real-time streaming protocol (RTSP), a real-time streaming protocol used for user datagram protocol scheme (RTSPU), the Progressive Networks Multimedia (PDN) protocol, manufacturing message specification (MMS) protocol, the wireless application protocol (WAP) and direct asynchronous connections A system for location-based security verification of users is disclosed. The system may include a receiving module to receive, in response to clicking a verification link, data from a user device pertaining to device details, location coordinates of the user, sensor data, and/or environmental data. Further, the system may include an analyzer module to determine a first position point, a second position point, and a third position point by employing a Magnesse Magnetic Field (MMF) model, an Augmented Reality Sextant (ARS), and an Augmented Reality Muon Measurement (ARMM), respectively. The system may further include an optimization module to optimize data pertaining to the determined first position point, second position point, and/or third position point. Also, the system may include an optimal point calculation module to determine an optimal point by performing fusion, trilateration, and/or triangulation on the optimized data pertaining to the determined first position point, second position point, and/or third position point. Furthermore, the system may include an environmental identification module to identify a current location of the user by employing one or more Machine Learning (ML) models over the received environmental data. Additionally, the system may include a security module to verify the user based on the optimal point and the identified current location.

FIG. 1 illustrates an exemplary environment 100 of a system 110 for location-based security verification of user 102, in accordance with an embodiment of the present disclosure. In an embodiment, the exemplary environment 100 may include a user device 104 associated with the user 102, an access point 106, a network 106, and the system 110. The system 110 may provide a location-based security verification of the user 102 by accurately identifying the user's location without being manipulated by the likes of hackers, Virtual Proxy Networks (VPNs), and/or other location manipulation software. Further, such location-based security verification may be utilized to safely access the access point, such as another user, a website, a portal, a software, data transfer, or navigation. In some embodiments, such location may be identified independently of location identification through satellite and networks. In some embodiments, such location may be identified by the location identification through satellite and networks but may be cross-verified by the system 110 of the present disclosure. In an embodiment, the system 110 may be implemented on a mobile device. In another embodiment, the system 110 may be implemented on a fully autonomous device exclusively designed for location-based security verification of the user 102. In yet another embodiment, the system 110 may be implemented on a server that may, without any limitation, include a cloud server.

In some embodiments, in order to identify the location of the user 102, the system 110 may combine digital information rendered from the spatial distribution of three or more virtual position points derived from distinct models using the earth's magnetic field, particles dispersed from cosmic rays, and/or celestial objects in a three-dimensional space. Upon deriving the three or more virtual position points, the system 110 may optimize such virtual points to remove noise, correct sensor drift, and obtain one single position point of the user 102. Thereafter, the system 110 may process environmental data sourced from the sensors of the user device 104 and integrate them with the position point to improve the reliability of the position point. Such highly reliable position points may be utilized further to create a unique identity schema for managing a user's identity and access privileges. In some embodiments, a digital map may be utilized to store the spatial data for one or more Machine Learning (ML) algorithms to be trained for improving accuracy. In some embodiments, the one or more models for identifying location of the user 102 may use a relative time to produce optimal time intervals using processor cycles and the absolute Jovian time calculated by the digital sextant coupled with the magnetic field model and cosmic rays. Additionally, the system 110 may utilize encoded ultra-wideband ionospheric scatter to extend mesh networks in parallel with ground stations for continuous communications between one or more user devices 104. In some embodiments, the system 110 may measure the reflectance of a surface to determine the properties of surfaces for inertial indoor and underground navigation and/or determination of the composition of medicinal drugs.

Accordingly, the system 110 may be utilized in the field of IT security which deals with the identification, location verification, authentication, authorization, and auditing of resource security for a verified location. Further, the system 110 may make use of environmental data collected from sensors to create a unique profile associated with a verified position using Augmented Reality (AR). Additionally, the system 110 may be utilized to calculate an optimal time that may compare the processor time to the atomic clock for calculating three or more position points determined using the magnetic declination, a digital sextant, and muon detection to create an accurate position point. Such accurate position points may be compared against the GPS location being communicated to ensure authenticity. Further, the system 110 may be utilized to integrate such authentic location with the environmental data (such as sunlight, cloud coverage, sound, wind, temperature, pressure, air density, and altitude) collected from sensors of the user device 104 to create a unique personal schema for identification management and/or indoor/underground secure communication using ultra-wide, sky waves, and ground stations based on the identified location relative to the earth's surface.

Figure 2:
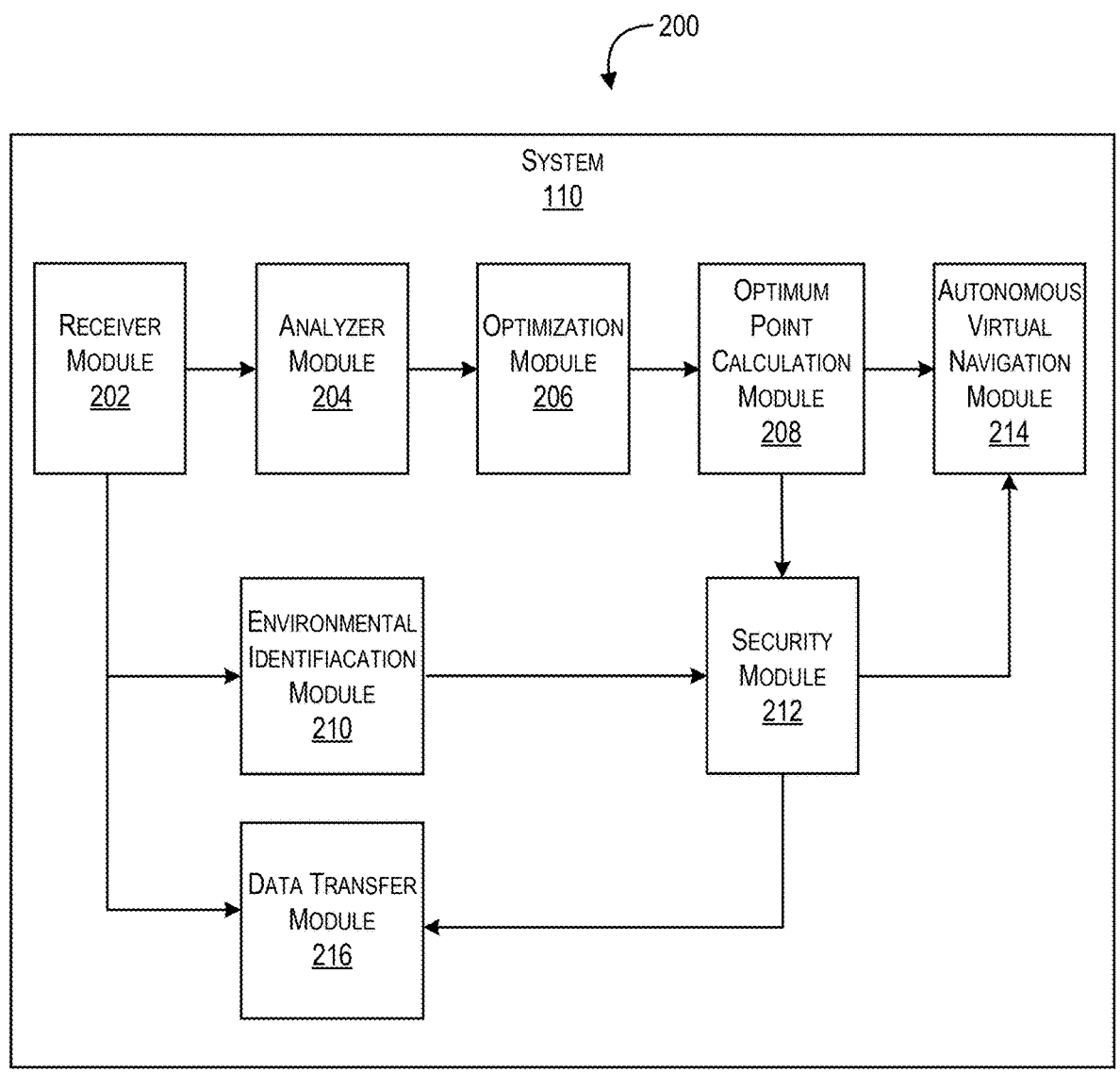
FIG. 2 illustrates a block diagram for the system for location-based security verification of users, in accordance with an embodiment of the present disclosure.

FIG. 2 illustrates a block diagram for the system 110 for location-based security verification of the user 102, in accordance with an embodiment of the present disclosure. In an embodiment of the present invention, the system 110 may include a receiver module 202, an analyzer module 204, an optimization module 206, an optimum point calculation module 208, an environmental identification module 210, a security module 212, an autonomous virtual navigation module 214, and a data transfer module 216. The receiver module 202, the analyzer module 204, the optimization module 206, the optimum point calculation module 208, the environmental identification module 210, the security module 212, the autonomous virtual navigation module 214, and the data transfer module 216 may be communicatively coupled to a memory and a processor of the system 110.

The processor may control the operations of the receiver module 202, the analyzer module 204, the optimization module 206, the optimum point calculation module 208, the environmental identification module 210, the security module 212, the autonomous virtual navigation module 214, and the data transfer module 216. In an embodiment of the present disclosure, the processor and the memory may form a part of a chipset installed in the system 110. In another embodiment of the present disclosure, the memory may be implemented as a static memory or a dynamic memory. In an example, the memory may be internal to the system 110, such as an onside-based storage. In another example, the memory may be external to the system 110, such as cloud-based storage. Further, the processor may be implemented as one or more microprocessors, microcomputers, digital signal processors, central processing units, state machines, logic circuitries, and/or any devices that manipulate signals based on operational instructions.

In an embodiment, the receiver module 202 may receive data pertaining to device details, location co-ordinates of the user, sensor data, and/or environmental data from the user device 104. The user device 104 may correspond to an electronic device having an antenna, a microphone, a speaker, and a camera. Thus, for example, the user device 104 may, without any limitation, include a mobile phone, a laptop, a tablet, and a Personal Digital Assistant (PDA) device. Further, the device details may relate to the details pertaining to the user device 104 such as model number, manufacturer, operating systems, root status (whether the device is rooted or not), sensor details, or the like. The location co-ordinates may relate to the real-time location co-ordinates detected by the GPS of the user device 104. The sensor data may relate to data captured by the sensors of the user device 104, such as images by a camera, sound by microphones, accelerometer data, gyroscope data, or the like. The environmental data may relate to ambient data pertaining to proximity of the user device 104 and associated with, but not limited to, sunlight, sound, wind, temperature, pressure, air density, altitude, and/or weather.

In an embodiment, the data may be received by the received module 202 in response to clicking a verification link, such that when the user clicks on the verification link then the user device 104 may automatically send the aforementioned data to the receiver module 202 of the system 110. Alternatively, the user 102 may be provided with options to control what type may be for one or more verification, either distinctively or collectively, such that the user 102 may set the data sharing permission for each verification individually, commonly for all verifications, or based on the type of verifications. It may be understood that the verification link may be autogenerated or custom generated for accessing the access point 106 without departing from the scope of the present disclosure.

In an embodiment, the analyzer module 204 may first analyze the received device details to ascertain user device root access, user device developer mode access, latitude, longitude, altitude, speed, accuracy, time, Wireless Fidelity (Wi-Fi) signals, Bluetooth beacons, and Global Positioning System (GPS) signals. Based on the results of the analysis, the analyzer module 204 determines the probability of authenticity of the user device, signals, and location. For example, if the user device is rooted or being operated in the developer mode, then the probability of authenticity may be less, similarly, if the time associated with the latitude and longitude of the user device 104 and the received time do not match then there may be a high likelihood that the user device 104 is using a VPN and authenticity probability may be less. The authenticity checking by the analyzer module 204 has been discussed in detail in the following paragraphs.

In an embodiment, the analyzer module 204 may also calculate Optimal Time (OT) for improving accuracy of GPS position data, accounting for variations in the analysis that could result from differences in time, and/or checking for spoofing. In order to calculate the OT, the analyzer module 204 may utilize an independent method known in the art other than the atomic clock to ensure the GPS position data. In some embodiments, the analyzer module 204 may calculate absolute Jovian time and may keep track of relative time using processor cycles for ensuring the GPS position data. Furthermore, the analyzer module 204 may also create a digital map by employing an ML model to collect, store, and analyze spatial data to increase accuracy of analysis. In a non-limiting exemplary embodiment, the digital map may be created by the determination of three position points corresponding to three virtual points in space and defined by their co-ordinates through Augmented Reality (AR), and have been discussed in the following paragraphs.

In an embodiment, the analyzer module 204 may determine the first position point by employing a Magnesse Magnetic Field (MMF) model. The determination of the first position point may include reading magnetometer measurements from the sensor data over the calculated OT. Upon reading the magnetometer measurements, the analyzer module 204 may calculate inclination and declination of magnetic field over the read magnetometer measurements. Further, the analyzer module 204 may calculate the latitude and longitude corresponding to the first position point using the calculated inclination and declination of the magnetic field over an International Geomatic Reference Field (IDRF) table. The determination of the first position point by the MMF model has been discussed in detail in the following paragraphs.

In an embodiment, the analyzer module 204 may determine the second position point by employing an Augmented Reality Sextant (ARS). The determination of the second position point may include determining if the user device 104 is indoor or outdoor using a camera sensor, microphone sensor, strength of GPS signal, strength of wireless signal, strength of cellular signal; Wi-Fi SSID, and/or location relevant to an existing virtual position point on digital maps. Upon determining if the user device 104 is indoor or outdoor, the analyzer module 204 may receive one or more images pertaining to the sky from a camera of the user device 104. Further, the analyzer module 204 may determine one or more constellations by employing cloud cover detection model and constellation detection model. Upon determining the one or more constellations, the analyzer module 204 may receive an image associated with a shadow of an object to measure the angle of the sun based on the determined one or more constellations and the received image using a digital sextant. Thereafter, the analyzer module 204 may calculate latitude and longitude corresponding to the second position point based on the measured angle of the sun. The determination of the second position point by the ARS model has been discussed in detail in the following paragraphs.

In an embodiment, the analyzer module 204 may determine the third position point by employing an Augmented Reality Muon Measurement (ARMM). The determination of the third position point may include determining two or more Augmented Reality Virtual Position Points (ARVPPs) relevant to the current position using the digital map. The two or more ARVPPs are calculated using speed of muons to measure the time it would take for the muons to travel from the two or more ARVPPs to the user device's current location. Upon calculation of the two or more ARVPPS, the analyzer module 204 may calculate the third position point based on the determined two or more ARVPPs. The determination of the third position point by the ARMM model has been discussed in detail in the following paragraphs.

In an embodiment, the optimization module 206 may optimize data pertaining to the determined first position point, second position point, and third position point. In an embodiment, the optimization module 206 may optimize the data by removing noise from the data and correcting for sensor drift. Such optimization may be achieved by, without any limitation, particle filtering (such as by a Monte Carlo method) to estimate the state of a system from a set of noisy measurements. Such particle filtering may be followed by smoothing the data, removing outliers, correcting for errors, and low pass filters for removing noise and sliding time averages for extracting steady values.

In an embodiment, to optimize the data pertaining to the first position point, the optimization module 206 may first initialize a set of particles, each representing a possible location, and then use a digital magnetometer to measure the magnetic field at the MMF AR VPP. Further, the optimization module 206 may update probability based on the measured magnetic field for each particle and resample the particles by giving more weight to the particles with higher probabilities. The optimization module 206 may repeat such steps until the particles converge to a single location that corresponds to the refined location of the user 102. In an embodiment, to optimize the data pertaining to the second position point, the optimization module 206 may first initialize a set of particles, each representing a possible location, and then utilize the ARS AR VPP. Further, the optimization module 206 may update probability based on the measured angle of the sun and resample the particles by giving more weight to particles with higher probabilities. The optimization module 206 may repeat such steps until the particles converge to a single location that corresponds to the refined location of the user 102. In an embodiment, to optimize the data pertaining to the third position point, the optimization module 206 may first initialize a set of particles, each representing a possible location, and then utilize the digital virtual nodes to measure the distance to the user's location defined by the ARMM AR VPP. Further, the optimization module 206 may update probability based on the measured distance and resample the particles by giving more weight to particles with higher probabilities. The optimization module 206 may repeat such steps until the particles converge to a single location that corresponds to the refined location of the user 102.

In an embodiment, the optimal point calculation module 208 may determine an optimal point by performing fusion, trilateration, and/or triangulation on the optimized data pertaining to the determined first position point, second position point, and/or third position point. In order to perform fusion, the optimal point calculation module 208 may combine the data pertaining to the determined first position point, second position point, and/or third position point in conjunction with the available data from the digital map. The fusion may create a single estimate of the device's orientation and position. In order to perform trilateration, the optimal point calculation module 208 may first measure distances between the three calculated AR VPPs and then measure the distances between the user device 104 and the virtual position points using radio waves. Once the distances are measured, the location of the target may be determined using triangulation. It may be understood that for refinement, the trilateration may be performed again against the digital map. In order to perform triangulation, the optimal point calculation module 208 may measure the angles from the MMF AR VPP to the other two VPPs by drawing circles around each AR VPPP with a radius equal to the distance between the MMF AR VPP and the targets. The intersection of the circles is the location of the target. It may be understood that for refinement, the triangulation may be performed again against the digital map In an embodiment, the environmental identification module 210 may identify a current location of the user 102 by employing one or more Machine Learning (ML) models over the received environmental data. The environmental identification module 210 may capture and analyze data of the environment of the user 102 who is attempting to access the access point 106 to confirm the identification of the position and the user 102. In operation, the environmental identification module 210 may utilize such data to create a unique profile that may be analyzed over time using the one or more ML models to increase security and accuracy for access control, fraud detection, personal security, and/or Location Accuracy. For example, a sensor fusion algorithm may be used to track the movement of a person through a crowd by combining data from multiple cameras, radar sensors, and microphones. The sensor fusion algorithm may use the wind direction and speed to estimate the person's direction of travel, the sound of their footsteps to estimate their speed, and the images from the cameras to identify their unique features. Additionally, or alternatively, the sensor fusion algorithm may identify people by their gait i.e., the way they walk. This may be achieved by processing the data from accelerometers, gyroscopes, and magnetometers of the user device 104 to measure the person's walking pattern, and then compare this pattern to a database of known gaits.

In an exemplary embodiment, the environmental data may, without any limitation, include sunlight, sound, wind, temperature, pressure, air density, altitude, and weather. With respect to sunlight, the environmental identification module 210 may utilize the camera to calculate the average brightness of the celestial object and/or the average color. This may be compared to the time of day, the cloudiness factor, and expected weather conditions. Further, the environmental identification module 210 may calculate the amount of Ambient Light using partial least squares. With respect to sound, the environmental identification module 210 may perform sound analysis to identify different types of sounds, as well as to extract information from sound recordings, such as the frequency and intensity of sound that may be used to identify individuals, the way that sound waves interact with an individual's body may be used to create a unique identifier, the pitch/loudness/timbre of sound may be used to identify individuals, the way that an individual's voice sounds may be used to identify them, and a "chirp" sent from the user device 104 may be analyzed using the microphone sensor for an echo/wind/other potential ambient noise. The microphone sensor may further help to determine if the device is inside, underground, or underwater, indoor/outdoor location, and the moving/stationary status of the user device 104. In order to analyze sound, the environmental identification module 210 may utilize time-frequency analysis and/or an ML model. The time-frequency analysis may be used to simultaneously represent the time and frequency content of a sound for identifying the different sounds that are present in a recording, as well as the changes in sound over time. The ML model may be used to automatically identify different types of sounds by training on a large dataset of labeled sound recordings.

With respect to wind, the environmental identification module 210 may utilize data from the microphone sensor to estimate wind speed and compare it against the user device's orientation to determine the wind direction to compare against publicly available data. With respect to temperature, data from the thermometer sensor is used to capture temperature readings from the immediate surroundings for use as a comparison to publicly available data as well as stored for machine learning. With respect to pressure, the environmental identification module 210 may determine the amount of pressure that an individual is exposed to identify them. The way that pressure affects an individual's breathing or heartbeat is used to create a unique identifier and the data from the barometer sensor is used to compare against publicly available data to identify the user 102. With respect to air density, the environmental identification module 210 may compare the received pressure and temperature data with available meteorological data. With respect to altitude, the environmental identification module 210 may utilize the Inertial measurement unit (IMU) to measure the acceleration and rotation of the user 102 that may be used to estimate position and orientation. With respect to weather, the environmental identification module 210 may check camera and microphone data against publicly available data for comparison of weather conditions to identify the user location.

It may be understood that in order to improve the accuracy of the identification, the environmental identification module 210 may combine data from multiple sensors, identify and correct errors, identify outlines, learn relationships between sensors, integrate new sensors, and/or adapt to changing conditions.

In an embodiment, the security module 212 may verify the user 102 based on the optimal point and the identified current location. The verification may correspond to location verification, authentication, authorization, and/or auditing of resources security for a verified location.

In an embodiment, the autonomous virtual navigation module 214 may calculate location and direction based on the optimized data pertaining to the determined first position point, second position point, and/or third position point. The calculated location and direction may be non-satellite locations and directions that may be utilized above ground, underground, indoors, and underwater. In some embodiments, such location and directions may facilitate the users 102 with a navigational system on Earth as well as other celestial objects (such as other planets, moon, and stars) that do not have the satellite navigational system as developed on the Earth. The autonomous virtual navigation module 214 may utilize the AR VPPs to provide more accuracy indoors and underground with the use of Inertial Navigation System (INS) libraries. For example, when underwater, the AR VPPs may be used to represent buoys and the location of the sun, enabling the system 110 to factor them and utilize the halfway point from the user device 104 to provide more accuracy underwater. Similarly, the autonomous virtual navigation module 214 may provide underground navigation. When above ground, the autonomous virtual navigation module 214 may utilize the digital map consisting of the earth's magnetic field and celestial objects to determine direction and location. In some embodiments, the angle between the compass needle (that always points towards the north magnetic pole) and the horizon may be used to calculate the magnetic declination that may in turn be used to determine the location of the device.

In some embodiments, the autonomous virtual navigation module 214 may utilize inertia (INS Libraries) and Dead Reckoning through a combination of accelerometers, gyroscopes, and magnetometers to calculate the user's position. The accelerometers may measure the user's acceleration, the gyroscopes may measure the user's rotation, and the magnetometers may measure the user's orientation. Further, the autonomous virtual navigation module 214 may utilize reflectometry to enhance inertia by measuring the distance between the INS and known landmarks to correct for the errors resulting from the gyroscopes and accelerometers. Further, the INSs may be enhanced by providing an independent measurement of the INS's position and velocity by using the reflectometer to measure the time it takes for a signal to travel from the INS to a known reflector and back. Further, the time of flight (TOF) may be used to calculate the INS's distance from the reflector that may be utilized to update the INS's position estimate. In an embodiment, the INS's velocity estimate may be improved by measuring the Doppler shift of the signal as it travels to and from the reflector since the Doppler shift is caused by the relative motion between the INS and the reflector. This may be used to calculate the INS's velocity.

In an embodiment, the data transfer module 216 may transmit data from the user device 104 by forming a signal that is spread over a wider bandwidth than necessary to transmit the data. In order to transmit the data, the data transfer module 216 may multiply the formed signal with a pseudorandom spreading sequence to spread the formed signal out over a wider bandwidth using an Ultra-WideBand (UWB) modulation. Then, the data transfer module 216 may send a radio wave, having the multiplied signal, to the ionosphere that may be refracted by the ionosphere for traveling to a distant location to a receiving device. It may be understood to a person skilled in the art that receiver of a receiving device may multiply the received radio wave with the same pseudorandom spreading sequence that was used for multiplying the signal to receive the data. The transmission of data through the data transfer module 216 may be discussed in detail in the following paragraphs.

Figure 3A:
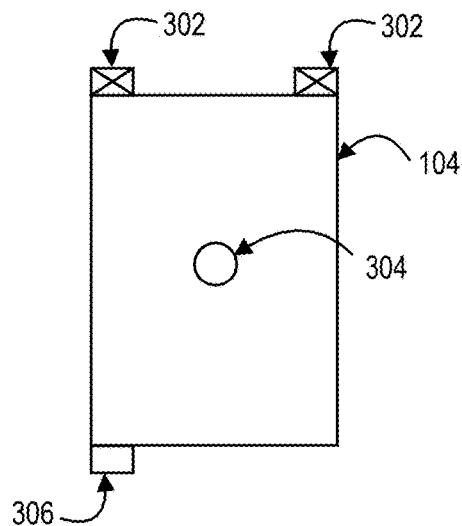
FIG. 3A illustrates a user device with minimum hardware components required to use a series of sensors to verify the integrity of GPS signals, in accordance with an embodiment of the present disclosure.
Figure 3B:
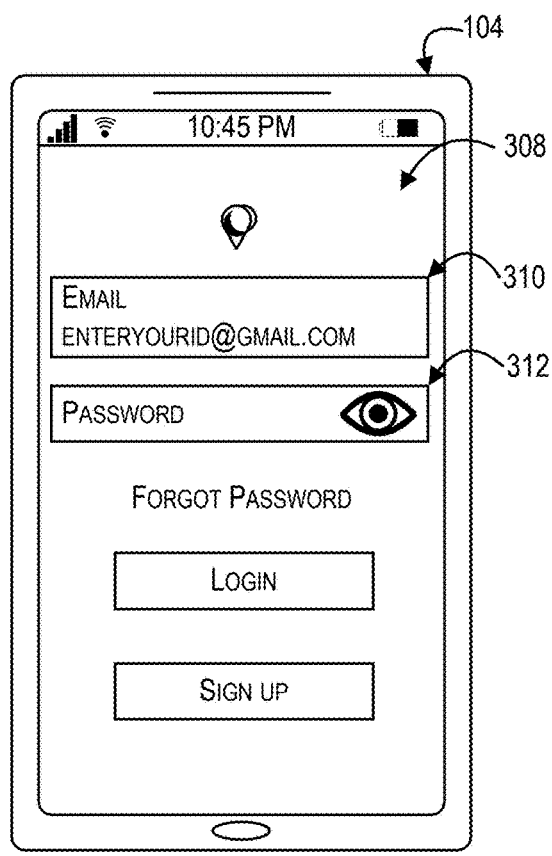
FIG. 3B illustrates a home user interface screen of the user device, in accordance with an embodiment of the present disclosure.
Figure 3C:
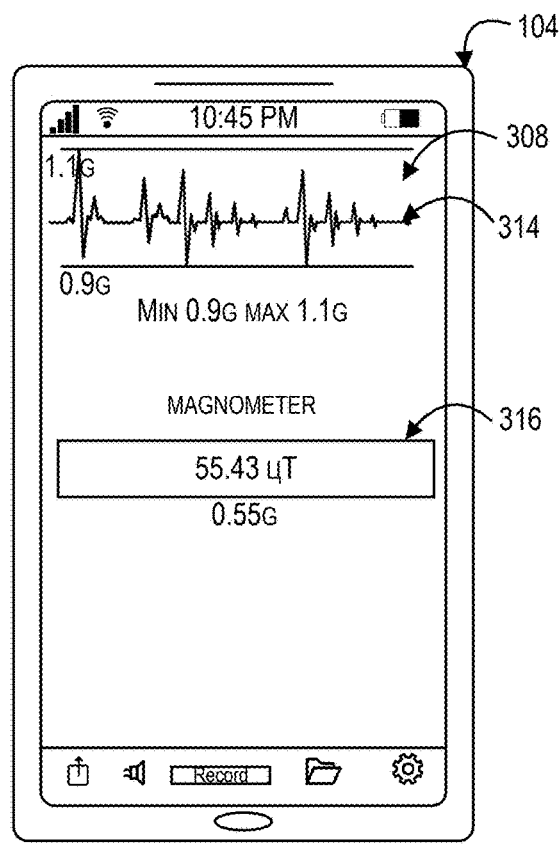
FIG. 3C illustrates a touch screen interface for the user device supporting functions and executable instruction, in accordance with an embodiment of the present disclosure.
Figure 3D:
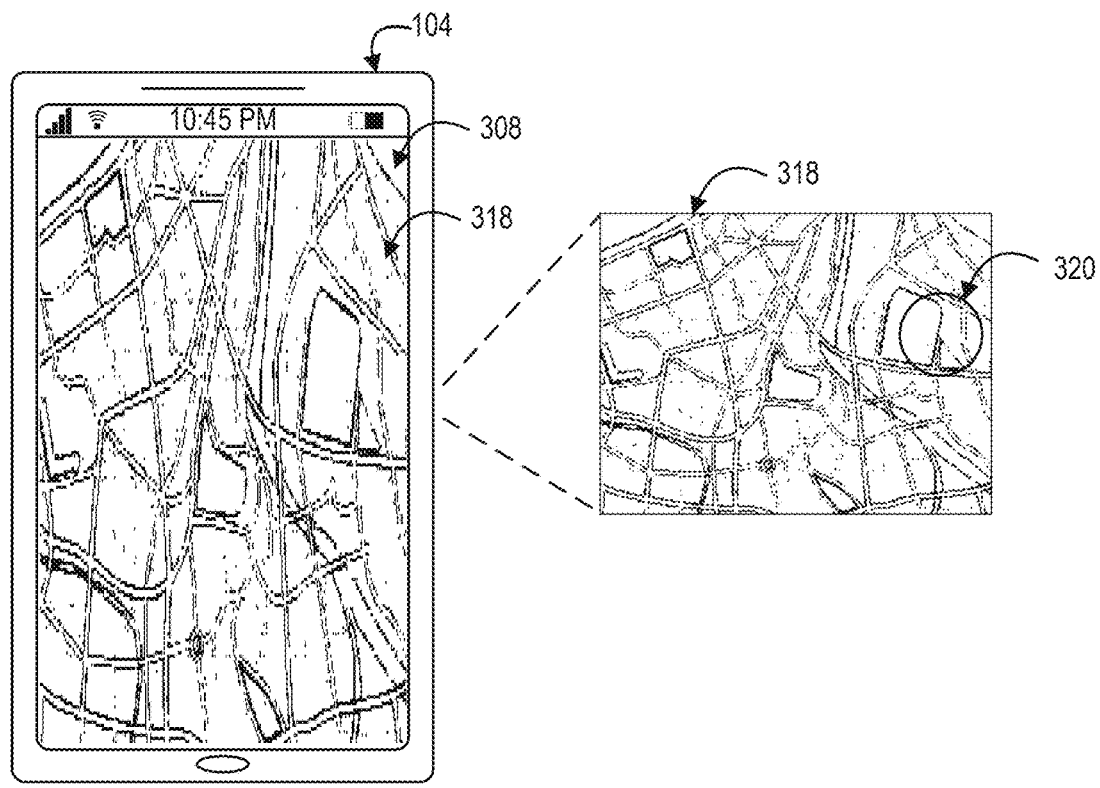
FIG. 3D illustrates a user interface showing a display output pertaining to approved verification of the user, in accordance with an embodiment of the present disclosure.

FIG. 3A illustrates the user device 104 with minimum hardware components required to use a series of sensors to verify the integrity of GPS signals, in accordance with an embodiment of the present disclosure. FIG. 3B illustrates a home user interface screen of the user device 104, in accordance with an embodiment of the present disclosure. FIG. 3C illustrates a touch screen interface for the user device 104 supporting functions and executable instruction, in accordance with an embodiment of the present disclosure. FIG. 3D illustrates a user interface showing a display output pertaining to approved verification of the user 102, in accordance with an embodiment of the present disclosure. For the sake of brevity, FIGS. 3A-3D have been explained together.

In an embodiment, as shown in FIG. 3A, the user device 104 may be an exclusive device for location-based security verification of the user 102. Such user device 104 may include one or more antennas 302, a camera 304, and a power connection 306. The one or more antennas 302 may facilitate capturing of GPS signals used to determine the direction of the signal and if the signal is not coming from the appropriate angle or strength then the data may be flagged for possible spoofing/jamming and alerts of the user. Further, the camera 304 may be an RGB camera sensor with a fish eye lens facing up to capturing 180 degrees of the sky. Furthermore, the power connection 306 may facilitate the user device 104 to attach with an existing power supply or a separate battery. Additionally, a solar power attachment may be added to prolong the duration between charges. In some embodiments, the user device 104 may include input/output modules for common wired and wireless protocols including, but not limited to, radio frequencies (RFID), WiFi, Bluetooth, and Near-Field communication and Ultra-Wide Band. In some embodiments, the user device 104 may include a processor with an onboard clock to calculate the integrity of the GPS signal (that may be captured via a GPS sensor) against installed module components. Additionally, the user device 104 may include orientation components, such as a compass, gyroscope, and an accelerometer, to verify direction, horizon, and acceleration. The disclosed user device 104 for exclusive location-based security verification may be a minimum hardware modular device to geolocate using celestial objects, and ambient environment factors and to verify the integrity of GPS signals to prevent GPS spoofing or jamming.

In an embodiment, as shown in FIG. 3B, the user 102 may log into the user device 104 by entering user name 310 (such as email ID) and password 312 into the home user interface 308 of the user device 104. In an embodiment, as shown in FIG. 3C, the user device 104 may display a magnetometer reading graph 314 and magnetometer value 316 along with min and max values. Further, the user device 104 may utilize such magnetometer reading graph 314 to determine the location of the user device 104 without the use of any data or signal from satellites, as shown in FIG. 3D. Further, as illustrated, a digital map 318 may be created by utilizing such determined location of the user device 104 that may be further zoom-in to focus on the calculated location, user location, and/or trust zone, as shown by 320.

Figure 4:
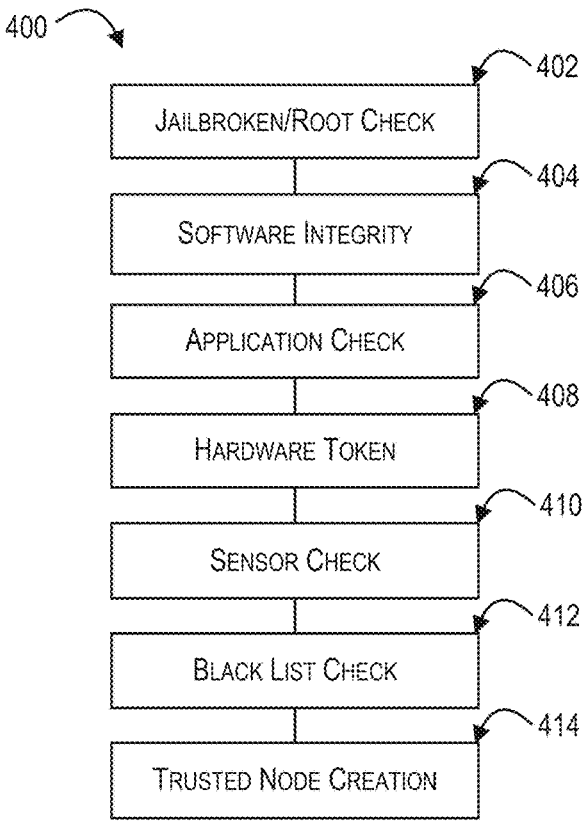
FIG. 4 illustrates a flowchart showing a process for determination of probability of authenticity of user device, signals, and location, in accordance with an embodiment of the present disclosure.

FIG. 4 illustrates a flowchart 400 showing a process for determination of probability of authenticity of the user device 104, signals, and location, in accordance with an embodiment of the present disclosure. In an embodiment, for determining the probability of authenticity of the user device 104, the system 110 may first determine that the user device 104 has not been hacked and/or the GPS location has been spoofed or jammed. Further, the system 110 may check if the user device 104 is jailbroken, rooted, and/or in developer mode, as shown in box 402. In an embodiment, the user device 104 may monitor latitude, longitude, altitude, speed, accuracy, and time. For example, while moving and not moving, a check may be done to determine if only latitude and longitude values are updated, a check may be done if altitude, speed, and accuracy remain constant, if speed remains 0, and if locations report in a perfectly straight line from the starting point to the endpoint. Next, the system 110 may check the integrity of the software that whether it has been tampered with, as shown by box 404. Next, the system 110 may check other installed applications to search for any application that may be used to spoof location, as shown by box 406. Next, the system 110 may create a unique token based on the readily available hardware information and stores it on a blockchain node, as shown by box 408. ARVPPs are created when two or more trusted tokenized users access the signal including, but not limited to, cell tower services, WiFi signals, Bluetooth beacons, or the like. Next, the system 110 may check the sensors such as gyroscope, compass, accelerometer, and microphone to ensure the user is not using an emulator, as shown by box 410. Next, the system 110 may compare the user device 104 with one or more blacklisted geofences, IP addresses, and Mac addresses, as shown by box 412. The system 110 may then perform a data packet check where two antennas capturing GPS signals are used to determine the direction of the signal, such that if the signal is not coming from the appropriate angle or strength then the data may be flagged for possible spoofing/jamming and alerts may be provided to the user 102. Next, the system 110 may create trusted nodes when two or more trusted tokenized users access the signal including, but not limited to, cell tower services, WiFi signals, Bluetooth beacons, or the like as shown by box 414.

Figure 5A:
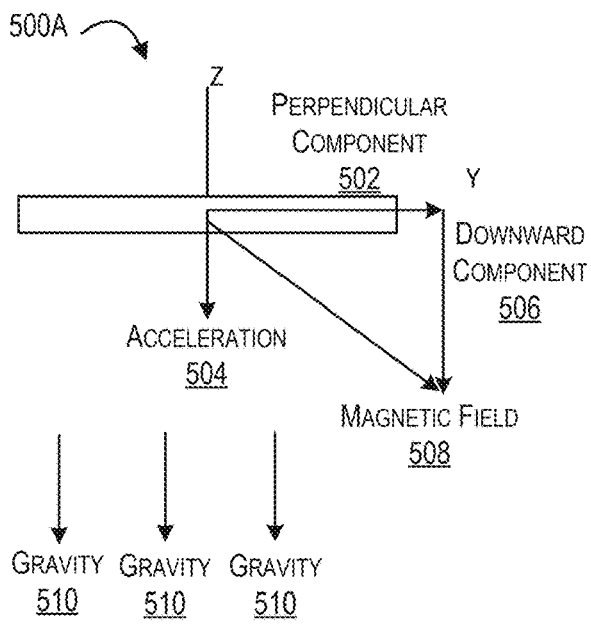
FIG. 5A illustrates a simplified overview of X, Y, and Z components of acceleration for a magnetic field, in accordance with an embodiment of the present disclosure.
Figure 5B:
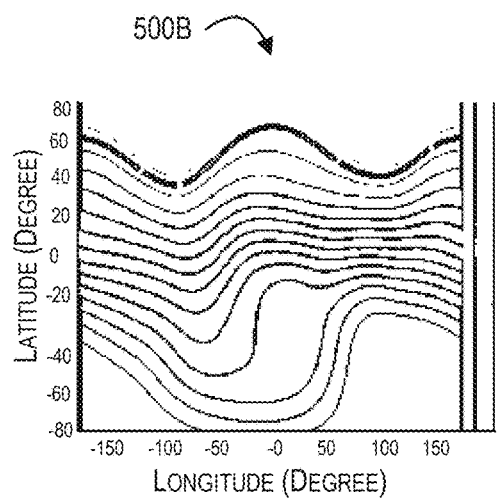
FIG. 5B illustrates a magnetic model to find all points on the surface of the Earth with a matching value for Bz, in accordance with an embodiment of the present disclosure.
Figure 5C:
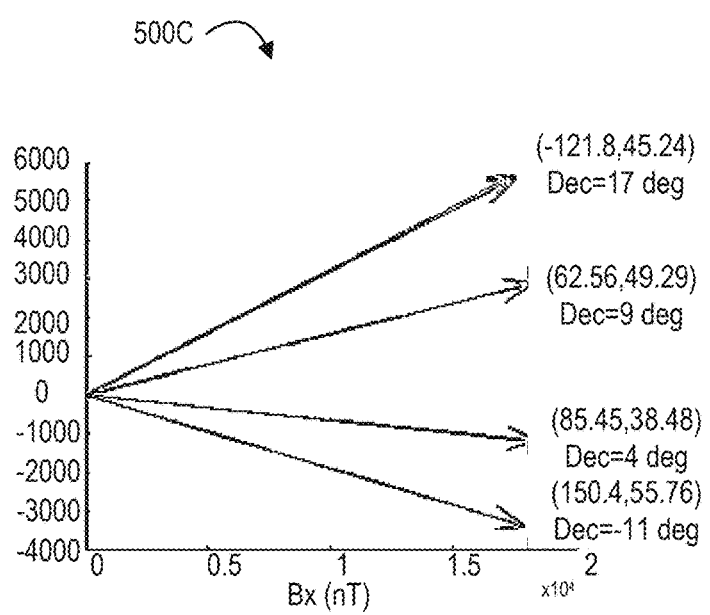
FIG. 5C illustrates a graph showing determined unique correct location, in accordance with an embodiment of the present disclosure.

FIG. 5A illustrates a simplified overview 500A of X, Y, and Z components of acceleration for a magnetic field, in accordance with an embodiment of the present disclosure. FIG. 5B illustrates a magnetic model 500B to find all points on the surface of the Earth with a matching value for Bz, in accordance with an embodiment of the present disclosure. FIG. 5C illustrates a graph 500C showing determined unique correct location, in accordance with an embodiment of the present disclosure. FIG. 5D illustrates a graph 500D showing rotation of the user device 104 and the yaw angle from the device's gyro, in accordance with an embodiment of the present disclosure. For the sake of brevity, FIGS. 5A-5D have been explained together.

In an embodiment, in order to calculate the first position point by the MMF model, the system 110 may first calibrate the user device 104 magnetometer to read z-components i.e., acceleration 504 in line with gravity 510, as shown in FIG. 5A. The magnetic model may help find all the points on the surface of the Earth with a matching value of Bz, as shown in FIG. 5B. Thereafter, the system 110 may then measure the magnitude of the magnetic field in the phone's x-y plane, the 'perpendicular component' 502. Further, there may only be a small discrete set of points that have the same downward component 506 and perpendicular values for the magnetic field 508. It may be noted that each of these points may have a different declination angle that predicts the heading to true North, such that as the yaw angle from the user device's gyro, as shown in FIG. 5D is tracked, the value at which the field has a maximum in the y-component may be set as magnetic north. Thereafter, the system 110 may determine that each candidate location may have a different declination angle of the perpendicular magnetic field, as shown in FIG. 5C. Thus, the unique correct location may be determined by measuring the x and y components of the magnetic field 508 as a function of the declination angle to match the correct direction from the MFF model. Graphical representations associated with one or more parameters and observations are shown in FIGS. 6A, 6B, 7A, 7B, 8A, 8B, 9A, and 9B.

Figure 7A:
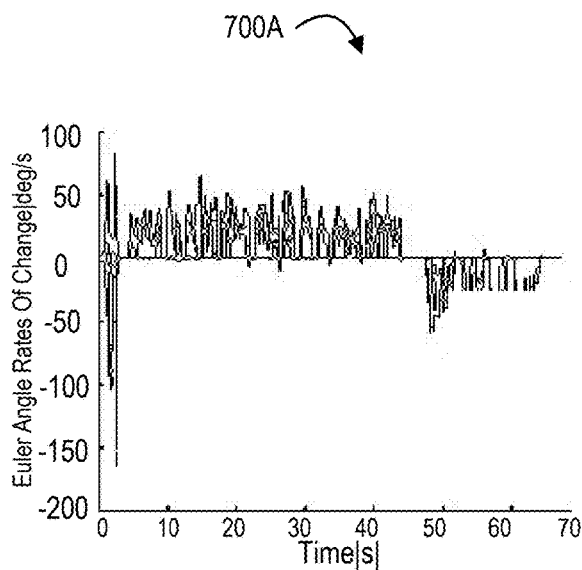
FIG. 7A illustrates a graph showing yaw angle recording using a gyrometer from 0 to 720 from two full rotations counterclockwise of the user device, in accordance with an embodiment of the present disclosure.
Figure 7B:
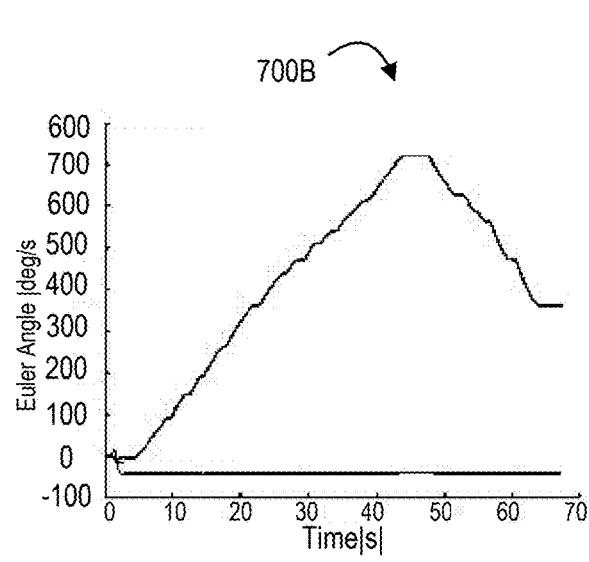
FIG. 7B illustrates a graph of angles obtained by integrating the time, in accordance with an embodiment of the present disclosure.
Figure 8A:
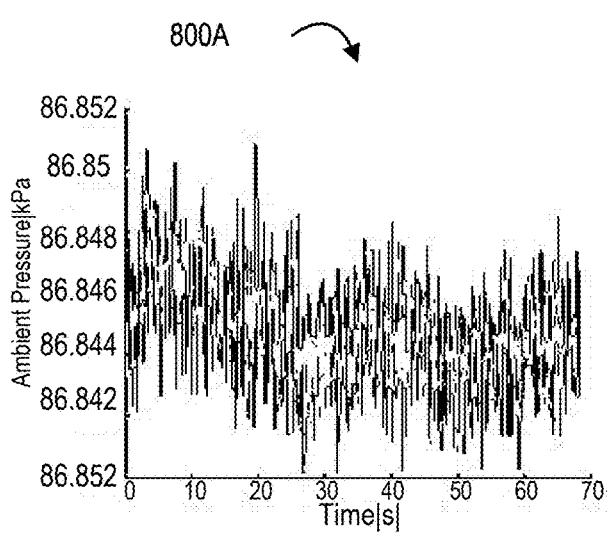
FIG. 8A illustrates a graph showing barometer reading of ambient pressure to adjust the user device altitude, in accordance with an embodiment of the present disclosure.
Figure 8B:
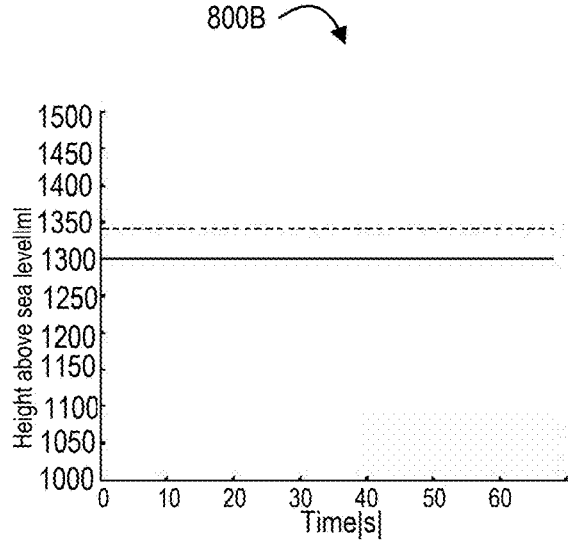
FIG. 8B illustrates a graph showing barometer reading with inverted pressure to altitude, in accordance with an embodiment of the present disclosure.
Figure 9A:
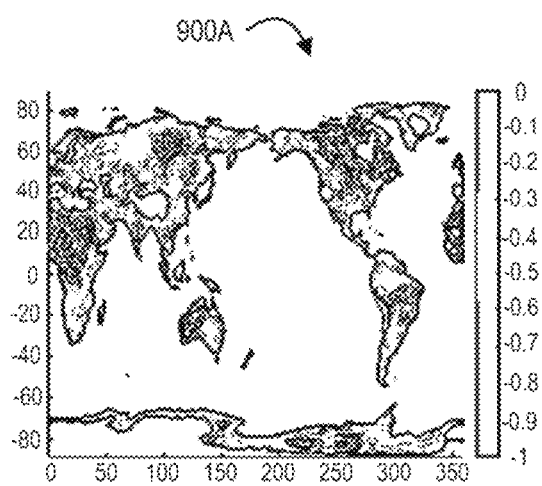
FIG. 9A illustrates a heat map depicting areas of similar altitudes based on the barometer, in accordance with an embodiment of the present disclosure.
Figure 9B:
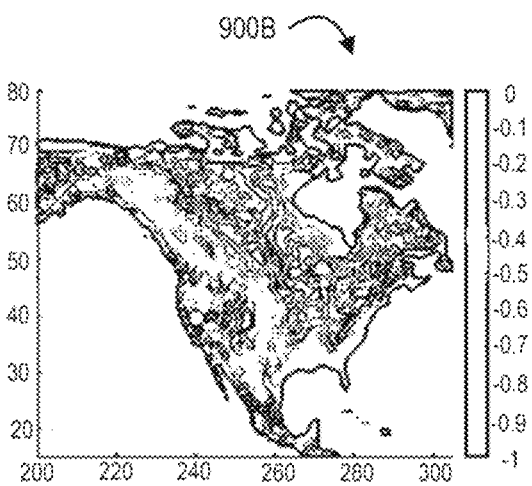
FIG. 9B illustrates the heat map zoomed to show a particular area, in accordance with an embodiment of the present disclosure.

In an embodiment, as shown in FIG. 6A, a graph 600A for running average of accelerometer being steady around gravitational acceleration. Further, the graph 600A may be zoomed on Az to obtain a graph 600B, as shown in FIG. 6B. In an embodiment, a graph 700A shows yaw angle recording using a gyrometer from 0 to 720 from two full rotations counterclockwise of the user device 104 is shown in FIG. 7A and a graph 700B of angles obtained by integrating the time is shown in FIG. 7B. In an embodiment, a graph 800A showing barometer reading of ambient pressure to adjust the user device's altitude is shown FIG. 8A, and a graph 800B showing barometer reading with inverted pressure to altitude is shown in FIG. 8B. In an embodiment, a heat map 900A depicting areas of similar altitudes based on the barometer is shown in FIG. 9A the zoomed heat map 900B to show a particular area is shown in FIG. 9B.

Figure 10:
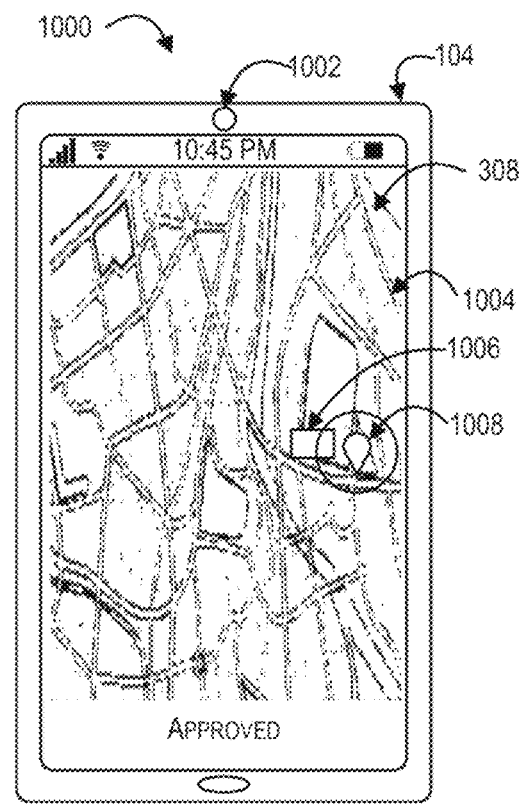
FIG. 10 illustrates a user interface during determination of probability of the user device being either indoor, outdoors, or in motion, in accordance with an embodiment of the present disclosure.

FIG. 10 illustrates a user interface 308 during determination of probability of the user device 104 being either indoors, outdoors, or in motion, in accordance with an embodiment of the present disclosure. In an embodiment, in order to calculate the second position point by the ARS model, the system 110 may first determine if the user device 104 is indoor or outdoor using the camera sensor, the microphone sensor 1002, strength of the GPS signal, the strength of the wireless signal, the strength of the cellular signal, the WiFi SSID, and location relevant to existing VPP on the digital maps. To determine the probability of the user device 104 is indoor, outdoor, or in a vehicle, the system 110 places a temporary ARVPP 1008 on a digital map 1004. The temporary ARVPP 1008 may be calculated based on a position point known from the magnetic field reading. Then, the latitude and the longitude accuracy may be utilized to create an ellipse on top of the digital map 1004 indicating the possible location of the user device 104.

In an embodiment, when the ellipse may be within a polygon of the digital map's 'building' layer 1006 then the system 110 may weigh the user device 104 more heavily to be indoors. Accordingly, the percent of the ellipse outside of the building layer 1006 may reduce the probability of the user device 104 being indoors. In another embodiment, since wireless signals (such as GPS and cellular signals) are typically stronger outdoors if the signals are strong then the probability of the user device 104 being outside is more towards the device being outside. Further, since wireless signals (such as WiFi) are typically for interior use if the signals are strong then the probability of the user device 104 being indoors is more. In some embodiments, the WiFi SSID may be compared against a database of the default SSIDs to identify and eliminate non-stationary signals such as mobile hotspots. Further, the user device 104 microphones may capture ambient sounds to identify wind and other noises to determine if the user device 104 is inside or outside. In an embodiment, the user device 104 may check the gyroscope, compass, and accelerometer to see if the location has changed. Additionally, the user device 104 may emit a short burst of high-frequency sound and listens for its echo to determine if the user device 104 is in an enclosed location. Also, based on the time of day, the user device's camera may check the ambient brightness and number of light sources to determine if the user device 104 is indoors or outdoors.

Figure 11:
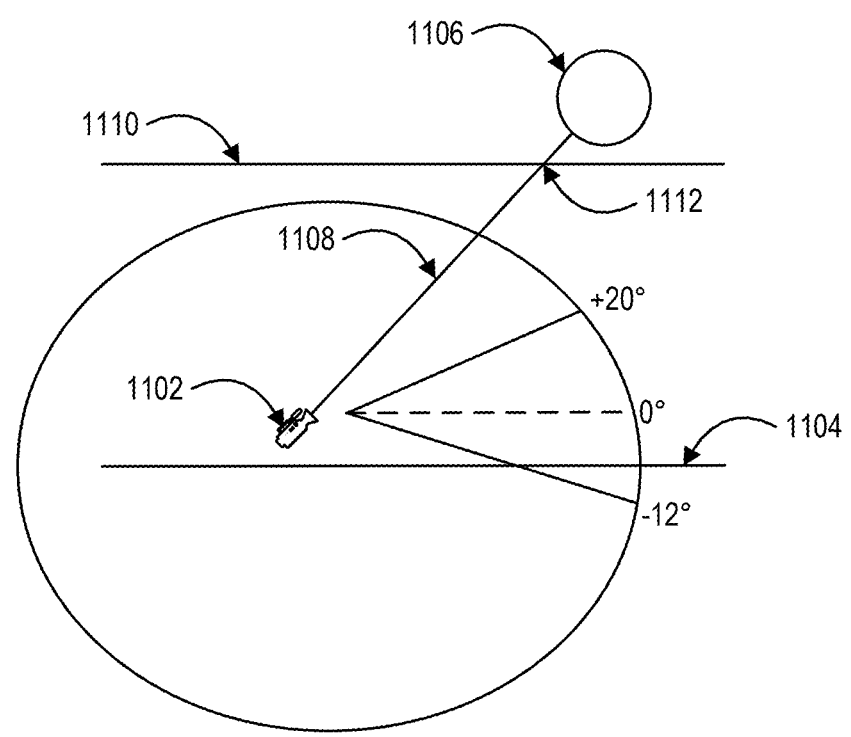
FIG. 11 illustrates obfuscation of light from a celestial object, in accordance with an embodiment of the present disclosure.

FIG. 11 illustrates obfuscation of light from a celestial object, in accordance with an embodiment of the present disclosure. In an embodiment, for the purpose of explanation of the cloud cover detection algorithm, if it is determined that the user device 104 is outdoors, then the system 110 may utilize the orientation and direction of the camera 1102 of the user device 104 derived from its gyroscope, compass, and accelerometer. Further, the system 110 may compare it against publicly available cloud elevation and cloud cover maps. In an embodiment, the user 102, who is on the ground 1104, may be instructed to point the camera 1102 at the brightest celestial object 1106. When the camera 1002 points at the specified celestial object 1106, then a ray cast 1108 may be drawn from the center of the camera 1102 towards the specified celestial object 1106, and a transparent grayscale cloud depth map 1110 may be generated and added in a hidden layer to the augmented reality scene. Further, pixel 1112 at the intersection of the ray cast 1108 and the cloud depth map 1110 may be recorded and used to calculate how much light from the specified celestial object 1106 is obfuscated. In an embodiment, the grayscale depth map 1110 may have a min value of 0 and a max value of 255, such that zero equals no clouds and 255 are completely opaque clouds. For example, the user 102 may be instructed to point at the sun on a partly cloudy day, and if the pixel reading from the intersection of the ray cast 1108 and cloud depth map 1110 is 128 out of a possible 255 then the system 110 may determine that the sun's light would be 50% of its maximum brightness.

Figure 12A:
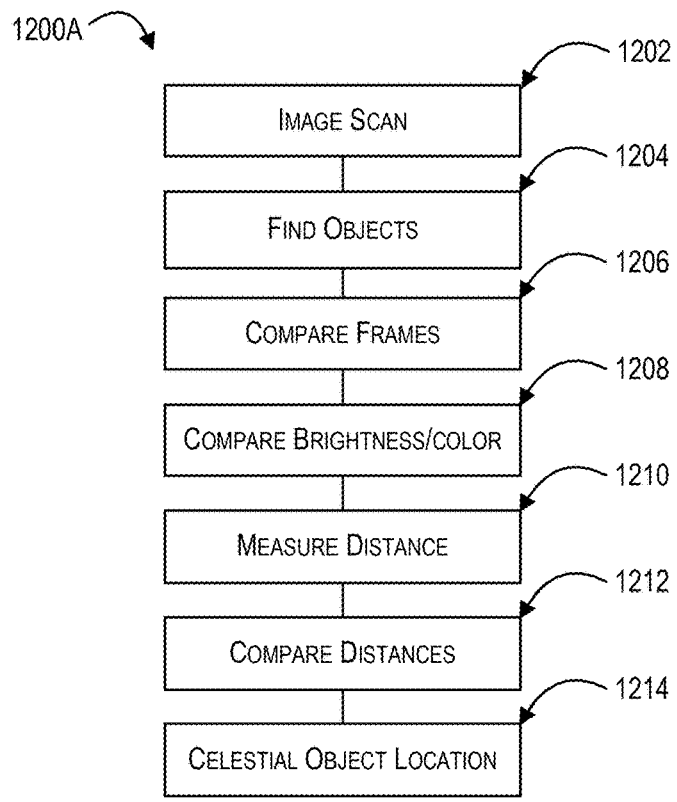
FIG. 12A illustrates a flow chart for calculation of location of the celestial object, in accordance with an embodiment of the present disclosure.
Figure 12B:
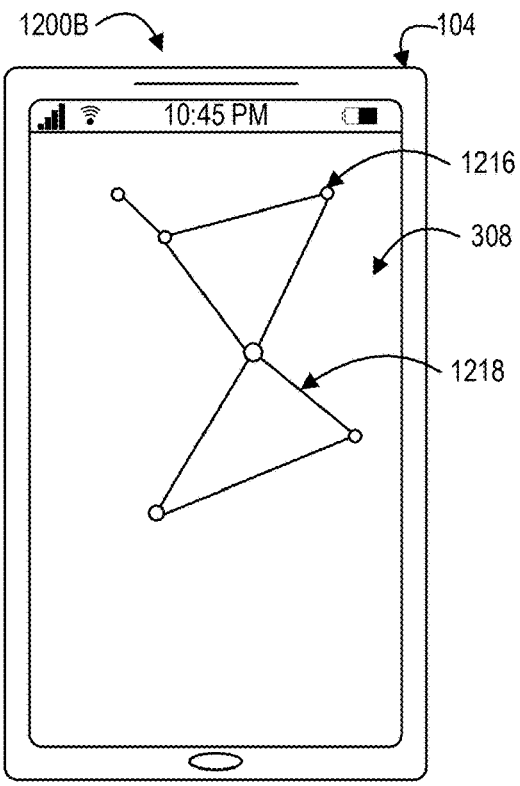
FIG. 12B illustrates a user interface pertaining to calculation of location of the celestial object, in accordance with an embodiment of the present disclosure.

FIG. 12A illustrates a flow chart 1200 for calculation of location of the celestial object, in accordance with an embodiment of the present disclosure. FIG. 12B illustrates a user interface 308 pertaining to calculation of location of the celestial object, in accordance with an embodiment of the present disclosure. For the sake of brevity, FIGS. 12A-12B have been explained together to discuss the operation of the constellation detection algorithm.

The system 110 may perform a scan to automatically identify stars, planets, and constellations and use this information to geolocate the origin of the measurement. At first, the system 110 scans the image/video or stream for light-emitting objects against a dark background, at step 1202. Based on the image scan, the system 110 may detect/find objects, at step 1204. Then, the system 110 adds the object to a list and compares this list to the next frame (if available), at step 1206, to remove airplanes, drones, or other non-stationary aerial or orbiting objects, as shown by 1216 in FIG. 12B. Upon comparison of the frames, the system 110 may capture and compare relative brightness and color of known stars and planets, at step 1208. Once all objects are identified in said frame, the relative distance 1218 between each object may be measured on a flat plane, at step 1210. Thereafter, the distances between the objects may be tallied and compared to known distances between star constellations, at step 1212 to identify the constellation. Once the constellation may be identified beyond the acceptable threshold, the system 110 may check the date/time and directional orientation of the camera to geolocate the image data source, at step 1214. Accordingly, the constellation detection algorithm may map the constellation in order to determine what is the brightest celestial object(s) as input into the VAPN digital sextant.

In an embodiment, the shadow detection algorithm may be associated with the utilization of shadows to determine a more accurate position point because they provide a reference point that may be used to measure the position of other objects. For example, to determine the position of a tree, the shadow of the tree may be used to measure the angle of the sun. Once the angle of the sun is known, basic trigonometry may be used to calculate the position of the tree and store that in a virtual position point using Augmented Reality. In an embodiment, the shadows may be used in solar navigation to determine the position of the sun by measuring the length of the shadow of an object at a known time of day. Such length of the shadow may then be used to calculate the angle of the sun above the horizon and the position of the sun may be calculated using trigonometry. In another embodiment, the shadows may be used in triangulation to determine the distance between two objects by measuring the angle between the shadows of the two objects at a known time of day. Such measured angles between the shadows may then be used to calculate the distance between the two objects using trigonometry. In yet another embodiment, the shadows may be used in astronomical navigation to determine the position of stars by measuring the length of the shadow of an object at a known time of day. Such length of the shadow may then be used to calculate the altitude of the star above the horizon and once the altitude of the star is known, the position of the star may be calculated using trigonometry.

Figure 13A:
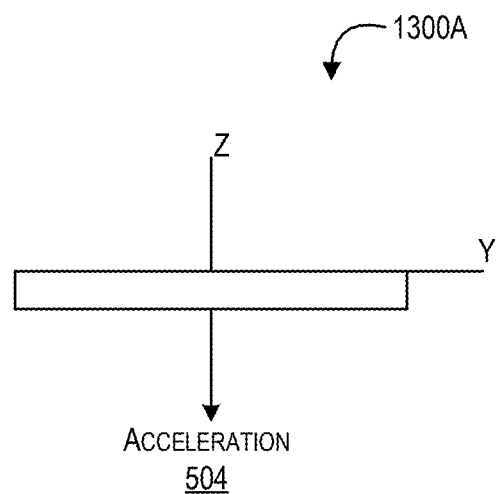
FIG. 13A illustrates a plane showing direction of acceleration in a y-z plane, in accordance with an embodiment of the present disclosure.
Figure 13B:
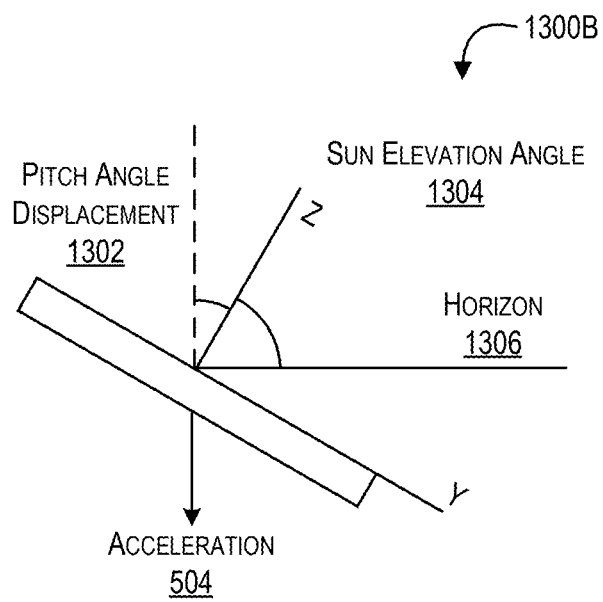
FIG. 13B illustrates a relation between pitch angle displacement, the sun elevation angle, horizon, and acceleration, in accordance with an embodiment of the present disclosure.

FIG. 13A illustrates a plane 1300A showing direction of acceleration in a y-z plane, in accordance with an embodiment of the present disclosure. FIG. 13B illustrates a relation 1300B between pitch angle displacement 1302, the sun elevation angle 1304, horizon 1306, and acceleration 504, in accordance with an embodiment of the present disclosure. For the sake of brevity, FIGS. 13A-13B have been explained together to discuss the digital sextant calculation.

In an embodiment, the digital sextant calculation may be utilized to calculate the user location by using the magnetic field position point to execute the digital sextant for predicting the celestial object's azimuth and elevation angle 1304 based on the pitch angle displacement 1302 and acceleration 504. Further, the magnetic field may be used to calibrate the sensors in the digital sextant by determining the true north. In an embodiment, if the user device 104 is outdoor then the sensors may be adjusted autonomously to compensate for any errors in their readings to improve the accuracy of the digital sextant. In operation, by following the instructions on the screen of the user device 104, the user 102 may follow an arrow that directs them to the celestial object (such as the sun) with the maximum luminous intensity of the camera sensor of the user device 104. In an embodiment, a spatial mapping may be used to track the angular displacement from the known orientation of the device to position the virtual horizon in AR and the latitude may be calculated using the angle determined between the celestial object and horizon 1306 when the declination of the celestial equator is 0 degrees. In some embodiments, a second celestial object with the next highest luminous intensity may be selected that is at least 30 degrees apart from the previous celestial object and the longitude may be calculated using the angle between the prime meridian and the Earth's surface at the device's location. The calculated latitude and the longitude may be utilized to derive the position point. In an embodiment, if the user device 104 is indoor then the AR VPP may be used to represent the celestial object using an API to retrieve real-time data of the object's position using the optimal time from open solar. The interface of the user device 104 may inform the user 102 to point the screen towards the AR VPP and this ARVPP is the position point. It may be noted that the second AR VPP may not be needed due to the accuracy of the data retrieved from the API.

Figure 14A:
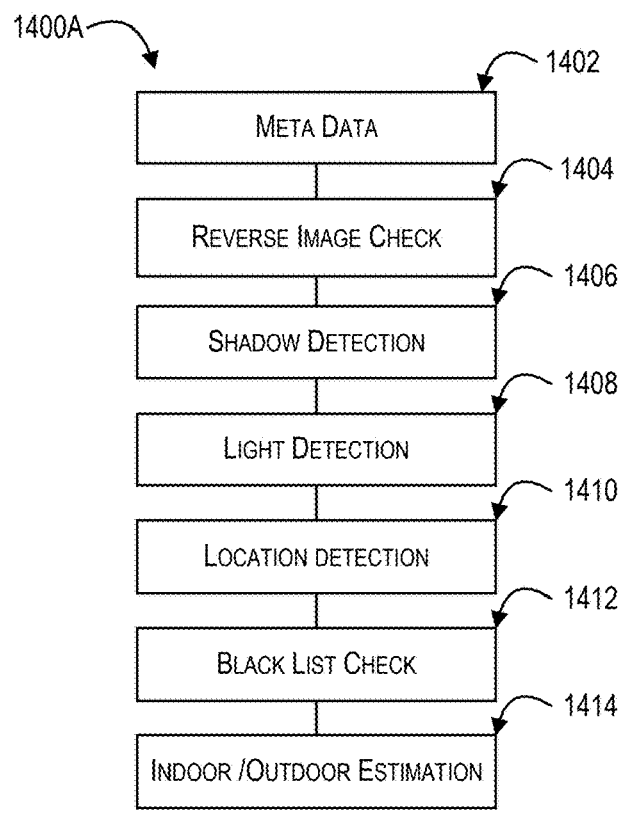
FIG. 14A illustrates a flow chart for estimation of whether the user is indoor or outdoor, in accordance with an embodiment of the present disclosure.
Figure 14B:
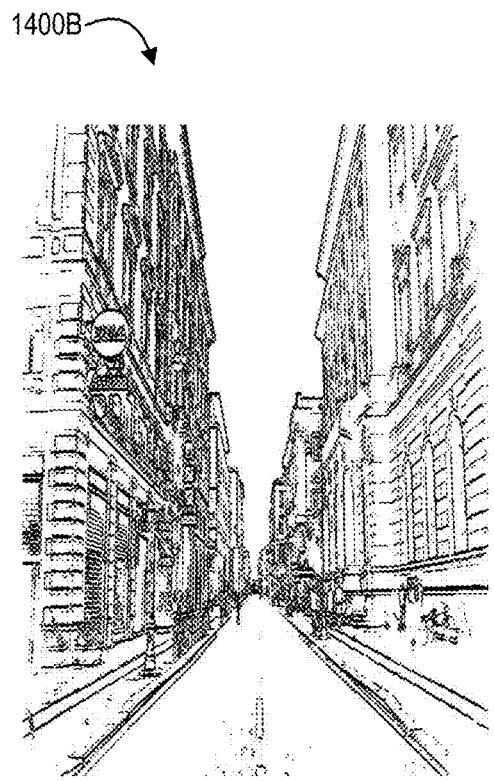
FIG. 14B illustrates an image showing various features in an environment for determining location of the user, in accordance with an embodiment of the present disclosure.

FIG. 14A illustrates a flow chart 1400A for estimation of whether the user 102 is indoor or outdoor, in accordance with an embodiment of the present disclosure. FIG. 14B illustrates an image 1400B showing various features in an environment for determining location of the user 102, in accordance with an embodiment of the present disclosure. For the sake of brevity, FIGS. 14A-14B have been explained together.

In an embodiment, the digital media algorithm may be utilized to identify whether the user is indoor or outdoor based on image, video, and 3D scan data.

At first, the system 110 may attempt to read the metadata of the file, as shown by box 1402, for the time the image 1400B was created and the location it was taken. Next, the system 110 may check the internet in a reverse image/video search to cross-reference the metadata, as shown by box 1404. In an embodiment, if there is no available metadata then the system 110 may attempt to find the first version uploaded to the internet and then processes the image through various filters to detect shadows, as shown by box 1406. Further, the detected shadow may be utilized to measure the shadow distance and direction using the shadow algorithm. Then, the system 110 may determine the light strength, as shown by box 1408, and the camera determines the light source direction using the camera sensor. Thereafter, the system 110 may utilize the best guess date and time from the metadata/reverse image search, weather data, and the light intensity to detect the location, as shown by box 1410. In order to detect the location, once the data and time are confirmed, the position of the sun (if available) may be compared against data from the digital map. Further, using the optimal time and time from the metadata/reverse image search, weather data, and the light intensity the system 110 may provide a probability of the location of the image. Additionally, upon blacklisting checking, as shown by box 1412, the system 110 may provide a probability if the image was taken indoors or outdoors based on the detection of one or more light sources and shadows, as shown by box 1414.

Figure 15A:
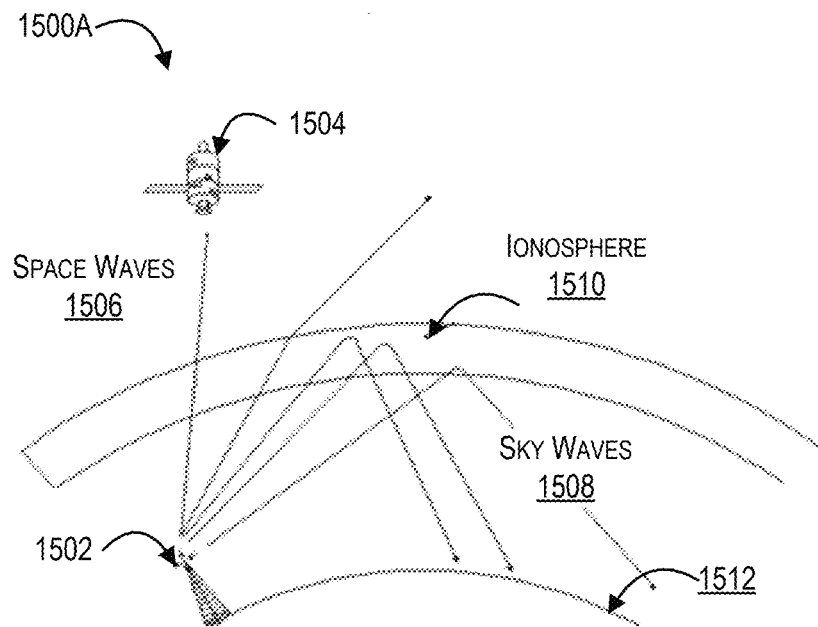
FIG. 15A illustrates transmission of radio signals through sky waves, in accordance with an embodiment of the present disclosure.
Figure 15B:
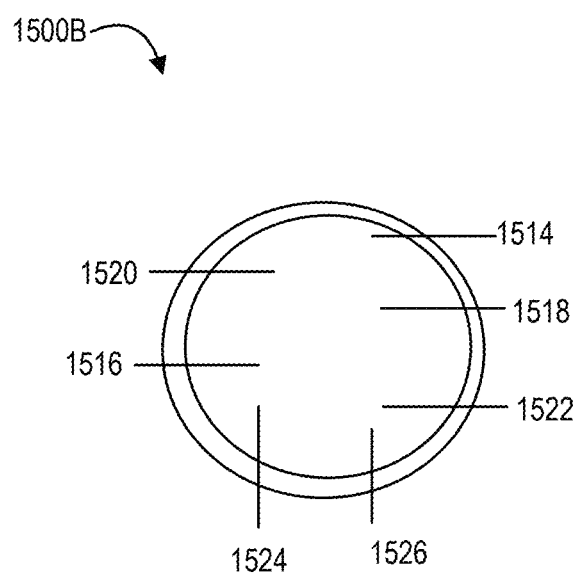
FIG. 15B illustrates a diagram of a Printed Circuit Board (PCB) containing core sensors, and wireless and Global Positioning System (GPS) components, in accordance with an embodiment of the present disclosure.
Figure 15C:
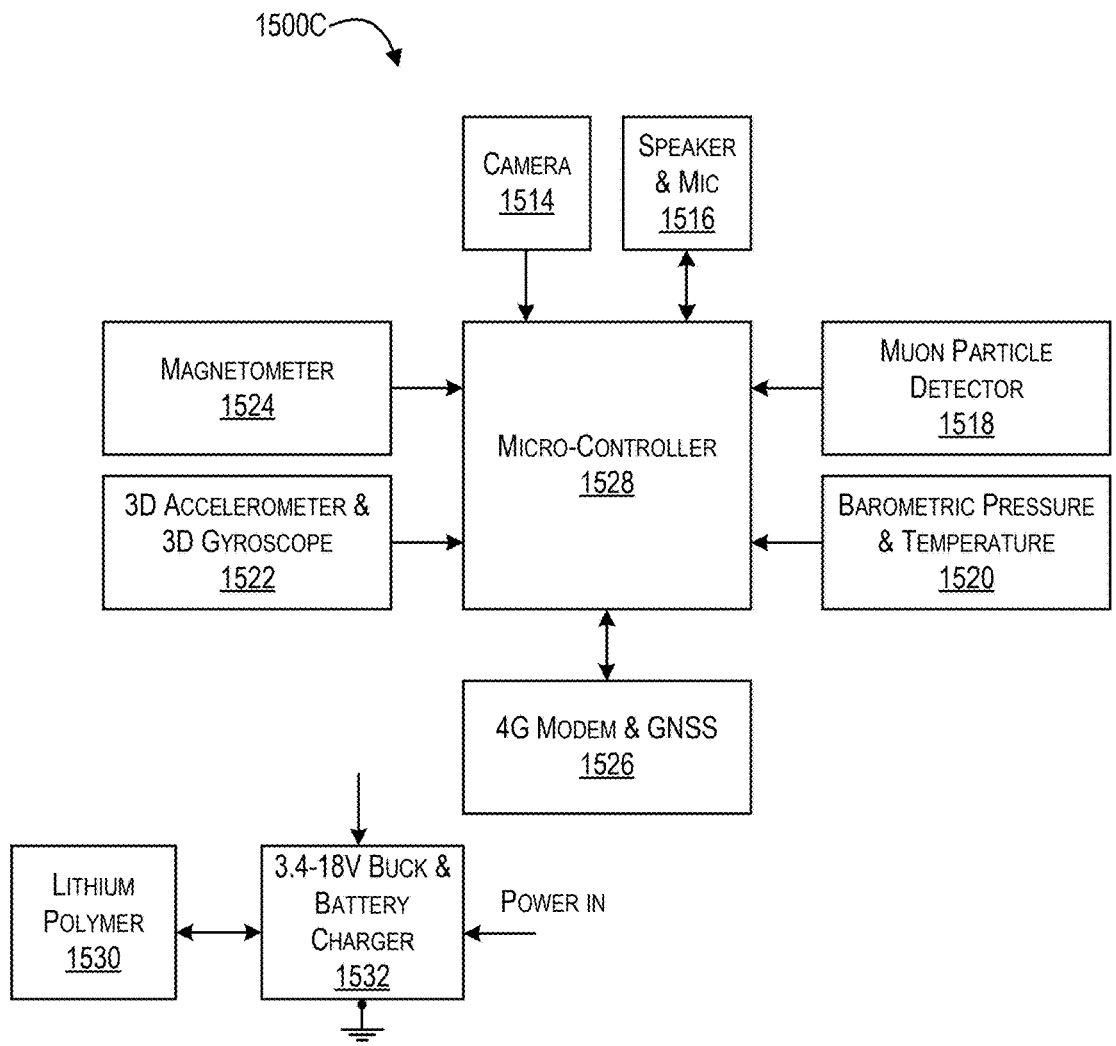
FIG. 15C illustrates a block diagram of the PCB, in accordance with an embodiment of the present disclosure.

FIG. 15A illustrates transmission 1500A of radio signals through sky waves 1508, in accordance with an embodiment of the present disclosure. FIG. 15B illustrates a diagram of a Printed Circuit Board (PCB) 1500B containing core sensors, and wireless and Global Positioning System (GPS) components, in accordance with an embodiment of the present disclosure. FIG. 15C illustrates a block diagram 1500C of the PCB, in accordance with an embodiment of the present disclosure. For the sake of brevity, FIGS. 15A-15C have been explained together.

In an embodiment, as illustrated in FIG. 15A, the system 110 may transmit data above ground, underground, and/or underwater without the use of satellites 1504, space waves 1506, or wireless technologies. Further, continuous communication may be enabled using ultra-wideband ionospheric scatter and high-frequency sky waves 1508 to extend mesh networks in parallel with ground station communications. In an embodiment, High-frequency (HF) waves may be coded into ultra-wideband (UWB) signals using direct sequence spread spectrum (DSSS) involving spreading the signal over a wider bandwidth than is necessary to transmit the data. In an embodiment, the data signal may be multiplied with a pseudorandom spreading sequence to spread the data signal out over a wider bandwidth using UWB modulation to make the data signal less susceptible to interference and jamming. Next, multiple data signals may be transmitted on the same frequency band without interfering with each other. Thereafter, a transmitter 1502, located on the ground 1512, sends a radio wave into the ionosphere 1510. Such radio waves may be refracted by the ionosphere 1510 and travel to a distant location. In an embodiment, the receiver of the receiving device may multiply the received signal with the same spreading sequence that was used to encode the data signal to recover the original data signal. In an embodiment, the ground station may transmit a DSSS signal. Further, the mesh network may be made up of ELF, HF, and THz, three different frequency bands. It may be noted that the ELF waves have frequencies in the range of 3 to 30 Hz and are the lowest frequency waves that can propagate through the Earth's atmosphere. The ELF waves may be used for underwater communication and navigation. Further, the HF waves have frequencies in the range of 3 to 30 MHz and are used for long-distance radio communication. Furthermore, the THz waves have frequencies in the range of 0.3 to 3 THz and are the highest frequency waves that can propagate through the atmosphere. The THz waves may be used for underground communications.

In an embodiment, as illustrated in FIGS. 15B and 15C, the PCB 1500B may include a camera 1514, a speaker and microphone 1516, a muon particle detector 1518, a barometric pressure and temperature detector 1520, a 3D accelerometer and 3D gyroscope 1522, a magnetometer 1524, a 4G model and GNSS 1526, a microcontroller 1528, a lithium polymer 1530, and a buck and battery charger 1532.

In an embodiment, the camera 514 may be used to collect data that can be used to improve location accuracy, such as the direction of the camera 1514 and the amount of light in the environment. This data can be used to improve the accuracy of the location algorithms by providing them with more context about the environment in which the image was taken. In an embodiment, the camera 1514 may measure RGB intensity on millions of pixels per frame. In an embodiment, the speaker and microphone 1516 may be used to collect other data that can be used to improve location accuracy, such as the direction of the sound source and the type of sound source. This data can be used to improve the accuracy of the location algorithms by providing them with more context about the environment in which the sound was recorded. In an embodiment, the microphone may measure sound intensity in an 8-channel stereo. In an embodiment, the device can be attached to an existing power supply or a separate battery. Alternatively, or additionally, a solar power attachment can be added to prolong the duration between charges. Further, the device may include input/output modules for common wired and wireless protocols including, but not limited to, radio frequencies, WiFi, Bluetooth, and Near-field communication. Further, the device may include a dedicated processor chip with an onboard clock to calculate the integrity of the GPS signal against installed module components. Further, the device may include an onboard GPS unit used as a baseline for GPS signals from satellites and two antennas capturing GPS signals used to determine the direction of the signal. In scenarios where the signal is not coming from the appropriate angle or strength, the data is flagged for possible spoofing/jamming and alerts the user.

In an embodiment, the compass and magnetometer may be utilized to measure the Earth's magnetic field by taking a calibrated measurement of each of the magnetic field vector's 3 components that can be combined to determine the direction of true north. Further, the device also includes an altimeter and barometer to determine altitude by measuring air pressure. For example, as altitude increases, air pressure decreases because the density of air is lower (thinner) at high altitudes. In an embodiment, the device may include a gravimeter for measuring the gravitational field of Earth at specific locations and acceleration due to gravity for measuring altitude and used to mathematically calculate Latitude as a redundancy check. In an embodiment, the device may include an accelerometer to measure proper acceleration i.e., the acceleration (the rate of change of velocity) of a body in its own instantaneous rest frame and may be different from coordinate acceleration, which is acceleration in a fixed coordinate system. In an embodiment, the device also includes a gyroscope to measure the angular rate of change and keeps track of angular position given a reference frame.

Figure 16:
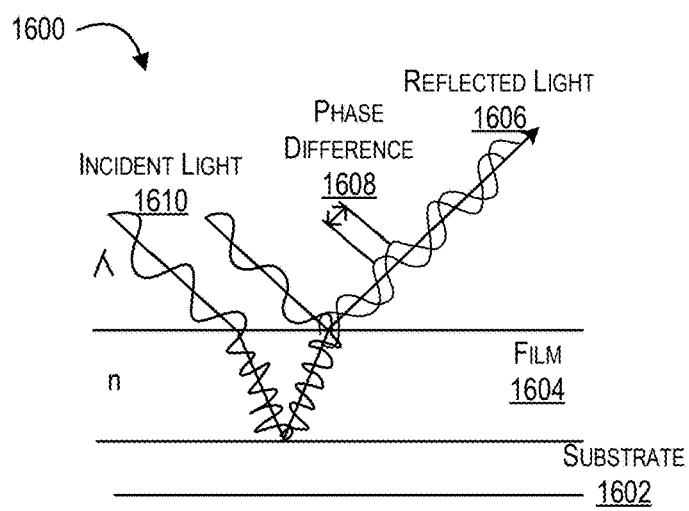
FIG. 16 illustrates movement of electromagnetic radiations that can be analyzed to infer properties of a surface, in accordance with an embodiment of the present disclosure.

FIG. 16 illustrates a movement 1600 of electromagnetic radiations that can be analyzed to infer properties of a surface, in accordance with an embodiment of the present disclosure. In an embodiment, the system 110 may automatically identify if a medical pill has been compromised using reflectance spectroscopy to determine the properties of a surface by measuring the light that is reflected from it and then measured. In an embodiment, a database may store the wavelength data from an FDA-approved medical pill and an "unknown" pill may be subjected to a beam of light 1610, from the device, of a wavelength is shone onto a film 1604 of a substrate 1602, and the amount of light that is reflected 1606 with phase difference 1608 may be measured by the device. The amount of light that is reflected may depend on the wavelength of the light from the properties of the surface of the "unknown" pill. Further, by measuring the amount of light that is reflected at different wavelengths, coded reflectance spectroscopy may be used to determine the optical properties of the surface of the "unknown" pill. The system 110 may determine if the measurement is an observation that lies an abnormal distance from the approved range in the stored data. If a pill was compromised in a way that causes the pill to have an unusual shine, the reflectance of the pill will be different from the reflectance of a stored data pill shine data that was manufactured in a typical way. This difference in reflectance may allow the system 110 to identify tampered medications. Similarly, the system 110 may be utilized to study the surfaces, such as the earth's surface or the surface of any other celestial body. In an embodiment, additional checks may be performed using the camera sensor to determine if a pill has any unusual patterns or features. In one scenario, if a pill has a coating, the reflectance of the pill will be different from the reflectance of a pill without a coating and this difference in reflectance can be used to identify pills that have been coated. In another scenario, if a pill has an unusual shape, the reflectance of the pill will be different from the reflectance of a pill with a regular shape and this difference in reflectance can be used to identify pills that have an unusual shape. Additionally, the information may be sent to a database to cross-reference the data and inform the user of the probability of contamination.

FIGS. 17A-17H illustrate various user interfaces pertaining to implementation of the system, in accordance with an embodiment of the present disclosure. For the sake of brevity, FIGS. 17A-17H have been explained together.

Figure 17A:
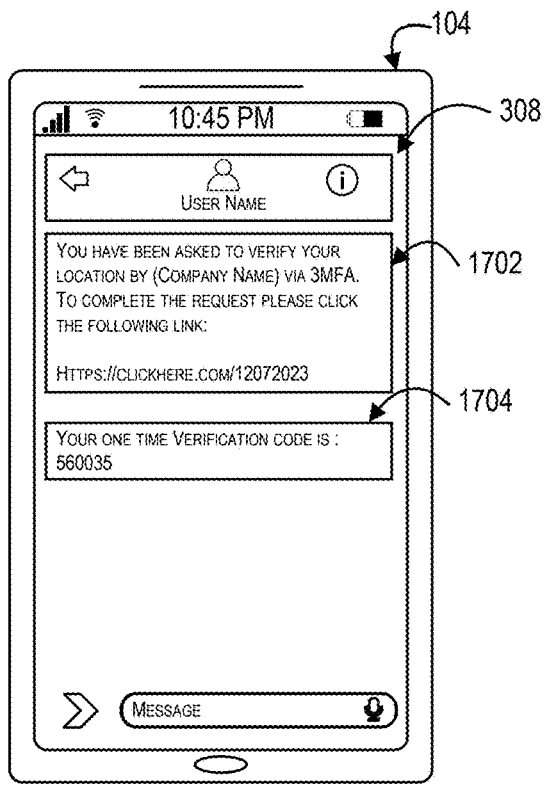
FIGS. 17A-17H illustrate various user interfaces pertaining to implementation of the system, in accordance with an embodiment of the present disclosure.
Figure 17B:
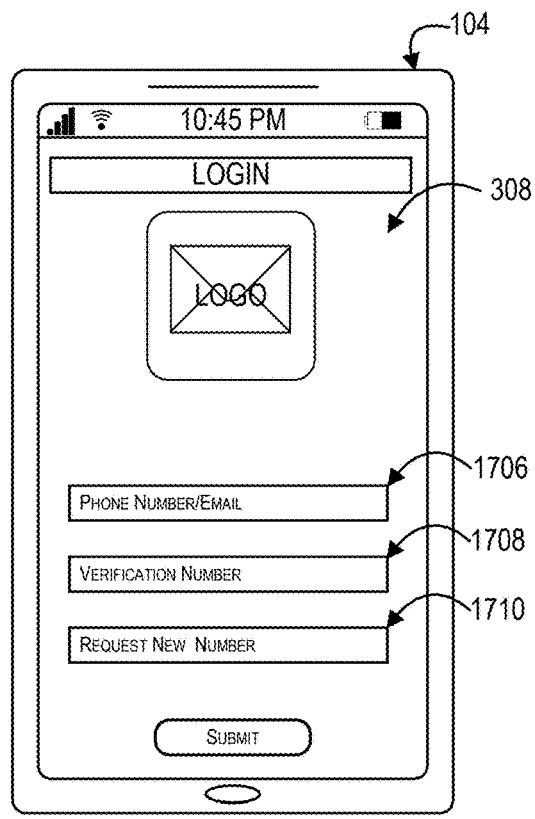
Figure 17C:
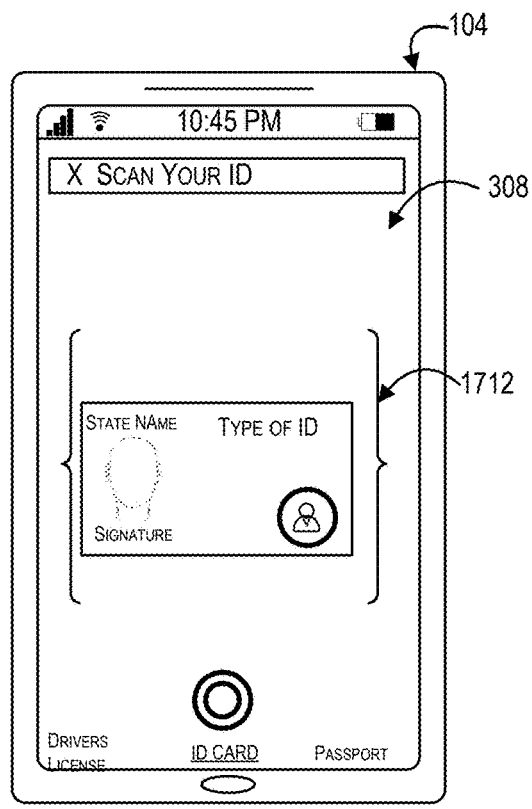
Figure 17D:
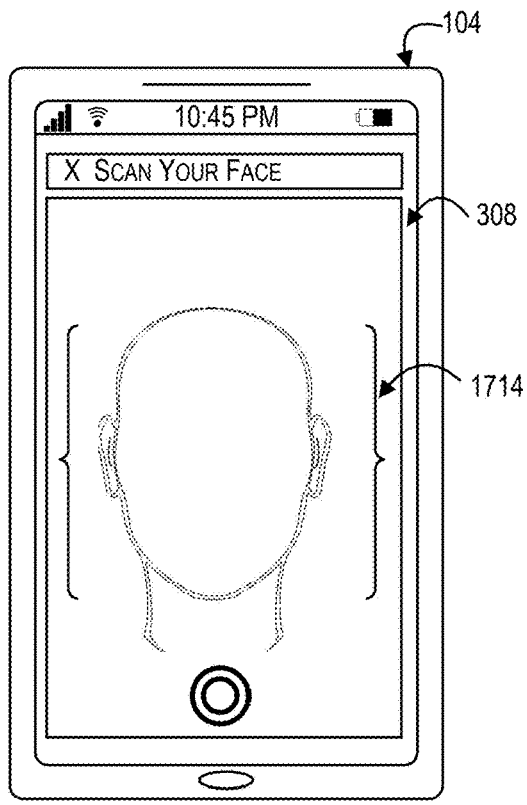
Figure 17E:
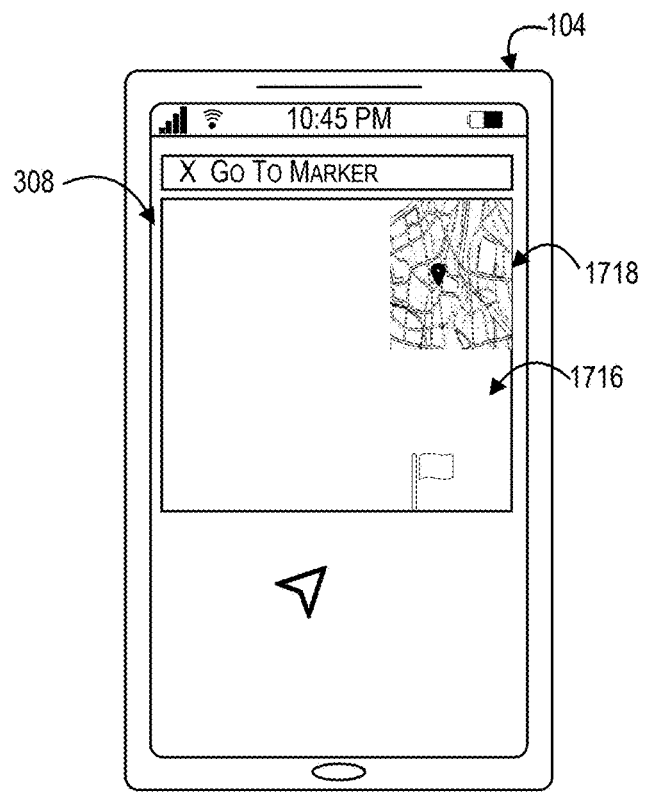
Figure 17F:
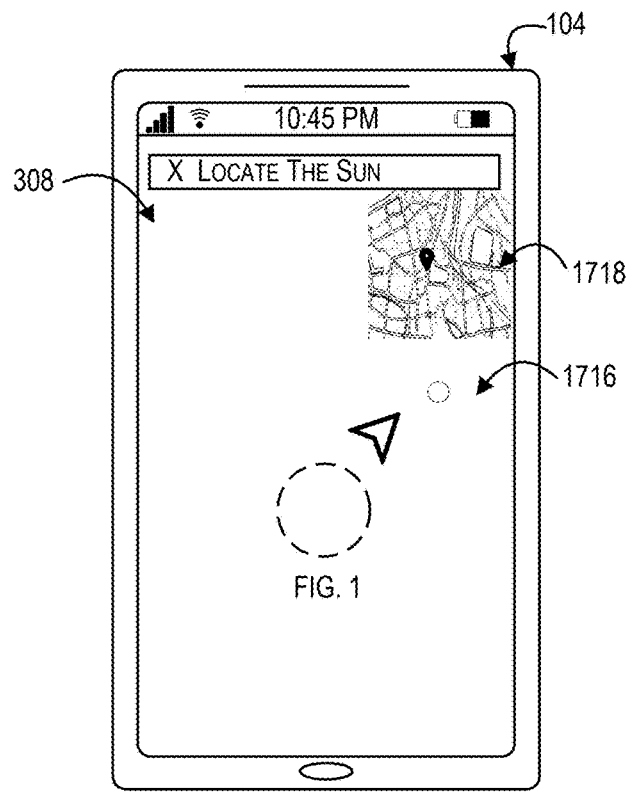
Figure 17G:
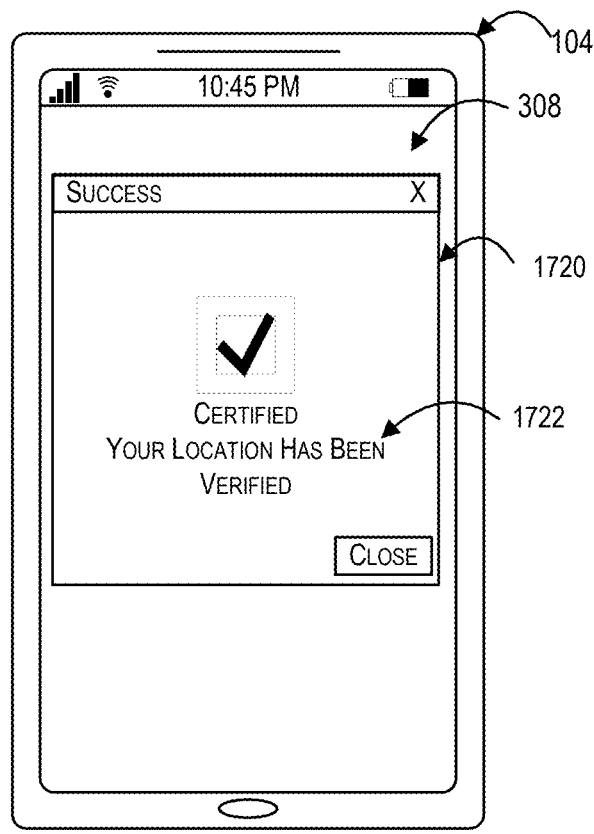
Figure 17H:
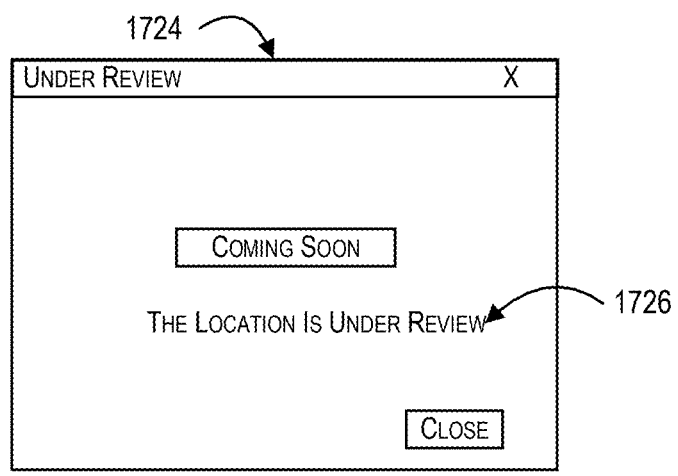

In case the user is not registered, as shown in interface 308 of FIG. 17A, the system 110 may prompt the user 102 to register with the VPN for verification of the location 1702. In an embodiment, for the registration, the user 102 may create new credentials and register his phone number/device with the VPN. When requested for the registration, a link (as shown by 1702 in the interface 308) may be sent to the user 102 via SMS or the like. Exemplary representation of an interface to input the user credential such as phone number/email 1706 is shown in interface 308 of FIG. 17B. In an embodiment, a first Multi-Factor Authentication (MFA) may be achieved via another other means of authentication, known to a person skilled in the art. For example, face recognition, fingerprint scanning, eye recognition, and so on may also be implemented to achieve the first MFA.

In an embodiment, the system 110 may perform the second MFA. Upon completing the first MFA, the user 102 may be redirected to a page to input a code that may be dynamically generated by the system 110 upon the completion of the first MFA. The generated code may be sent to registered user device 104 of the user 102 in real-time, as shown by 1704 in the interface 308 of FIG. 17A. The user 102 may input the code to achieve the second MFA as shown by 1708. In an embodiment, the code may be numeric. The code needs to be inputted into the system 110 with a predefined time limit, to avoid the expiry of the code. In an embodiment, the second MFA may fail when code is inputted incorrectly for a predefined number of times, or upon expiry of the code. However, the system 110 may facilitate an option to request number 1710. In an alternate embodiment, the second MFA may be achieved by sending an access link to the user device 104, where the user 102 needs to click the link to complete the second MFA. In an alternate embodiment, a notification to confirm that the user 102 is trying to log into the VPN is sent to the registered number of the user 102. One or more other means, known to a person skilled in the art, to verify the user 102 may be implemented to achieve the second MFA.

In an embodiment, the system 110 may perform user identity verification. Upon the second MFA, the system 110 may control the camera of the user device 104 to perform the user identity verification. The system 110 may turn ON the camera and bring a live stream session. If the user 102 does not have a scanned ID stored in the system 110, the system 110 may prompt the user to scan an ID 1712 of the user 102. Using computer vision, an application installed in the user device 104 may scan the ID placed in front of the camera as shown in interface 308 of FIG. 17C. Upon scanning, the system 110 may determine the type of the ID and retrieve data mentioned in the ID. The data may include the state/country the ID is issued from, ID number, details of the user, facial markers of the user 102, and so on. In an embodiment, the photograph of the user 102 may be scanned to retrieve the facial markers and eye color of the user 102 from the ID. In an embodiment, the retrieved data may be displayed to the user 102 and the user 102 may verify the details and store them in a database associated with the system 110. Further, in real-time, upon the second MFA, the user 102 may be prompted to scan the face 1714 as shown in interface 308 of FIG. 17D. With such scan, real-time facial parameters of the user 102 may be retrieved and compared with pre-stored facial markers to complete the user identity verification.

In an embodiment, the system 110 may perform a third MFA. Upon completion of the first MFA, the second MFA and the user identify verification, the third MFA may be initiated by the system 110. The user 102 may be instructed to go outdoors and capture an image of a celestial body. Rendezvous location for performing the third MFA may be the nearest safest location with an unobstructed view of the sky. Once the user 102 reaches the location, the system 110 may instruct the user to point at the brightest celestial object at the time of the verification request, as shown in interfaces 308 of FIG. 17E and FIG. 17F. During the daytime, the celestial object may be the sun. During the nighttime, the celestial object may be a moon, star, or visible planet. The celestial object and location of the user 102 are determined by the timestamp of the verification request and the GPS of the devices running the application related to the system 110. The determined data is streamed based on the system 110 via the application for the verification. In an embodiment, the determined data is cross references to publicly available cloud cover maps to identify acceptable luminosity, ambient audio levels, and other users' data. Based on the administrators' parameters, the user 102 may be approved for the grant to access the VPN as shown in interface 308 of FIG. 17G upon verification of the location of the user 102, as shown by 1722 in window 1720. In another embodiment, the system 110 may deny the access to the user 102 or put the user's location under review, as shown by 1726 in window 1724 of FIG. 17H.

Figure 18:
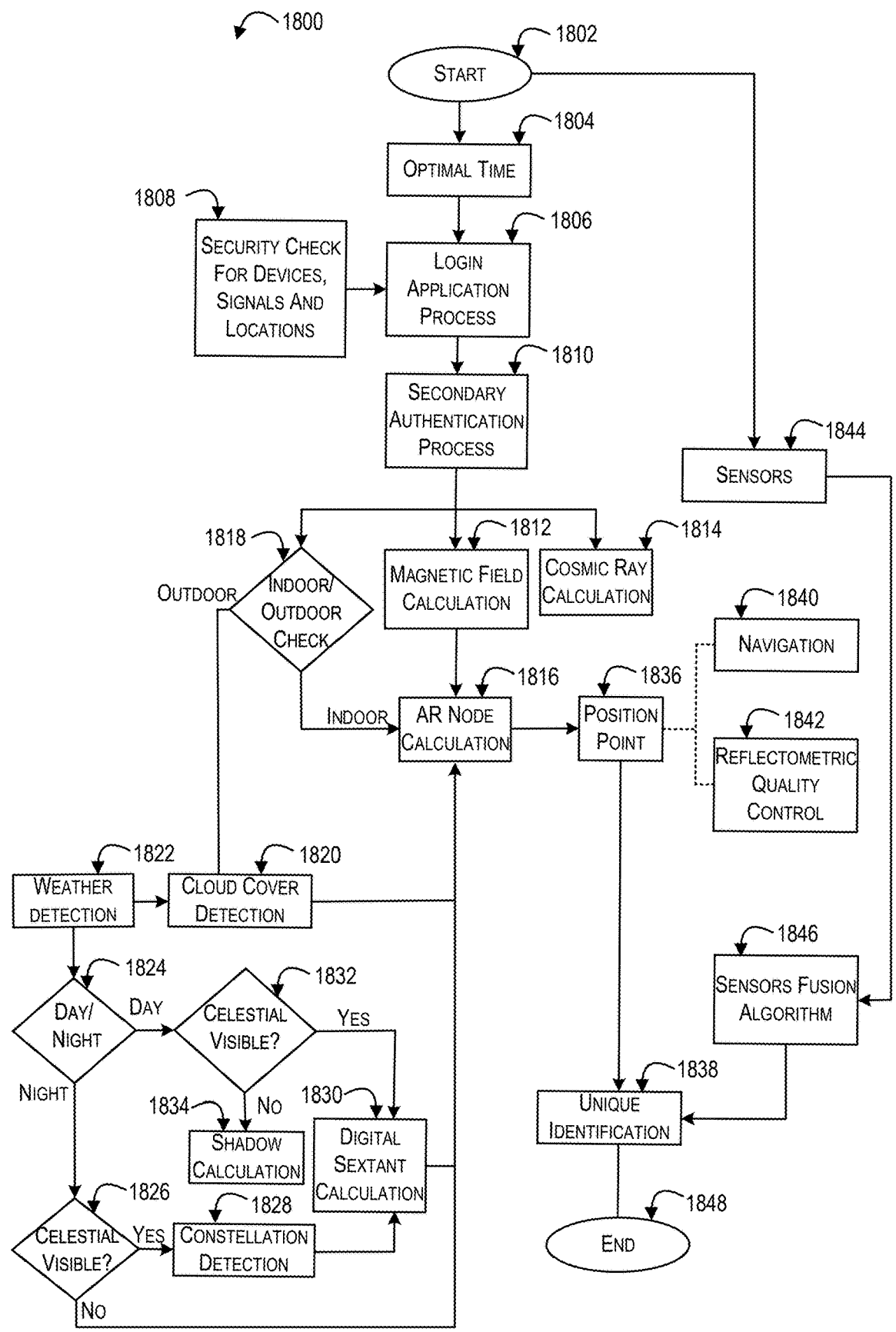
FIG. 18 illustrates a flowchart illustrating an exemplary operation of the system, in accordance with an embodiment of the present disclosure.

FIG. 18 illustrates a flowchart 1800 illustrating an exemplary operation of the system 110, in accordance with an embodiment of the present disclosure. The operation starts at 1802. In an embodiment, at first, the system 110 may determine an optimal time, as shown by box 1804, and may execute a login application process, as shown by box 1806. For the execution of the login application process 1806, the system 110 may also perform security checks for devices, signals, and location, as shown by box 1808. Then, the system 110 may secondary authentication process, as shown by box 1810. In an embodiment, upon performing the secondary authentication process, the system 110 may calculate the magnetic field, as shown by box 1812, and cosmic ray, as shown by box 1814. Additionally, the system 110 may check if the user device 104 is indoor/outdoor, as shown by box 1818, and may direct AR node calculation, as shown by box 1816, if the user device 104 is indoor. Further, if the user device 104 is outdoor, then the system 110 may perform cloud cover detection, as shown by box 1820, and weather detection, as shown by box 1822. Upon detecting the weather, the system 110 may detect whether it is day or night, as shown by box 1824. In one scenario, if its day then the system 110 may check if the celestial object is visible, as shown by box 1832, and calculate shadow if the celestial object is not visible, as shown by box 1834, or perform digital sextant calculation if the celestial object is visible, as shown by the box 1830. In another scenario, if its night then the system 110 may check if the celestial object is visible, as shown by box 1826, and may direct AR node calculation, as shown by box 1816, if no celestial object is visible, or perform digital sextant calculation if the celestial object is visible, as shown by the box 1830. Upon performing the digital sextant calculation, the system 110 may perform the AR node calculation to determine a position point, as shown by box 1836. In an exemplary embodiment, the determined position point may be used for navigation, as shown by box 1840, and reflectometric quality control, as shown by box 1842. In an embodiment, the position point may also be utilized for unique identification of the user device, as shown by box 1838. In another embodiment, the position point may be used together with the location detected via sensors 1844 and the sensors fusion algorithm 1846 for uniquely identifying the user device 104. The operation may end at 1848.

Figure 19:
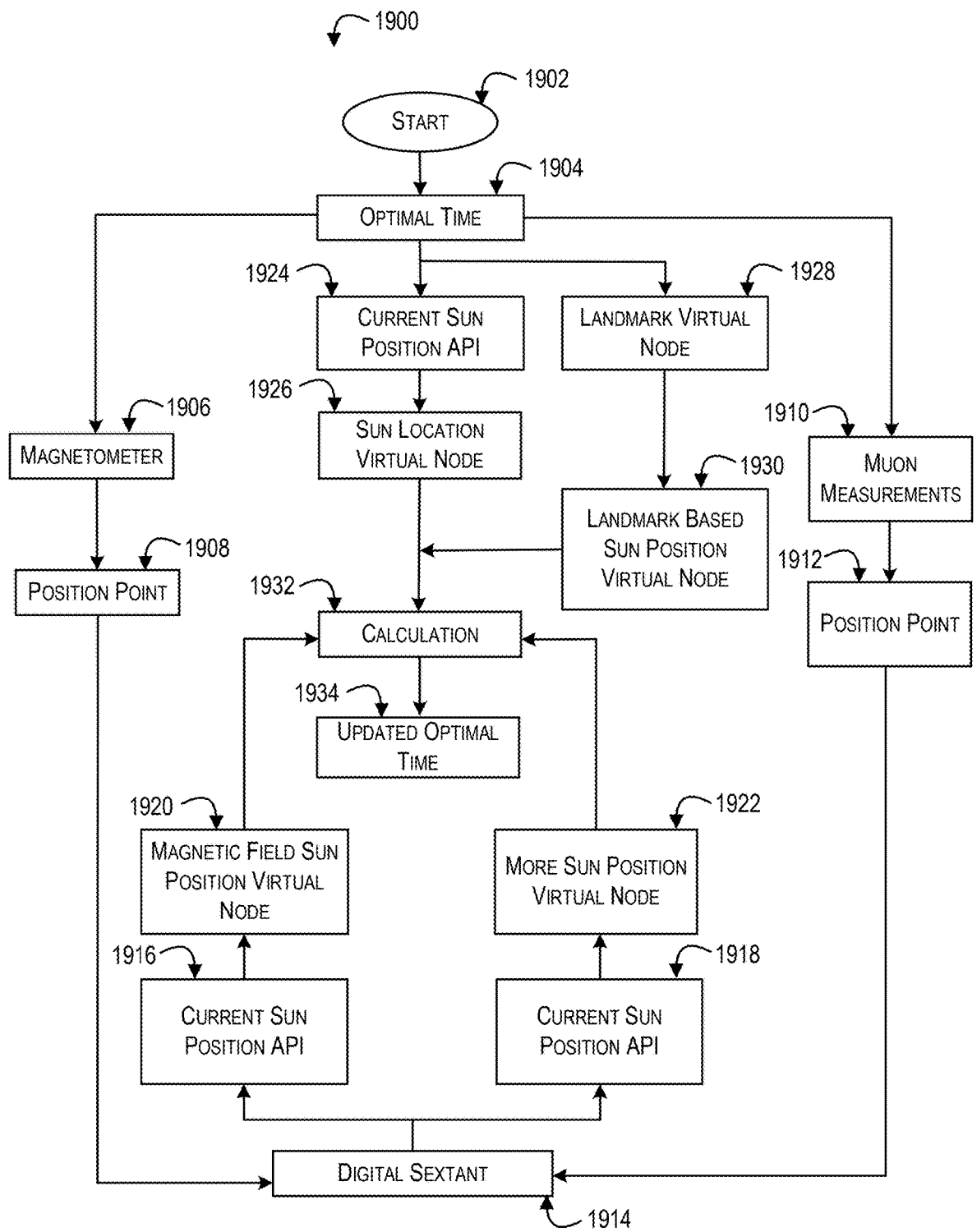
FIG. 19 illustrates a flowchart illustrating another exemplary operation of the system to update optimal time, in accordance with an embodiment of the present disclosure.

FIG. 19 illustrates a flowchart 1900 illustrating another exemplary operation of the system 110 to update optimal time, in accordance with an embodiment of the present disclosure. The operation starts at 1902. In an embodiment, at first, the system 110 may determine an optimal time, as shown by box 1904. Upon calculating the optimal time, the magnetometer 1906 may be used to calculate the first position point 1908 and a muon measure measurement 1910 may be used to calculate the second position point 1912. Then, the first position point 1908 and the second position point 1912 may be provided to the digital sextant, as shown by box 1914, to calculate the current sun position API 1916, 1918. In one scenario, the calculated current sun position API 1916 may be provided to the magnetic field sun position virtual node for outputting the first-time coefficient, as shown by box 1920. In another scenario, the calculated current sun position API 1918 may be provided to more sun position virtual nodes for outputting a second-time coefficient, as shown by box 1922. Additionally, a current sun position API may be calculated upon calculation of the optimal time at 1904, as shown by box 1924, and may be provided to the sun location virtual node, as shown by box 1926, for outputting a third-time coefficient. Additionally, upon calculation of the optimal time at 1904, the landmark virtual node may also be executed, as shown by box 1928, followed by a landmark-based sun position virtual node, as shown by box 1930, to correlate with the third time coefficient. In an embodiment, the first-time coefficient, the second-time coefficient, and the correlated third-time coefficient may be used for performing calculation 1932 to obtain updated optimal time 1934.

Figure 20:
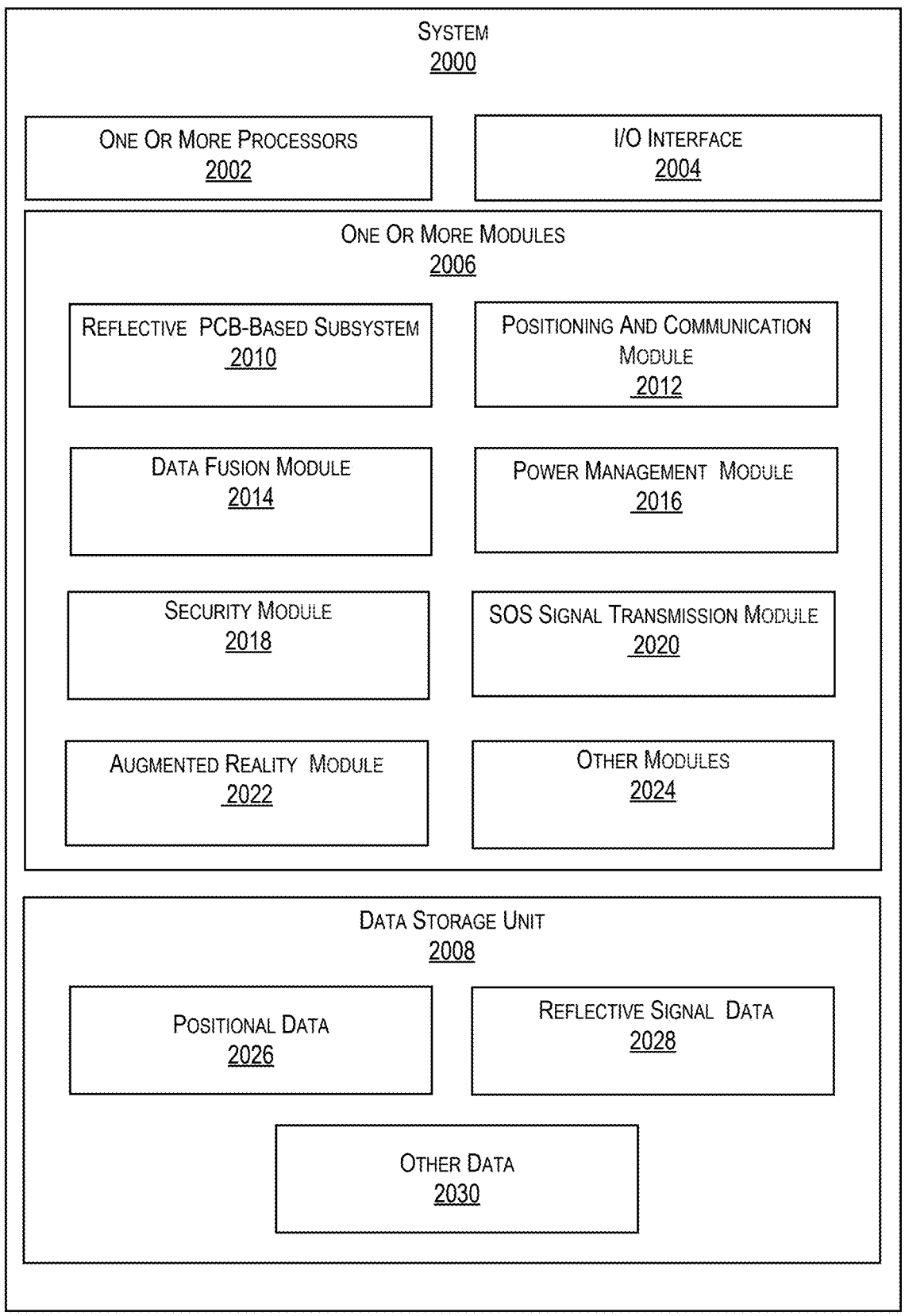
FIG. 20 illustrates a block diagram for the system for providing location-based positioning and navigation in GPS-denied environments, in accordance with an embodiment of the present disclosure.

FIG. 20 illustrates a block diagram for the system 2000 for providing location-based positioning and navigation in GPS-denied environments, in accordance with an embodiment of the present disclosure. In an embodiment, the system 2000 may include one or more processors 2002, an Input/Output (I/O) interface 2004, one or more modules 2006, and a data storage unit 2008. The one or more processors 2002 may be implemented as one or more microprocessors microcomputers, microcomputers, digital signal processors, central processing units, state machines, logic circuitries, and/or any devices that manipulate signals based on operational instructions. Further, the I/O interface 2004 may serve as the pivotal bridge connecting the internal processes of the system 2000 with its external environment for facilitating the exchange of information between the system 2000 and its users or external devices. Furthermore, the I/O interface 2004 may contribute to the user experience by providing intuitive means for input, such as through keyboards or touchscreens, and presenting meaningful output via displays or other output devices. In an embodiment, the one or more modules 2006 may include a reflective PCT-based subsystem 2010, a positioning and communication module 2012, a data fusion module 2014, a power management module 2016, a security module 2018, an SOS signal transmission module 2020, an augmented reality module 2022, and any other module 2024 essential or required for the working of the system 108. In an embodiment, the data storage unit 2008 may include the positional data 2026, reflective signal data 2028, and any other data 2030 required for the working of the system 108. In an embodiment of the present disclosure, the one or more processors 2002 and the data storage unit 2008 may form a part of a chipset installed in the system 108. In another embodiment of the present disclosure, the data storage unit 2008 may be implemented as a static memory or a dynamic memory. In an example, the data storage unit 2008 may be internal to the system 2000, such as an onside-based storage. In another example, the data storage unit 2008 may be external to the system 2000, such as cloud-based storage. Further, the one or more module 2006 may be communicatively coupled to the data storage unit 2008 and the one or more processor 2002 of the system 2000. The one or more processors 2002 may be configured to control the operations of the one or more modules 2006.

In an embodiment, the positional data 2026 may correspond to information that determines the physical location of an object or user within a specific area or environment. In GPS-denied environments, this data is derived from alternative technologies such as time-domain reflectometry (TDR), very low frequency (VLF) signals, ultra-wideband (UWB) communication, or other spatial sensing methods. Positional data is typically processed in real time to provide accurate location information for navigation and tracking purposes. Further, the reflective signal data 2028 may correspond to the information obtained from signals that are reflected off surfaces or objects within an environment. This data is used to calculate distances or determine locations by measuring the time delay (in time-domain reflectometry, for instance) or analyzing the strength of reflected signals. Reflective signal data plays a critical role in environments where direct line-of-sight signals, such as GPS, are unavailable, allowing for the mapping and positioning of objects or individuals. In an embodiment, the other data 2030 may include communication protocol data corresponding to the set of rules, formats, and parameters governing the exchange of information between different modules or devices within the system. in the context of a gps-denied positioning system, communication protocol data includes details about how signals (e.g., vlf, uwb, or other radio frequencies) are transmitted, received, and interpreted. this data ensures that all system components can reliably communicate, coordinate, and share information for positioning, navigation, and data fusion. In another embodiment, the other data 2030 may include security authentication data corresponding to the information and credentials used to verify the identity of users or devices interacting with the system. this data ensures that access to positional, navigation, or communication functions is restricted to authorized entities. security authentication data may include encryption keys, user credentials, digital certificates, or biometric information, and it plays a critical role in protecting the system from unauthorized access, tampering, or malicious activity.

In an embodiment, the reflective printed circuit board (PCB) subsystem 2010 may incorporate integrated traces for Time Domain Reflectometry (TDR) analysis for generate reflection points, facilitating indoor location tracking through varying impedance levels. Further, one or more fractal antennas may be included on the PCB 2010 to support multi-band and wide-band capabilities, improving signal reception and transmission for VLF and UWB modes. The transition between VLF and UWB modes may be managed by an adaptive protocol framework that continuously assesses environmental factors, signal quality, and operational needs to ensure smooth navigation and communication. Further, the reflective PCB subsystem 2010 may feature trace geometry and material selection optimized for TDR-based signal reflection, ensuring accurate distance measurement and enhanced navigation indoors.

In an embodiment, the positioning and communication module 2012 may receive reflection data and operate in either Very Low Frequency (VLF) or Ultra-Wideband (UWB) modes, selected based on environmental conditions and application requirements as determined from the reflection data. The positioning and communication module 2012 may facilitate accurate location tracking and reliable navigation by continuously adapting its operational mode to optimize performance, ensuring seamless communication and positioning even in GPS-denied environments. Thus, the positioning and communication module 2012 may integrate advanced protocols and enhance signal quality and maintains communication integrity, crucial for effective indoor positioning and navigation solutions.

In an embodiment, the data fusion module 2014 may integrate location tracking information from both VLF and UWB modes, enhancing the accuracy and reliability of the positioning and navigation data. By analyzing this diverse data, the data fusion module 2014 may improve the overall precision of the positioning solution, ensuring that users receive the most accurate navigational information possible. Further, the data fusion module 2014 may integrate additional data from environmental sensors, such as accelerometers, gyroscopes, and magnetometers, to enhance positioning accuracy in conditions with magnetic anomalies or underground environments. Such integration may further refine positioning accuracy, especially in challenging environments with magnetic anomalies or other obstacles and allows for a more robust and reliable navigation experience in GPS-denied areas.

In an embodiment, the power management module 2016 may optimize power consumption by adjusting operational modes in real time, based on environmental factors, thus extending battery life while maintaining signal integrity and navigation precision. The power management module 2016 may dynamically adjust operational modes based on real-time environmental factors, ensuring that the system can operate efficiently while maximizing battery life. In an embodiment, the power management module 2016 may employ energy efficiency protocols to maximize device longevity, operating in low-power VLF mode and higher-power UWB mode as required. Such adaptability not only extends the device's longevity during continuous use but also maintains signal integrity and navigation precision, providing users with reliable performance without compromising power efficiency.

In an embodiment, the security module 2018 may employ advanced error correction codes and automatic repeat request strategies to ensure data integrity. The security module 2018 may employ advanced error correction codes and automatic repeat request strategies to ensure that data transmitted over Very Low Frequency (VLF) and Ultra-Wideband (UWB) channels remains intact and reliable. Further. the security module 2018 may utilize AES-256 encryption and frequency hopping techniques for secure data transmission across VLF and UWB channels. Thus, by prioritizing both data security and communication reliability, the security module 2018 may ensure that users can trust the system in critical applications where the protection of sensitive information is paramount.

In an embodiment, the SOS signal transmission module 2020 may transmit SOS signals through UWB and VLF communication channels, allowing emergency signals to include SOS messages, location data, and environmental information. The SOS signal transmission module 2020 may send emergency signals that include not only a standard SOS alert but also essential location and environmental data, ensuring that first responders or designated contacts can receive real-time information about the user's situation. By leveraging the system's advanced positioning capabilities, the SOS signal transmission module 2020 may enhance the chances of prompt assistance in GPS-denied environments, ultimately improving safety and response times during emergencies. In an embodiment, a user interface may display real-time operational status and enables users to select between VLF and UWB modes based on specific navigation scenarios.

In an embodiment, the augmented reality (AR) module 2022 may enhance the user experience by overlaying critical navigational data and environmental information directly onto the user's display. This innovative feature provides a real-time, immersive view that helps users navigate effectively in challenging environments where traditional GPS signals may be unavailable. Leveraging advanced generative AI (GenAI), the AR module 2022 may dynamically adjusts the content displayed based on current environmental conditions and user interactions, ensuring that the information remains relevant and contextually appropriate. By integrating AR with location-based services, users benefit from an intuitive and interactive navigation experience that enhances situational awareness and facilitates more informed decision-making while on the move.

Figure 21:
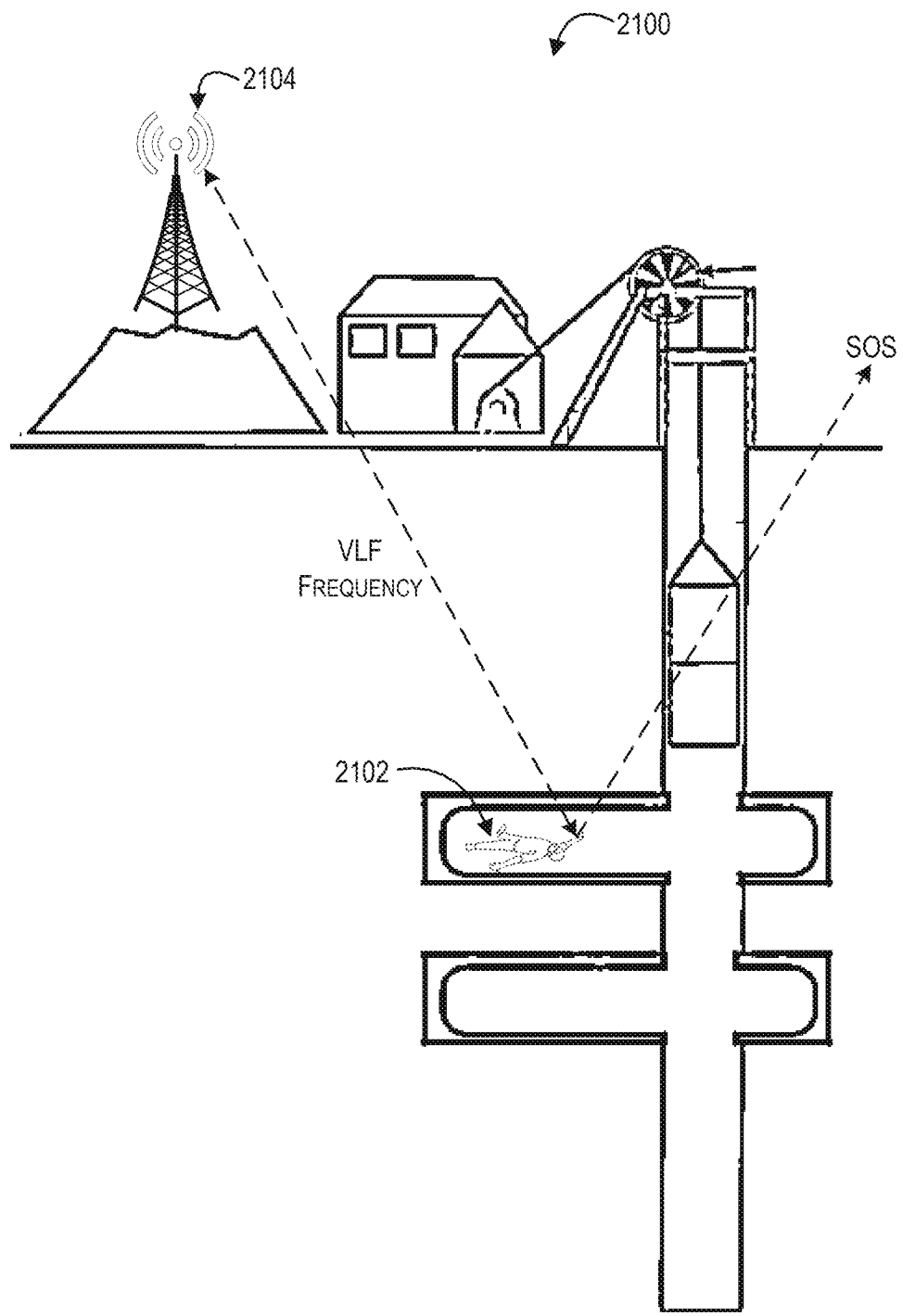
FIG. 21 illustrates an exemplary scenario of a user stuck in challenging environment; in accordance with an embodiment of the present disclosure.

FIG. 21 illustrates an exemplary scenario 2100 of a user stuck in challenging environment; in accordance with an embodiment of the present disclosure.

In an illustrated scenario, where a user 2102 is stuck in a cave and needs to send an SOS signal, the integrated system within a user device such as a mobile phone or a smart watch activates a series of automated processes designed for emergency situations. Upon realizing the user 2102 is in distress, the system's sensors detect environmental factors, such as reduced visibility and limited connectivity, which trigger the SOS signal transmission protocol.

At first, the system may analyze the cave's indoor environment using Time Domain Reflectometry (TDR) to establish reflection points through physical anchor points like time signal transmitter 2104, which helps determine the user's precise location within the cave. This data may then be processed by the positioning and communication module, which may evaluate whether to operate in Very Low Frequency (VLF) or Ultra-Wideband (UWB) mode, depending on signal integrity and the surrounding conditions. Next, the SOS signal transmission module may prepare an emergency message that includes the user's location data and environmental conditions. Utilizing the selected communication mode, the system may securely transmit the SOS signal along with vital information, employing advanced error correction codes and AES-256 encryption to ensure data integrity and security during transmission. Simultaneously, the user interface may display a real-time operational status, reassuring the user that their SOS signal is being sent successfully. In an embodiment, the augmented reality (AR) module may also assist by highlighting potential exit routes or safe paths based on the user's current location and environmental context, providing visual cues that guide the user while they await rescue.

Figure 22:
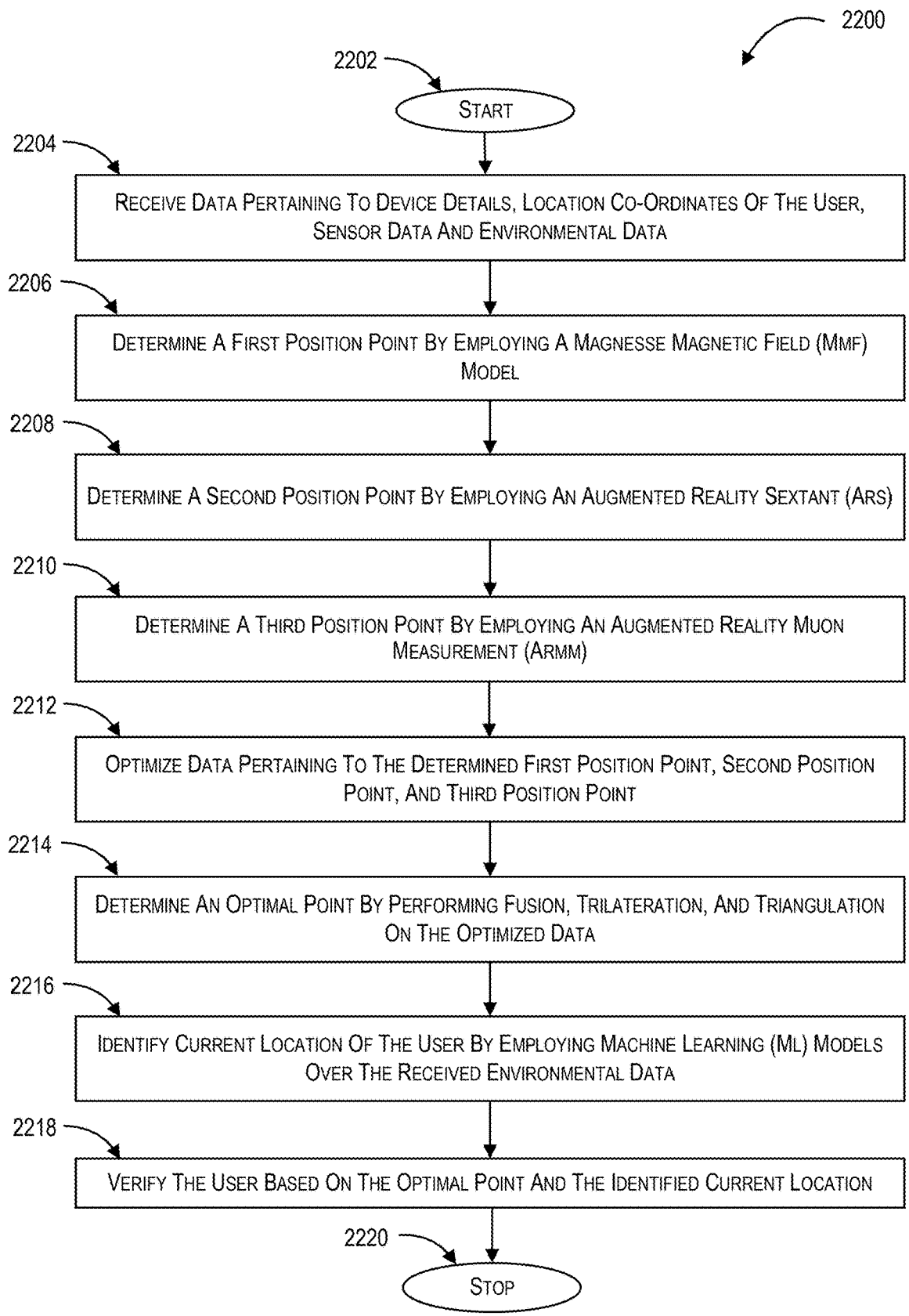
FIG. 22 illustrates a flowchart illustrating a method for location-based security verification of users, in accordance with an embodiment of the present disclosure.

FIG. 22 illustrates a flowchart 2200 illustrating a method for location-based security verification of users. The method starts at step 2202.

At first, data from a user device may be received, at step 2204, in response to clicking a verification link. The data may be associated with device details, location co-ordinates of the user, sensor data, and/or environmental data. Upon receiving the data from the user device, the method may include the steps of analyzing the received device details to ascertain user device root access, user device developer mode access, latitude, longitude, altitude, speed, accuracy, time, Wireless Fidelity (Wi-Fi) signals, Bluetooth beacons, and/or Global Positioning System (GPS) signals. Based on the results of the analysis of the received device details, the method may include the steps of determining the probability of authenticity of the user device, signals, and/or location. Additionally, the method may include the steps of calculating Optimal Time (OT) for improving accuracy of GPS position data and/or accounting for variations in the analysis that could result from differences in time. Thereafter, the method may include the steps of creating a digital map by employing an ML model to collect, store, and analyze spatial data to increase accuracy of analysis.

At step 2206, a first position point by employing a Magnesse Magnetic Field (MMF) model may be determined. The calculation of the first position point may further include the steps of reading magnetometer measurements from the sensor data over the calculated OT and calculating inclination and declination of the magnetic field over the read magnetometer measurements. Upon calculation of the inclination and declination, the method may include the steps of calculating the latitude and longitude corresponding to the first position point using the calculated inclination and declination of the magnetic field over an International Geomatic Reference Field (IDRF) table.

At step 2208, a second position point by employing an Augmented Reality Sextant (ARS) may be determined. The determination of the second position point may further include determining if the user device is indoor or outdoor using a camera sensor, microphone sensor, strength of GPS signal, strength of wireless signal, strength of cellular signal; Wi-Fi SSID, and/or location relevant to an existing virtual position point on digital maps. Then, the method may include the steps of receiving one or more images pertaining to the sky from a camera of the user device and determining one or more constellations by employing a cloud cover detection model and/or constellation detection model. Upon determining one or more constellations, the method may include the steps of receiving an image associated with a shadow of an object and measuring the angle of the sun based on the determined one or more constellations and/or the received image using a digital sextant. Thereafter, the method may include the steps of calculating latitude and longitude corresponding to the second position point based on the measured angle of the sun.

At step 2210, a third position point by employing an Augmented Reality Muon Measurement (ARMM) may be determined. The determination of the third position point may further include the steps of determining two or more Augmented Reality Virtual Position Points (ARVPPs) relevant to the current position using a digital map. The two or more ARVPPs may be calculated using speed of muons to measure the time it would take for the muons to travel from the two or more ARVPPs to the user device's current location. Thereafter, the method may include the steps of calculating the third position point based on the determined two or more ARVPPs.

At step 2212, data pertaining to the determined first position point, second position point, and/or third position point may be optimized. Upon optimizing the data, an optimal point may be determined, at step 2214, by performing fusion, trilateration, and/or triangulation on the optimized data pertaining to the determined first position point, second position point, and/or third position point. Alternatively, or additionally, a current location of the user may be identified, at step 2216, by employing one or more Machine Learning (ML) models over the received environmental data. Thereafter, the user may be verified, at step 2218, based on the optimal point and the identified current location.

In some embodiments, the method may further include the steps of calculating location and direction based on the optimized data pertaining to the determined first position point, second position point, and/or third position point.

In some embodiments, the method may further include the steps of transmitting data from the user device by the steps of forming a signal that is spread over a wider bandwidth than necessary to transmit the data. Upon forming the signal, the method may include the steps of multiplying the formed signal with a pseudorandom spreading sequence to spread the formed signal out over a wider bandwidth using an Ultra-WideBand (UWB) modulation. Thereafter, the method may further include the steps of sending a radio wave, having the multiplied signal, to the ionosphere that is refracted by the ionosphere for traveling to a distant location to a receiving device. It may be understood that receiver of the receiving device multiplies received radio wave with the same pseudorandom spreading sequence that was used for multiplying the signal to receive the data. The method ends at step 2220.

Figure 23:
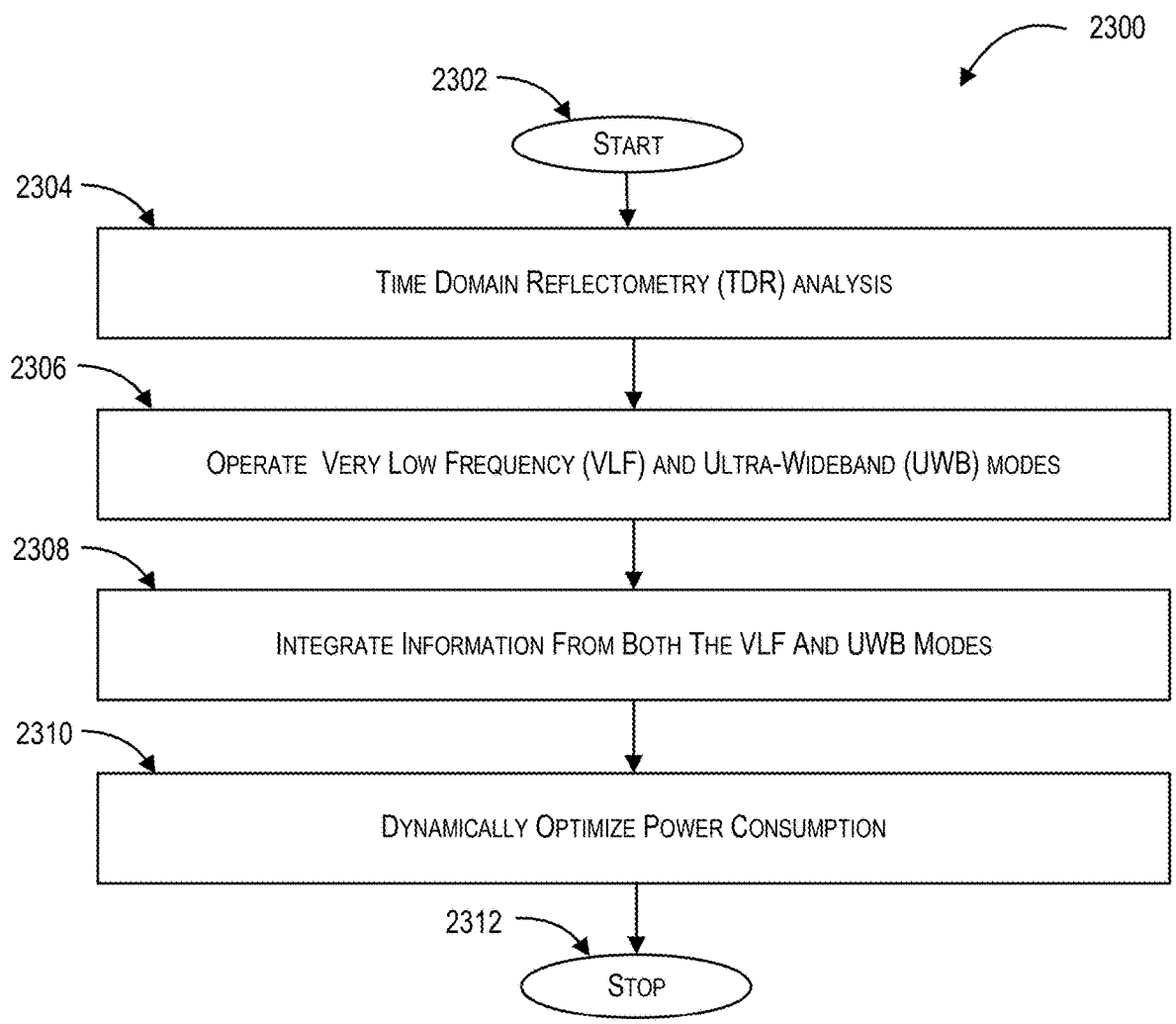
FIG. 23 illustrates a flowchart illustrating a method for providing location-based positioning and navigation in GPS-denied environments, in accordance with an embodiment of the present disclosure.

FIG. 23 illustrates a flowchart 2300 illustrating a method for providing location-based positioning and navigation in GPS-denied environments, in accordance with an embodiment of the present disclosure. The method starts at step 2302.

At first, varying impedance levels may be Time Domain Reflectometry (TDR) analyzed for generating reflection points for indoor location tracking, at step 2304. Further, the method may include the steps of supporting multi-band and wide-band capabilities, improving signal reception and transmission for VLF and UWB modes. The transition between VLF and UWB modes may be managed by an adaptive protocol framework that continuously assesses environmental factors, signal quality, and operational needs to ensure smooth navigation and communication. Further, the method may include the steps of featuring trace geometry and material selection optimized for TDR-based signal reflection, ensuring accurate distance measurement and enhanced navigation indoors.

Next, at step 2306, the reflection data nay be received and operated in either Very Low Frequency (VLF) or Ultra-Wideband (UWB) modes, selected based on environmental conditions and application requirements as determined from the reflection data.

Next, at step 2308, location tracking information may be integrated from both VLF and UWB modes, enhancing the accuracy and reliability of the positioning and navigation data. Further, the method includes the steps of integrating additional data from environmental sensors, such as accelerometers, gyroscopes, and magnetometers, to enhance positioning accuracy in conditions with magnetic anomalies or underground environments.

Next, at step 2310, power consumption may be optimized by adjusting operational modes in real time, based on environmental factors, thus extending battery life while maintaining signal integrity and navigation precision. In an embodiment, the power management module may employ energy efficiency protocols to maximize device longevity, operating in low-power VLF mode and higher-power UWB mode as required.

In an embodiment, the method may include the steps of employing advanced error correction codes and automatic repeat request strategies to ensure data integrity, complemented by AES-256 encryption and frequency hopping techniques for secure data transmission across VLF and UWB channels. Further the method may include the steps of transmitting SOS signals through UWB and VLF communication channels, allowing emergency signals to include SOS messages, location data, and environmental information. In an embodiment, a user interface may display real-time operational status and enables users to select between VLF and UWB modes based on specific navigation scenarios. In an embodiment, the method may also include the steps of overlaying navigational data and environmental information onto a user's display, with GenAI dynamically adjusting AR content in response to real-time environmental conditions and user interactions. The method may end at step 2312.

Figure 24:
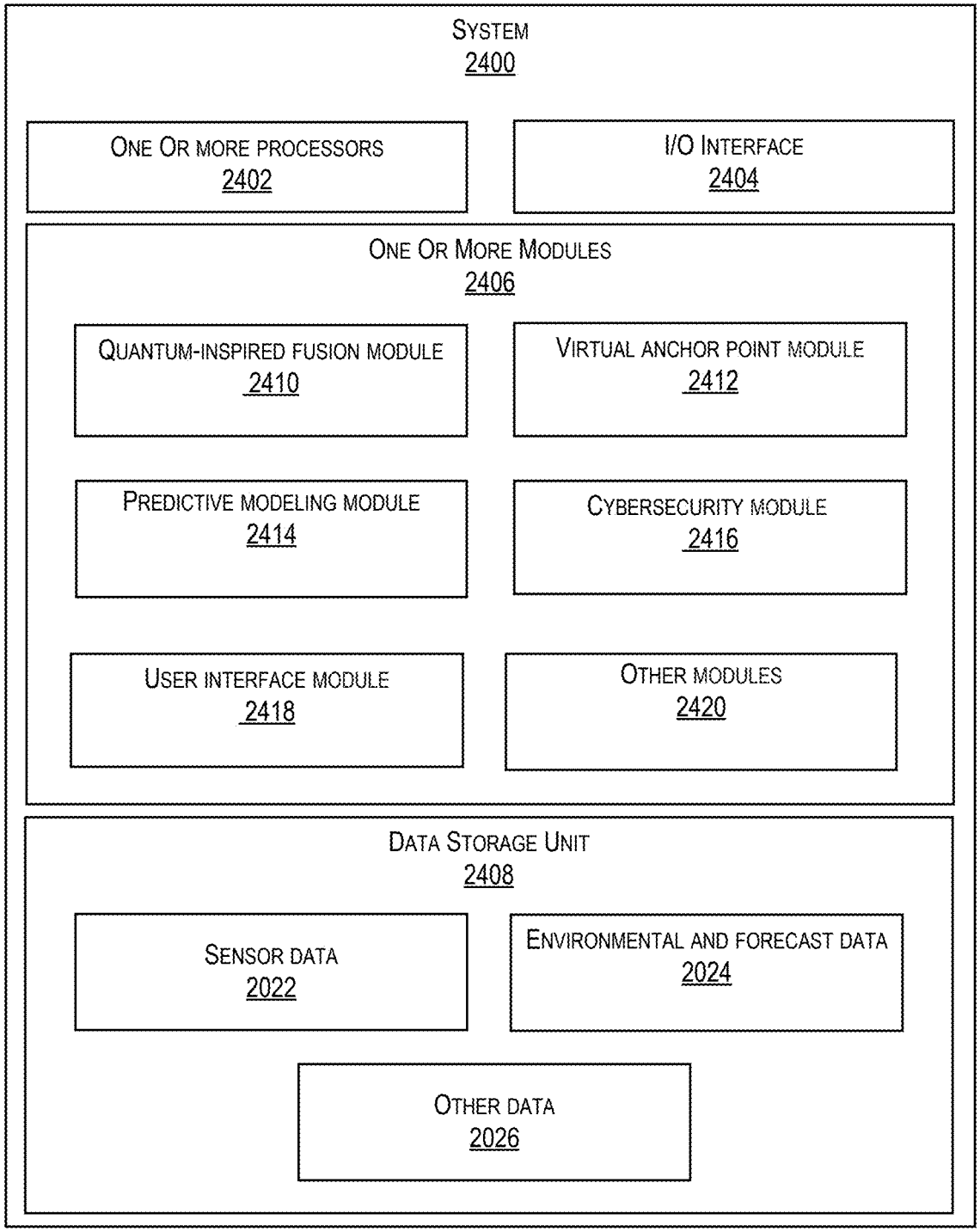
FIG. 24 illustrates a block diagram of a system for navigation and positioning in GPS-denied environments using quantum-inspired fusion, virtual anchor points (VAPs), predictive modeling, cybersecurity, and user interface modules, in accordance with an embodiment of the present disclosure.

FIG. 24 illustrates a block diagram of a system 2400 for navigation and positioning in GPS-denied environments using quantum-inspired fusion, virtual anchor points (VAPs), predictive modeling, cybersecurity, and user interface modules, in accordance with an embodiment of the present disclosure In an embodiment, the system 2400 may include one or more processors 2402, an Input/Output (I/O) interface 2404, one or more modules 2406, and a data storage unit 2408. The one or more processors 2402 may be implemented as one or more microprocessors microcomputers, microcomputers, digital signal processors, central processing units, state machines, logic circuitries, and/or any devices that manipulate signals based on operational instructions. Further, the I/O interface 2404 may serve as the pivotal bridge connecting the internal processes of the system 2400 with its external environment for facilitating the exchange of information between the system 2400 and its users or external devices. Furthermore, the I/O interface 2404 may contribute to the user experience by providing intuitive means for input, such as through keyboards or touchscreens, and presenting meaningful output via displays or other output devices. In an embodiment, the one or more modules 2406 may include a quantum-inspired fusion module 2410, a virtual anchor point module 2412, a predictive modeling module 2414, a cybersecurity module 2416, a user interface module 2418, and any other module 2420 essential or required for the working of the system 2400. In an embodiment, the data storage unit 2408 may include the sensor data 2422, environmental and forecast data 2424, and any other data 2026 required for the working of the system 2400. In an embodiment of the present disclosure, the one or more processors 2402 and the data storage unit 2408 may form a part of a chipset installed in the system 2400. In another embodiment of the present disclosure, the data storage unit 2408 may be implemented as a static memory or a dynamic memory. In an example, the data storage unit 2408 may be internal to the system 2400, such as an onside-based storage. In another example, the data storage unit 2408 may be external to the system 2400, such as cloud-based storage. Further, the one or more module 2406 may be communicatively coupled to the data storage unit 2408 and the one or more processor 2402 of the system 2400. The one or more processors 2402 may be configured to control the operations of the one or more modules 2406.

In an embodiment, the quantum-inspired fusion module 2410 may be configured to represent and maintain multiple position hypothesis using wavefunction-like expansions and amplitude-based filtering. The quantum-inspired fusion module 2410 may operate over a Hilbert-space-based mathematical representation of geospatial and sensor states, enabling probabilistic position estimation in complex, uncertain environments. The quantum-inspired fusion module 2410 may evaluate multiple potential motion trajectories in parallel using constructive and destructive interference principles, consistent with a path-integral approach. The quantum-inspired fusion module 2410 may dynamically adjust amplitude weights based on sensor error metrics, signal-to-noise ratios, and redundancy levels across inertial and auxiliary sensor inputs, which may include magnetometer, LiDAR, camera, radar, barometer, or fractal antenna signals as stored in sensor data 2422 of the data storage unit 2408.

In one embodiment, the quantum-inspired fusion module 2410 may incorporate a neuromorphic sub-architecture for execution on low-power platforms. This sub-architecture may include spiking neural networks capable of encoding sensor data as temporally coded spike trains. Such implementation may facilitate execution of approximate wavefunction expansions or partial amplitude discarding techniques to maintain real-time responsiveness under constrained computational budgets. The fusion module 2410 may optionally incorporate feedback from the virtual anchor point module 2412 and predictive modeling module 2414 to adapt trajectory weights, reinforce high-confidence hypotheses, and discard low-probability motion paths.

In an embodiment, the virtual anchor point module 2412 may be configured to define, manage, and dynamically update virtual anchor references for drift correction in GPS-denied environments. These virtual anchor points may correspond to persistent spatial features derived from environmental cues, including magnetic anomalies, barometric gradients, or visual landmarks. In an embodiment, the virtual anchor point module 2412 may include a topological feature extraction unit that performs persistent homology over sensor field point clouds to generate topological barcodes at multiple resolution levels. The virtual anchor point module 2412 may further project high-dimensional magnetic field signatures into a lower-dimensional manifold space using a learned nonlinear embedding to distinguish between ambiguous or similar spatial patterns.

In an embodiment, the virtual anchor point module 2412 may be configured to work in synergy with bio-inspired or AI-based algorithms, such as reinforcement learning, genetic evolution, or swarm intelligence models. These algorithms may dynamically reposition or reweight virtual anchor points to optimize navigation accuracy in response to environmental changes. The virtual anchor point module 2412 may further include a database of anchor reference fingerprints stored in the data storage unit 2408 under the sensor data 2422 and other data 2426, which may be indexed for rapid retrieval and cross-referenced with amplitude-based hypothesis generated by the quantum-inspired fusion module 2410.

In an embodiment, the predictive modeling module 2414 may be configured to receive and analyze solar, geomagnetic, and environmental data, such as solar wind velocity, geomagnetic Kp index, flare activity, temperature, and humidity, from the environmental and forecast data 2424 stored in the data storage unit 2408. The predictive modeling module 2414 may be further configured to forecast signal reliability for magnetometer-based navigation and dynamically adjust the weight assigned to various sensor inputs in the fusion process based on the predicted environmental conditions. The predictive modeling module 2414 may implement dual-mode World Magnetic Model (WMM) corrections, integrating them with the virtual anchor triangulation framework to improve localization accuracy in complex spaces such as subterranean levels, multi-floor buildings, or electromagnetic interference zones.

In one embodiment, the predictive modeling module 2414 may operate a rule-based fallback system wherein priority is dynamically shifted between inertial, magnetic, visual, or barometric reference signals depending on the quality metrics received from real-time sensor inputs and forecasted environmental disruptions. The predictive modeling module 2414 may also be configured to trigger alerts to the user interface module 2418 in case of high environmental risk, such as during geomagnetic storms or excessive ionospheric variability.

In an embodiment, the cybersecurity module 2416 may be configured to secure data generated or processed by the other modules 2406 of the system 2400 using quantum-algebraic key generation techniques. In an embodiment, the cybersecurity module 2416 may derive ephemeral cryptographic keys based on a combination of factors including real-time local magnetic anomaly patterns, dynamic fluctuations in sensor calibration values, and location-bound entropy metrics. These ephemeral keys may be rotated periodically based on amplitude mismatch thresholds received from the quantum-inspired fusion module 2410.

In an embodiment, the cybersecurity module 2416 may also support inter-agent encryption protocols for multi-agent collaboration. In one embodiment, the cybersecurity module 2416 may implement a consensus-secure communication framework where amplitude updates or VAP confidence scores are exchanged between nearby agents using encrypted channels facilitated by fractal antenna sub-modules (not shown). The cybersecurity module 2416 may utilize elliptic curve cryptography, lattice-based encryption, or one-time pad variations augmented with physical-layer noise data as part of a layered defense strategy.

In an embodiment, the user interface module 2418 may be configured to present navigational overlays, anchor visualizations, system alerts, and operational diagnostics through an augmented reality (AR) interface. The user interface module 2418 may further include a neurofeedback sub-module that monitors physiological indicators such as electroencephalography (EEG), eye-tracking data, and heart rate variability to estimate the cognitive load of the user. Based on the estimated cognitive load, the user interface module 2418 may dynamically adjust AR elements such as anchor point visibility, overlay density, symbol size, or transparency to prevent information overload during high-stress conditions.

In an embodiment, the user interface module 2418 may include logic for editing virtual anchor points in real time through gesture, gaze, or voice-based input. Adjustments may be synchronized with the virtual anchor point module 2412 and logged to the data storage unit 2408. The user interface module 2418 may also relay diagnostic reports regarding environmental risk, system confidence in positional estimates, or recommendations for manual overrides during low-confidence conditions.

The other modules 2420 may include one or more specialized modules, such as a multi-agent consensus engine, a memory optimization scheduler, a resource monitor for edge-device integration, or a cognitive profile manager used for adjusting interface preferences based on user behavioral history. These modules 2420 may be communicatively coupled to the one or more processors 2402 and may be optionally executed in a containerized or distributed computing environment depending on system architecture.

Figure 25:
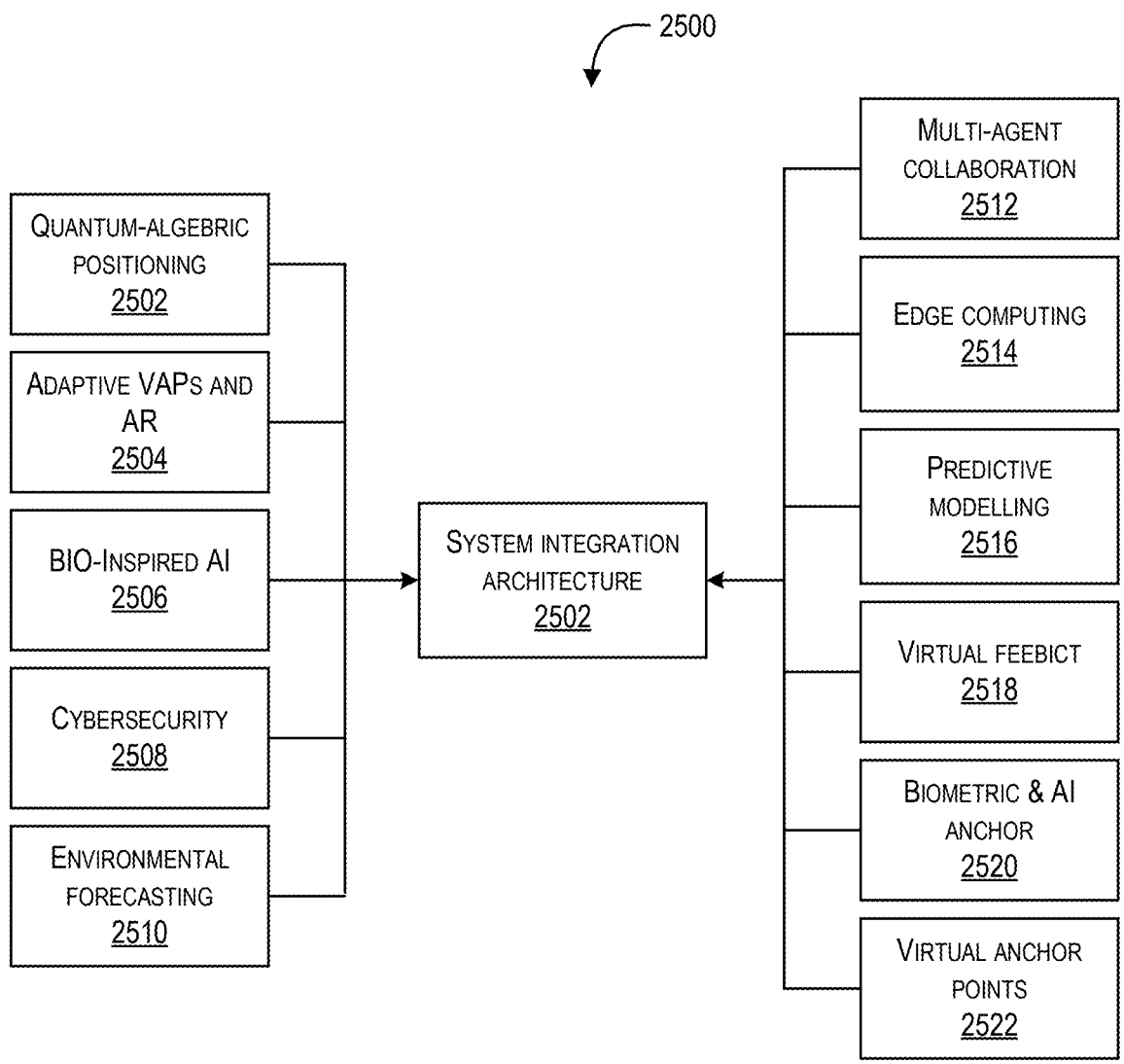
FIG. 25 illustrates a conceptual integration architecture of the system components including quantum-algebraic positioning, adaptive VAPs, predictive modeling, biometric anchoring, environmental forecasting, multi-agent collaboration, and cybersecurity, in accordance with an embodiment of the present disclosure.

FIG. 25 illustrates a conceptual integration architecture 2500 of the system components including quantum-algebraic positioning, adaptive VAPs, predictive modeling, biometric anchoring, environmental forecasting, multi-agent collaboration, and cybersecurity, in accordance with an embodiment of the present disclosure.

In an embodiment, the system integration architecture 2500, which may be configured to interface with multiple specialized components including quantum-algebraic positioning 2502, adaptive virtual anchor points (VAPs) and augmented reality (AR) 2504, bio-inspired artificial intelligence (AI) 2506, cybersecurity 2508, and environmental forecasting 2510. These subsystems may feed into or receive outputs from the system integration architecture 2500 to enable real-time collaboration, adaptation, and secure decision-making under GPS-degraded or GPS-absent conditions.

In an embodiment, the quantum-algebraic positioning block 2502 may correspond to the quantum-inspired fusion module 2410 described earlier and may be configured to represent spatial uncertainty and state evolution using amplitude-based probabilistic models, including wavefunction-like expansions. This module may integrate signal data from a variety of inertial and auxiliary sensors and may allow for interference-based hypothesis elimination and correction based on path-integral formulations. The quantum-algebraic positioning block 2502 may operate on a Hilbert space-based representation of motion trajectories and may be optionally deployed in neuromorphic hardware platforms, allowing it to execute partial amplitude discarding or simplified expansion approximations when constrained by computational resources.

In an embodiment, the adaptive virtual anchor points and augmented reality block 2504 may be configured to implement the functions of both the virtual anchor point module 2412 and the user interface module 2418. In an embodiment, this block 2504 may manage spatial references using real-time environment-derived features, such as barometric gradients, geomagnetic signatures, or persistent visual landmarks. The virtual anchor points may be created, updated, or repositioned using bio-inspired heuristics, reinforcement learning algorithms, or feature reliability metrics, and may be visually represented within an AR interface layered on top of the operational field of view. The AR interface may dynamically alter overlay fidelity and layout based on cognitive load indicators sourced from neurofeedback signals.

In an embodiment, the bio-inspired artificial intelligence block 2506 may include reinforcement learning, genetic algorithms, or swarm intelligence models designed to optimize sensor fusion weights, anchor point placements, or hypothesis selection in complex and evolving environments. This block 2506 may be configured to operate over real-time sensor inputs and training datasets stored within the data storage unit 2408. It may guide the behavior of other modules such as the quantum-algebraic positioning block 2502 and the predictive modeling block 2516. It may further enhance anchor selection or repositioning tasks in the adaptive VAP framework by using feedback from prior navigation results.

In an embodiment, the cybersecurity block 2508 may correspond to the cybersecurity module 2416 and may be configured to secure inter-module data exchanges, multi-agent synchronization messages, and externally transmitted signals using ephemeral keys generated from spatially variant physical characteristics, such as magnetic field patterns or sensor calibration shifts. The cybersecurity block 2508 may further support quantum-inspired cryptographic handshakes and location-state-tied encryption protocols, enabling secure and authenticated positioning even in environments where traditional Public Key Infrastructure (PKI) methods may be infeasible due to lack of connectivity.

In an embodiment, the environmental forecasting block 2510 may correspond to functionalities performed by the predictive modeling module 2414 and may be configured to receive and interpret data pertaining to solar radiation, geomagnetic activity, and atmospheric conditions. This data may be used to modulate sensor priority assignments, suppress unreliable sources during anomalies, or preemptively trigger fallback localization strategies. The environmental forecasting block 2510 may work in tandem with the anchor optimization and amplitude-filtering logic in blocks 2502 and 2504 to enhance reliability under unstable environmental conditions.

In an embodiment, the system integration architecture 2500 may be interfaced with multi-agent collaboration block 2512, edge computing block 2514, predictive modelling block 2516, virtual feedback interface block 2518, biometric and AI anchor block 2520, and virtual anchor points block 2522. The multi-agent collaboration block 2512 may facilitate distributed consensus generation across multiple devices, wherein each device may share partial amplitude vectors or anchor confidences, which are securely encrypted by the cybersecurity block 2508 and aggregated in a decentralized or federated architecture. The edge computing block 2514 may enable execution of the system components, including simplified quantum-inspired fusion or anchor filtering, on resource-constrained devices using low-power processors or neuromorphic chips.

In an embodiment, the predictive modelling block 2516 may expand on the environmental forecasting block 2510 by including localized prediction of drift vectors, sensor confidence estimation, and terrain-based movement probability fields. It may be trained using historical path data and updated in real time to adjust trajectory recommendations. The virtual feedback interface block 2518 may correspond to real-time cognitive interface elements, including auditory, visual, or haptic feedback, modulated in response to operator attention and stress levels measured by the user interface module 2418.

In an embodiment, the biometric and AI anchor block 2520 may combine physiological signals with real-time environmental anchors to create hybrid location reference points. In an embodiment, biometric markers may include EEG patterns, heart rate variability, or gaze duration at spatial landmarks, allowing the system to correlate mental focus with physical location. This block 2520 may further guide AR overlays based on biometric-responsiveness indices.

In an embodiment, the virtual anchor points block 2522 may serve as the anchor management backend, storing and retrieving anchor candidates using persistent topological fingerprints or manifold-based feature projections. These anchors may be linked with amplitude peaks from the quantum-inspired fusion block 2502 and adjusted according to evolving environmental models and cognitive interface constraints.

Figure 26:
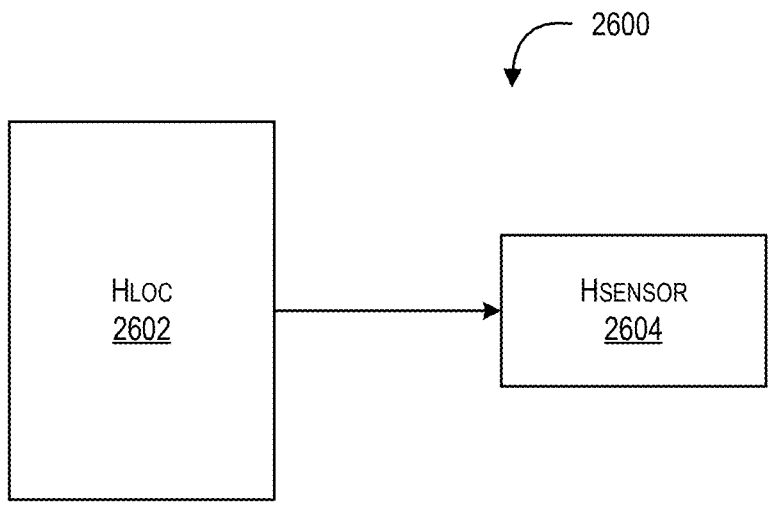
FIG. 26 illustrate components of a quantum-inspired fusion architecture configured to estimate positional states through amplitude-based probabilistic models, in accordance with an embodiment of the present disclosure.
Figure 27:
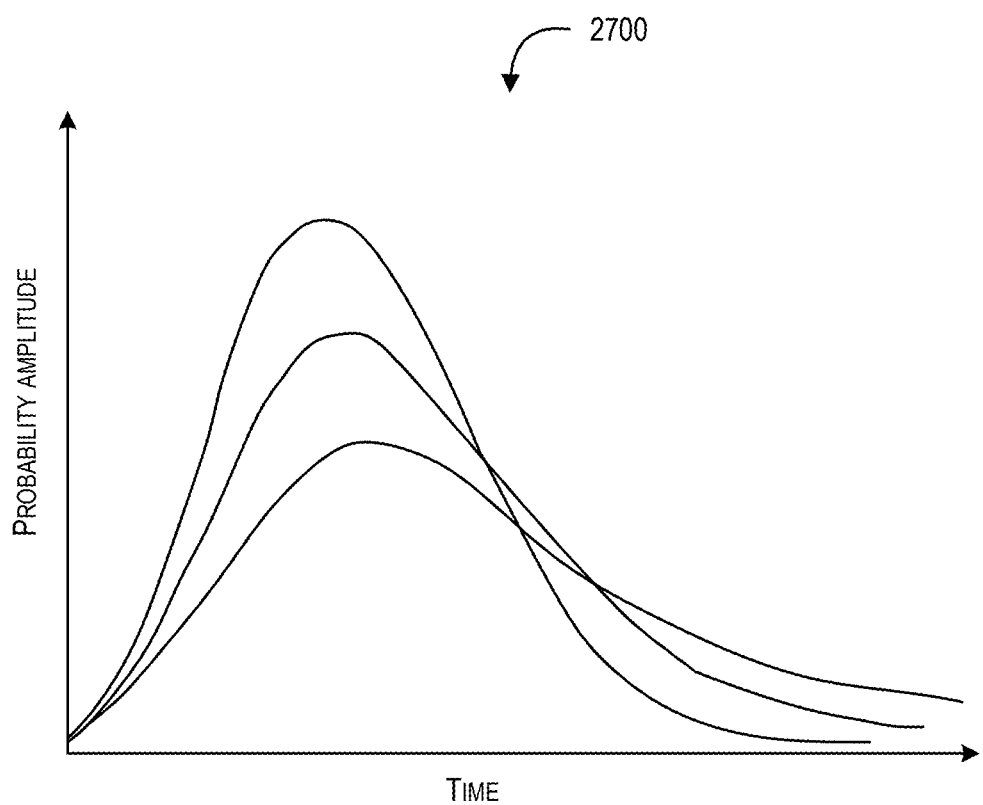
FIG. 27 illustrates a graph depicting multi-sensor signal convergence under varying probability amplitudes, in accordance with an embodiment of the present disclosure.

FIG. 26 illustrate components of a quantum-inspired fusion architecture 2600 configured to estimate positional states through amplitude-based probabilistic models, in accordance with an embodiment of the present disclosure. FIG. 27 illustrates a graph 2700 depicting multi-sensor signal convergence under varying probability amplitudes, in accordance with an embodiment of the present disclosure. For the sake of brevity, FIGS. 26 and 27 have been explained together.

In FIG. 26, the fusion system 2600 is shown comprising a location Hilbert space HLOC 2602 and a sensor Hilbert space (HSENSOR) 2604. In an embodiment, the location Hilbert space 2602 may represent the state space associated with possible spatial configurations of the platform or device operating in a GPS-denied environment. Each position hypothesis within the location Hilbert space 2602 may correspond to a complex-valued amplitude that evolves over time according to probabilistic interference models, including constructive and destructive interference driven by path likelihoods. The sensor Hilbert space 2604 may be configured to encode the space of possible sensor readings, including inputs from magnetometers, inertial sensors, LiDAR, barometers, or visual signals. In an embodiment, the quantum-inspired fusion module 2410, as described in FIG. 24, may be configured to project or map the state of the sensor Hilbert space 2604 into the location Hilbert space 2602 using a joint operator framework. Such mapping may enable correlation between physical measurement outcomes and probable position estimates, allowing the fusion module to maintain and evolve a superposition of potential locations. The mapping operation may involve a joint likelihood model where sensor readings are matched against pre-learned spatial field distributions, and position hypothesis are weighted accordingly.

Referring now to FIG. 27, a graph 2700 is illustrated showing the variation of probability amplitude over time for multiple competing positional hypotheses, in accordance with an embodiment of the present disclosure. The x-axis of the graph 2700 may represent time, while the y-axis represents probability amplitude associated with distinct spatial trajectories. Each curve may correspond to a different motion hypothesis, and the height of each curve may indicate the relative confidence in that hypothesis at a given time. As time progresses, certain trajectories may be reinforced through constructive interference and data support from real-time sensor inputs, while others may decay due to lack of corroborating evidence or destructive interference with out-of-phase estimates. In an embodiment, the curves illustrated in FIG. 27 may be computed using amplitude-filtering operations performed by the quantum-inspired fusion module 2410. These curves may reflect sensor-weighted probabilities over time and may be continuously recalculated as new data is acquired. In another embodiment, an edge-deployed implementation of this fusion mechanism may discard lower-probability amplitude branches to reduce computation and focus on high-likelihood paths. The outputs of this mechanism may be used by the virtual anchor point module 2412 to correct for drift, or by the cybersecurity module 2416 to trigger spatially-bound key refreshes if the amplitude mismatch crosses a predefined threshold.

In an embodiment, the probability amplitudes depicted in FIG. 27 may also be influenced by predictive adjustments from the predictive modeling module 2414. For instance, during geomagnetic disturbance events predicted using solar wind or Kp-index forecasts from the environmental and forecast data 2424, the confidence weighting assigned to magnetometer-based hypothesis may be dynamically decreased, causing corresponding amplitude curves to drop or flatten. In an embodiment, these amplitudes may serve as inputs to a reinforcement learning-based controller that adjusts VAP weighting or visual prioritization in the AR overlays presented by the user interface module 2418. Thus, FIGS. 26 and 27 collectively illustrate the mathematical and signal evolution framework underpinning the quantum-algebraic positioning sub-system of the present disclosure. By maintaining a superposition of location states and dynamically refining them through amplitude modulation informed by sensor reliability and environmental forecasting, the system may deliver resilient and context-adaptive position estimation in GPS-denied environments.

Figure 28:
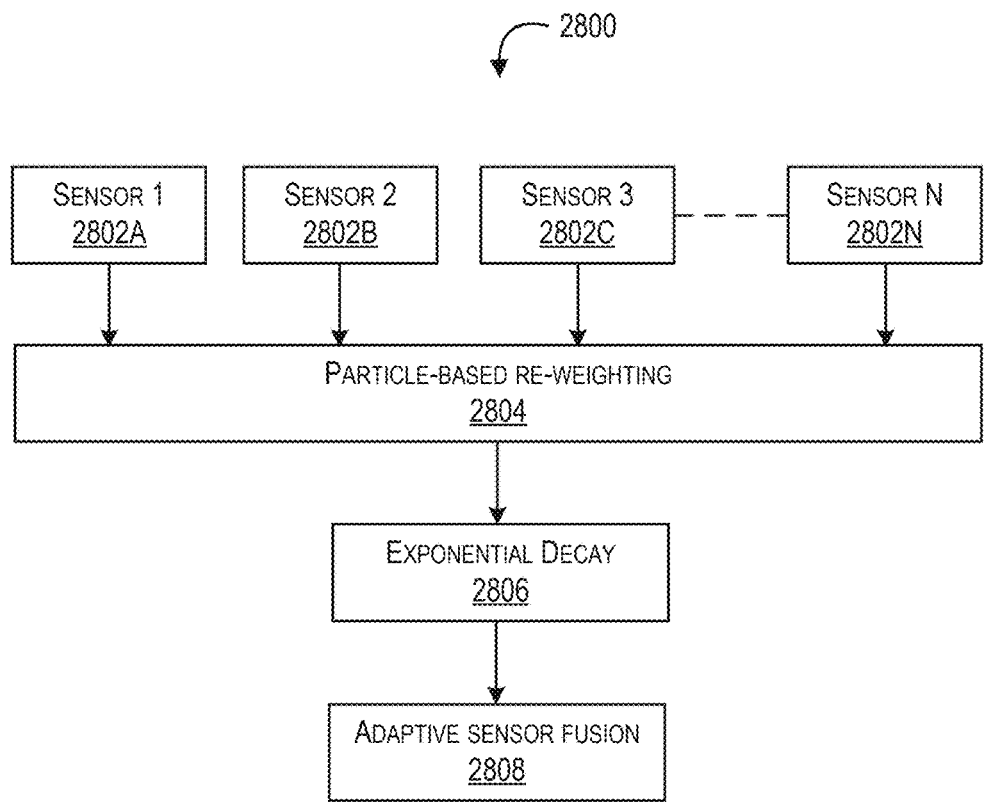
FIG. 28 illustrates an adaptive sensor fusion diagram incorporating particle-based reweighting and exponential decay mechanisms, in accordance with an embodiment of the present disclosure.

FIG. 28 illustrates an adaptive sensor fusion architecture 2800 incorporating particle-based re-weighting and exponential decay techniques to improve the accuracy and responsiveness of positioning in GPS-denied environments, in accordance with an embodiment of the present disclosure. The architecture 2800 may process data streams from multiple sensors, labeled as Sensor 1 2802A, Sensor 2 2802B, Sensor 3 2802C, through Sensor N 2802N. Each of the sensors 2802A-2802N may correspond to different sensing modalities, including but not limited to inertial sensors (e.g., accelerometers and gyroscopes), magnetometers, barometric sensors, cameras, LiDAR units, radar arrays, and fractal antenna-based signal capture devices. These sensors may be embedded within the platform or device executing the navigation system 2400 or may be external and interfaced via a data bus or wireless communication link.

The raw or preprocessed data from sensors 2802A through 2802N may be provided as input to a particle-based re-weighting module 2804. In an embodiment, the particle-based re-weighting module 2804 may be configured to perform a probabilistic weighting of spatial hypothesis or virtual particles, where each particle represents a candidate location or motion path. The particle weights may be updated based on the similarity between expected sensor readings—computed from historical data or environmental maps stored in data storage unit 2408—and the actual sensor inputs received in real time. The re-weighting module 2804 may employ statistical inference methods such as Bayesian filtering, importance sampling, or Gaussian Mixture Models (GMMs) to refine the particle cloud and reinforce high-confidence hypotheses.

Following the re-weighting operation, the weighted particles may be processed through an exponential decay module 2806. The exponential decay module 2806 may be configured to reduce the influence of older or less consistent sensor data by applying a time-dependent decay function to particle weights. This decay may prevent the propagation of stale or misleading measurements, especially in dynamic environments where signal conditions or motion profiles can change rapidly. In one embodiment, the decay factor may be modulated by reliability scores assigned to each sensor type under the current environmental conditions, as derived from the predictive modeling module 2414 or environmental forecasting module 2510. For instance, during periods of geomagnetic disturbance, decay may be accelerated for magnetometer-based particles, while inertial or barometric inputs may be retained longer.

The output of the exponential decay module 2806 may be fed into an adaptive sensor fusion module 2808. The adaptive sensor fusion module 2808 may be configured to combine the particle states into a unified location estimate by taking into account the updated weights, cross-sensor correlations, and contextual factors such as terrain maps, predicted drift patterns, or operator intent derived via neurofeedback. In an embodiment, the adaptive sensor fusion module 2808 may utilize Kalman filtering, unscented Kalman filtering (UKF), or quantum-inspired wavefunction combination techniques as discussed in relation to the quantum-algebraic positioning module 2502. The fusion logic may also prioritize hypothesis that are reinforced by multiple modalities (e.g., inertial plus visual plus barometric) and de-emphasize those supported by only a single weak signal.

Further, the adaptive sensor fusion module 2808 may be implemented to operate on resource-constrained edge devices, and may therefore include logic to discard low-confidence particles or prune hypothesis trees when memory or processing bandwidth is limited. This module 2808 may also interface with the virtual anchor point module 2412 to compare fused estimates against anchor constraints, and to update anchor reliability scores over time. The fused output from module 2808 may then be passed on to downstream modules such as the user interface module 2418 for AR overlay generation, or the cybersecurity module 2416 for ephemeral key derivation tied to spatial variance. Thus, the architecture 2800 illustrated in FIG. 28 provides a robust and modular sensor fusion framework that may dynamically adapt to environmental changes, input inconsistencies, and computational constraints. The use of particle-based re-weighting and exponential decay allows the system to maintain high accuracy and responsiveness even in the absence of GPS or centralized reference signals, fulfilling a critical requirement in the overall navigation system for GPS-denied environments.

Figure 29:
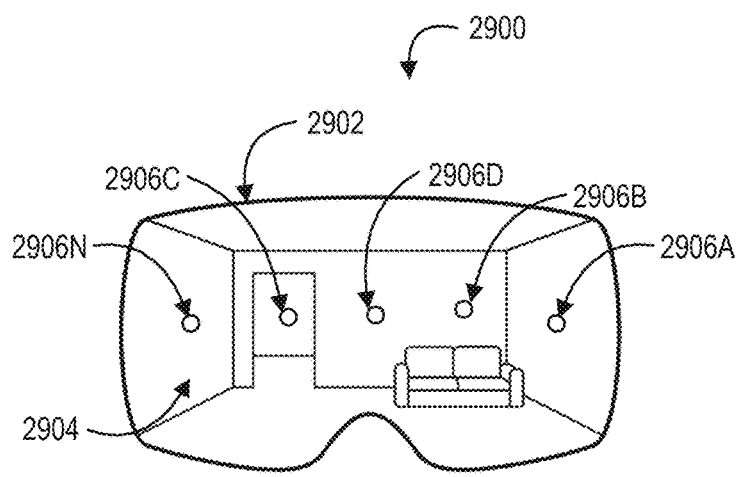
FIG. 29 illustrates a modular architecture for multi-sensor data ingestion and structured hypothesis representation for positioning, in accordance with an embodiment of the present disclosure.

FIG. 29 illustrates a modular architecture 2900 for multi-sensor data ingestion and structured hypothesis representation for positioning in GPS-denied environments, in accordance with an embodiment of the present disclosure. The architecture 2900 is exemplified through a visual depiction as seen through a head-mounted display 2902, such as augmented reality (AR) glasses or a wearable visor integrated with the user interface module 2418 of the system 2400. The head-mounted display 2902 may be configured to project or render visual representations of position-related data to an operator in real time, aiding in navigation, spatial orientation, and virtual anchor visualization. The environment shown through the visor may correspond to an indoor space such as a corridor or room with spatial markers used for positioning.

In an embodiment, the head-mounted display 2902 may display one or more anchor reference points 2906A through 2906N, each of which may correspond to a virtual anchor point generated or maintained by the virtual anchor point module 2412. These anchor points may be dynamically positioned on or near identifiable features of the physical environment, such as the corner of a room, doorway, wall fixture, or piece of furniture. The anchor points 2906A-2906N may represent structured hypothesis for position estimation and may be derived from a fusion of inputs from multiple sensors, including barometric sensors, magnetometers, inertial sensors, visual feature trackers, and fractal antenna-based modules.

Each anchor points 2906A-2906N may have a confidence weight or probability amplitude associated with it, which may be updated in real time by the quantum-inspired fusion module 2410 based on how well sensor data aligns with the expected environmental signature at that anchor. The structured hypothesis may be maintained in a probabilistic framework wherein each anchor point represents a latent spatial node within the location Hilbert space 2602, and the user's position may be modeled as a weighted superposition of these nodes. In one embodiment, anchor points may also be selected or dismissed based on environmental forecasting input from the predictive modeling module 2414 or feedback from biometric signals indicating cognitive user load.

The scene rendered in FIG. 29 may include a visual field 2904 that represents the physical space in which the operator is moving. Within this space, the anchor points 2906A-2906N may serve not only as back-end data structures for sensor fusion but also as user-visible cues guiding movement or alerting the user to high-confidence navigation pathways. The user interface module 2418 may overlay these anchor points within the AR display 2902 and may adjust their density, opacity, or interconnectivity based on neurofeedback metrics, such as eye-tracking fixation duration or EEG-based stress estimations, obtained from the neurofeedback sub-module.

In another embodiment, the anchor points 2906A-2906N may also serve as nodes for inter-agent consensus when the system operates in a collaborative multi-agent mode enabled by the multi-agent collaboration module 2512. In such scenarios, anchor validation or hypothesis convergence may occur through data exchanges across agents, where each device may share its own local confidence regarding anchor observations, encrypted and authenticated using the cybersecurity module 2416. Thus, FIG. 29 depicts an integrated view of how spatial hypothesis derived from multiple sensor modalities may be rendered, structured, and adapted in real time to assist both the back-end fusion logic and the front-end user interface within the navigation system. The anchor points 2906A-2906N serve as key abstractions uniting probabilistic estimation, user cognition, and collaborative validation within a unified framework for GPS-denied navigation.

Figure 30:
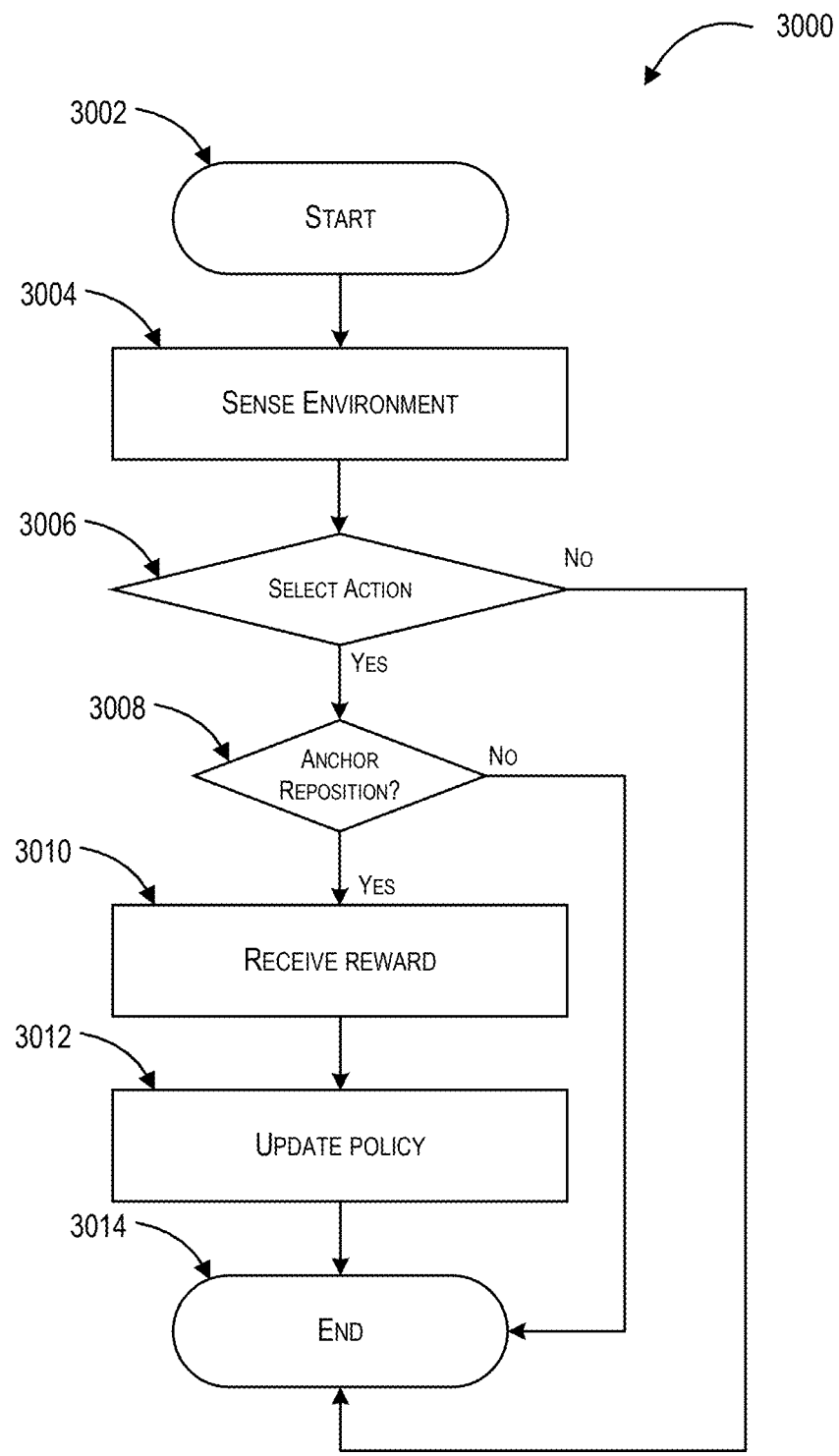
FIG. 30 illustrates a reinforcement learning loop for anchor point optimization using reward-driven repositioning decisions, in accordance with an embodiment of the present disclosure.

FIG. 30 illustrates a reinforcement learning loop 3000 for anchor point optimization using reward-driven repositioning decisions, in accordance with an embodiment of the present disclosure. The loop 3000 may be implemented within the virtual anchor point module 2412, in coordination with the bio-inspired artificial intelligence module 2506, to dynamically reposition, retain, or reweight anchor references based on their utility in enhancing positional accuracy in GPS-denied environments.

The process may begin at step 3002, denoted as "Start," followed by an environment sensing phase 3004. In the step 3004, the system 2400 may be configured to sense the environment through one or more sensors, including but not limited to magnetometers, LiDAR, inertial measurement units (IMUs), cameras, radar, and barometers. The sensed data may be stored in the sensor data 2422 within the data storage unit 2408 and may represent contextual information such as structural features, environmental drift, signal attenuation, or topological consistency patterns across time.

At step 3006, the reinforcement learning loop 3000 may invoke an action selection mechanism, where the system selects whether to consider repositioning or modifying a virtual anchor point. The decision may be made using an AI model such as a Q-learning agent, policy gradient model, or actor-critic framework. The selection of an action may be driven by evaluation of previously observed sensor-state outcomes, reward signals from earlier navigation cycles, or uncertainty metrics computed by the quantum-inspired fusion module 2410.

If the selected action corresponds to anchor point repositioning (as determined at decision step 3008), the system may proceed to step 3010 to evaluate the effect of the repositioning action and receive a corresponding reward signal. The reward may be based on post-repositioning improvements in localization accuracy, reduction in amplitude mismatch, or increased stability in the AR overlay generated by the user interface module 2418. In one embodiment, the reward signal may also include multi-agent feedback, such as consensus validation scores shared via the multi-agent collaboration module 2512.

Following reward reception at step 3010, the reinforcement learning policy may be updated at step 3012. The updated policy may alter how future anchor selection, retention, or pruning actions are performed under similar environmental conditions. The policy may be stored in a reinforcement learning memory module or updated dynamically based on a SoftMax or ε-greedy action strategy. The update process may also include neural network weight tuning if deep reinforcement learning is employed, particularly in implementations involving complex manifold-based VAP management.

If the anchor repositioning decision is negative at step 3008 or if no action is selected at step 3006, the loop 3000 may revert to sensing the environment again at step 3004. The loop continues until the process ends at step 3014, which may be triggered manually, via a session timeout, or after convergence of anchor confidence metrics. Throughout this process, environmental and forecast data 2424 may be used by the predictive modeling module 2414 to inject context-aware weighting to the reinforcement loop, for instance, by penalizing magnetometer-reliant repositioning during high geomagnetic disturbance periods.

Figure 31:
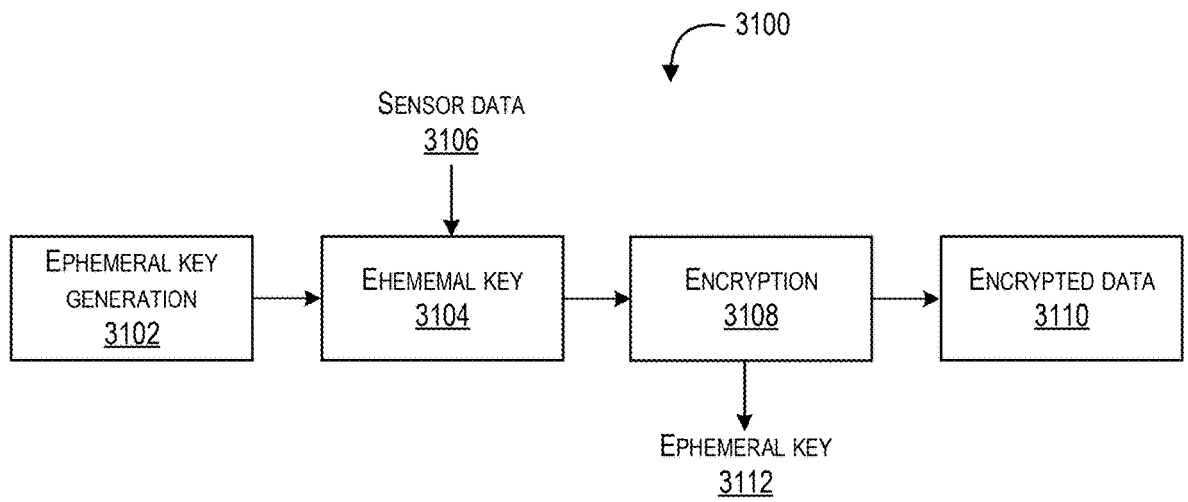
FIG. 31 illustrates a secure data transmission framework using ephemeral key generation based on local sensor inputs and encryption processes, in accordance with an embodiment of the present disclosure.

FIG. 31 illustrates a secure data transmission framework 3100 that utilizes ephemeral key generation based on local sensor inputs and encryption processes to protect navigation-related data in GPS-denied environments, in accordance with an embodiment of the present disclosure. The secure data transmission framework 3100 may be implemented within the cybersecurity module 2416 of the system 2400 and may operate in conjunction with other modules such as the quantum-inspired fusion module 2410 and the virtual anchor point module 2412 to safeguard sensitive sensor streams and inter-agent communications.

As shown in FIG. 31, the process begins with an ephemeral key generation unit 3102, which may be configured to derive cryptographic keys from local environmental factors, including but not limited to magnetic field anomalies, temporal variations in barometric pressure, user movement signatures, and noise-derived entropy metrics from sensors such as radar, fractal antennas, or IMUs. The generated key may be unique to the device, spatial location, and operational context, ensuring that it is difficult to spoof or replicate.

The output from the ephemeral key generation unit 3102 may be passed to an ephemeral key module 3104. The ephemeral key module 3104 may receive or further refine the key using live sensor data 3106. This sensor data 3106 may include readings from onboard or external sensors tracked in the sensor data 2422 stored in the data storage unit 2408. In an embodiment, the ephemeral key module 3104 may also incorporate entropy conditioning and real-time thresholding mechanisms to ensure key randomness and avoid reuse or predictability.

The resulting secure ephemeral key from module 3104 may be supplied to an encryption unit 3108. The encryption unit 3108 may be configured to encrypt navigation-related data such as user position hypotheses, amplitude weight maps, anchor references, and fusion output streams using symmetric or asymmetric encryption algorithms. In one embodiment, lightweight symmetric cryptographic protocols such as ChaCha20 or AES-GCM may be employed for fast, edge-based encryption. In another embodiment, post-quantum encryption schemes or lattice-based cryptography may be used for added security in multi-agent networks.

As shown in FIG. 31, the encryption unit 3108 may also be configured to reference or regenerate the ephemeral key 3112 at the time of decryption or verification. This key regeneration process may ensure that decryption is only possible if the receiving agent or device resides in the same spatial, temporal, or sensor-aligned context as the sender, which is particularly important for anti-spoofing defense in GPS-denied or infrastructure-less scenarios. The final encrypted output may be labeled as encrypted data 3110. The encrypted data 3110 may be transmitted to another subsystem, stored for audit or later retrieval, or shared with collaborating agents in a secure multi-agent positioning framework implemented through the multi-agent collaboration module 2512. The ephemeral nature of the key ensures that even if intercepted, the data remains undecipherable unless the attacker replicates the exact local environmental and sensor conditions—an unlikely event.

Figure 32:
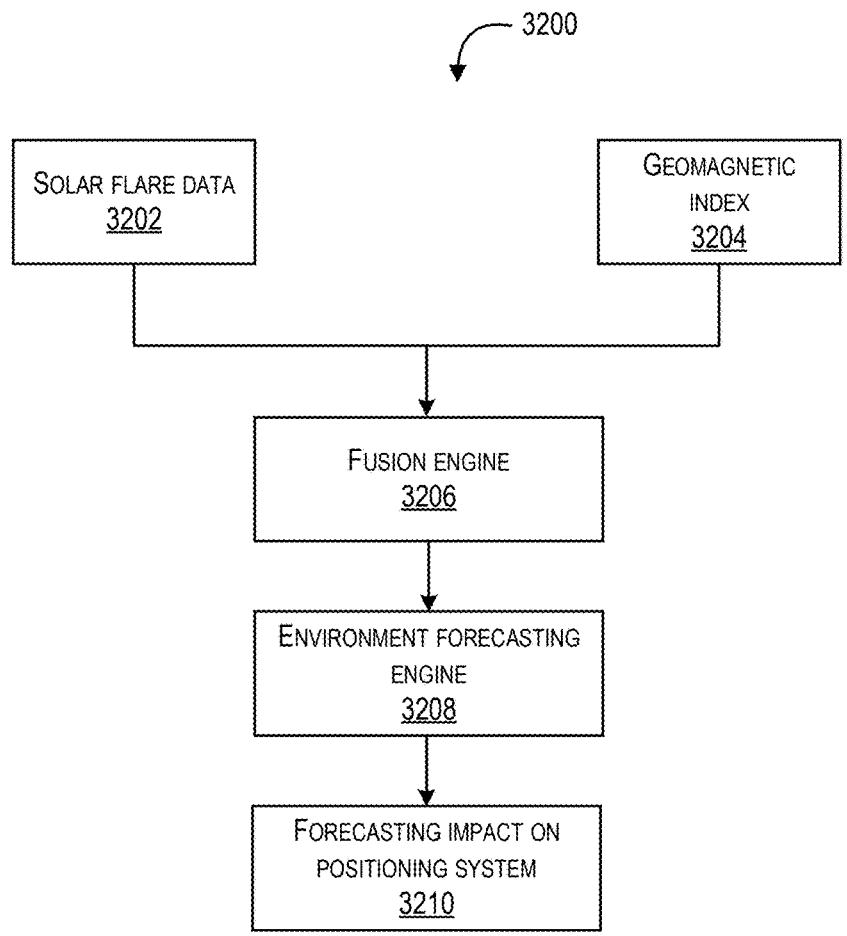
FIG. 32 illustrates an environmental forecasting module receiving solar flare and geomagnetic index data to assess positioning reliability, in accordance with an embodiment of the present disclosure.

FIG. 32 illustrates an environmental forecasting architecture 3200 for assessing the impact of solar and geomagnetic phenomena on the positioning reliability of a navigation system in GPS-denied environments, in accordance with an embodiment of the present disclosure. The environmental forecasting architecture 3200 may be implemented within or in conjunction with the predictive modeling module 2414 and the environmental forecasting module 2510 of the system 2400. The purpose of the architecture 3200 may be to proactively evaluate environmental disturbances—particularly those originating from space weather—and forecast their potential degradation effects on magnetometer-based or sensor-fusion-driven positioning.

As shown in FIG. 32, the forecasting architecture 3200 may receive space weather telemetry from two primary data sources: solar flare data 3202 and geomagnetic index data 3204. The solar flare data 3202 may represent real-time or near-real-time observations of solar activity including solar flare intensity, coronal mass ejection (CME) events, and solar wind velocity. The geomagnetic index data 3204 may include metrics such as Kp-index, Dst index, and Ap index, which quantify the strength and variability of Earth's geomagnetic field. These inputs may be obtained via satellite links, cloud-based feeds, or onboard space weather sensors.

The solar flare data 3202 and geomagnetic index data 3204 may be fed into a fusion engine 3206. The fusion engine 3206 may be configured to perform data normalization, temporal alignment, and cross-correlation analysis to produce a composite environmental threat signal. The fusion engine 3206 may also weigh the sources based on confidence levels, time decay, and historical pattern matching. In some embodiments, the fusion logic may utilize neural networks or hybrid signal models to classify the current space weather profile into one of several risk categories (e.g., low, moderate, severe interference expected).

Output from the fusion engine 3206 may be processed by an environment forecasting engine 3208, which may be configured to predict the downstream impact of the detected space weather conditions on the functioning of the positioning system. The environment forecasting engine 3208 may reference sensitivity models for various sensors, including magnetometers, barometers, and RF receivers, and may assess how the current environmental parameters are likely to influence their stability and accuracy. These models may be trained using previously recorded sensor data stored in the environmental and forecast data 2424 and aligned with anchor drift patterns detected by the virtual anchor point module 2412.

The final output of the process may be generated by a forecasting impact module 3210, which may produce a quantitative or qualitative assessment of how environmental conditions are expected to affect the positioning system's performance. The output may include recommendations such as: reducing reliance on magnetometers, increasing weighting for inertial data, triggering fallback to virtual anchor triangulation, or elevating uncertainty margins in user guidance overlays. This impact signal may be fed to the quantum-inspired fusion module 2410 to adjust amplitude weighting or to the user interface module 2418 to issue warnings or suggest alternative routing strategies.

In multi-agent environments, the results of the forecasting impact module 3210 may also be shared securely with neighboring agents through encrypted data exchanges handled by the cybersecurity module 2416. This enables collaborative realignment of sensor strategies across distributed nodes in environments affected by solar or geomagnetic disturbances.

Figure 33:
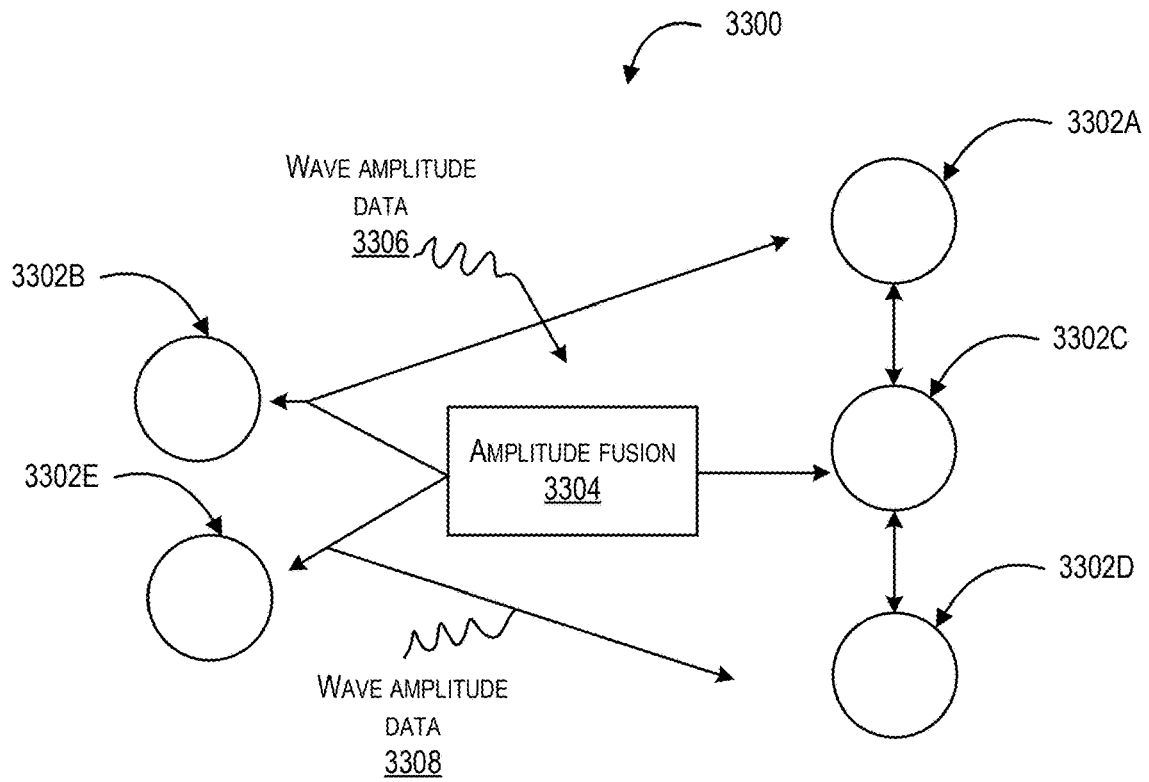
FIG. 33 illustrates amplitude fusion from multiple wave data sources using normalized weighting and comparison logic, in accordance with an embodiment of the present disclosure.

FIG. 33 illustrates an amplitude fusion framework 3300 for integrating wave amplitude data from multiple sources using normalized weighting and comparative analysis to improve spatial hypothesis resolution in GPS-denied environments, in accordance with an embodiment of the present disclosure. The amplitude fusion framework 3300 may be a functional component of the quantum-inspired fusion module 2410 and may operate in coordination with modules such as the virtual anchor point module 2412 and predictive modeling module 2414 to support enhanced positioning performance.

As shown in FIG. 33, the system may include a plurality of input data nodes, labeled as 3302A, 3302B, 3302C, 3302D, and 3302E. Each node 3302A-3302E may correspond to a distinct spatial or trajectory hypothesis within a discretized representation of the user's potential location space. In an embodiment, these nodes may represent positions in a grid, waypoints in a corridor, or persistent virtual anchor references within a VAP field. The nodes may evolve over time as new sensor data is ingested and as uncertainty models are updated.

Wave amplitude data 3306 and wave amplitude data 3308 may represent temporal sequences of complex-valued amplitudes generated through quantum-inspired probabilistic modeling, as discussed in FIGS. 26 and 27. These amplitudes may arise from sources such as magnetometer pattern correlations, inertial trajectory likelihoods, barometric pressure change rates, or visual feature persistence. The data streams 3306 and 3308 may reflect not just signal intensity but also phase evolution, path interference metrics, and entropy confidence levels associated with each contributing sensor type.

The amplitude fusion module 3304 may be configured to receive these multiple wave amplitude inputs and perform a weighted synthesis to generate a consolidated confidence score or updated amplitude for each hypothesis node 3302A-3302E. In one embodiment, the amplitude fusion module 3304 may apply statistical normalization, Kalman gain adjustment, or Hilbert space projection alignment to ensure that amplitudes across heterogeneous sources are made commensurate before combination. In another embodiment, the module 3304 may incorporate neural-net-based fusion logic trained to emulate constructive/destructive interference dynamics based on historical fusion results.

The output of the amplitude fusion module 3304 may be used to promote or demote certain spatial hypothesis in the superposition maintained by the quantum-inspired fusion module 2410. For example, if the amplitude associated with node 3302C increases sharply after fusion, the system may shift its estimated position toward that hypothesis and assign it higher weight during rendering in the AR overlay managed by the user interface module 2418. Conversely, nodes such as 3302B or 3302E may have their weights reduced due to destructive interference or contradictory sensor patterns.

The system may also enable temporal fusion across iterations, using exponential decay models such as described in FIG. 28 to reduce reliance on stale or uncorrelated amplitude contributions. Additionally, the fusion logic may be modulated based on environmental risk factors (e.g., geomagnetic disturbances) or agent feedback received via the multi-agent collaboration module 2512, thereby ensuring that amplitude-based decisions remain robust across various operational conditions.

Figure 34:
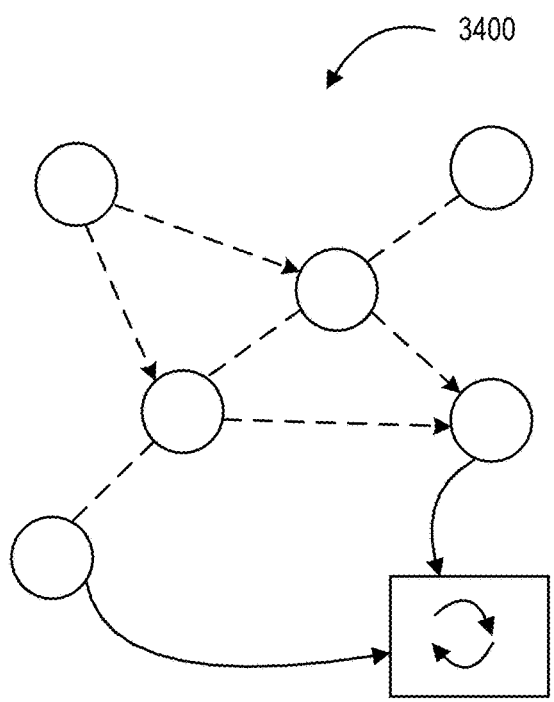
FIG. 34 illustrates a signal processing architecture for probabilistic position estimation based on Fourier-transformed and filtered sensor input, in accordance with an embodiment of the present disclosure.

FIG. 34 illustrates a signal processing architecture 3400 for probabilistic position estimation using Fourier-transformed and filtered sensor inputs, in accordance with an embodiment of the present disclosure. The architecture 3400 may be integrated within the quantum-inspired fusion module 2410 of the system 2400, and may operate in coordination with the amplitude fusion module 3304, the predictive modeling module 2414, and the neuromorphic processing unit. This architecture may enable frequency-domain enhancement of signal features prior to probabilistic inference, particularly in GPS-denied environments where raw spatial or temporal data may be insufficiently reliable.

The signal processing architecture 3400 may comprise a set of probabilistic state nodes arranged in a network of connected hypotheses, where each node represents a potential spatial location or movement trajectory. These nodes are shown as circles in FIG. 34 and may be connected by dashed directional links, representing transitional likelihoods or amplitude propagation paths based on input sensor data. Each connection between nodes may carry a probability weight, which may evolve as the system receives updated inputs from barometers, magnetometers, accelerometers, LiDAR units, or visual tracking systems.

Before these weights are applied to update the position hypothesis network, the raw sensor signals may be subjected to a Fourier transform to convert them into a frequency domain. This transformation may be performed to extract latent periodicities, noise components, and high-frequency artifacts that are not readily observable in the time domain. The transformed signal may then be processed through a filtering pipeline-represented by the rectangular node with a circular arrow in FIG. 34 configured to remove undesired frequency bands or to amplify signal components associated with known navigational features (e.g., stride periodicity, microvibrations, acoustic resonance).

The filtered signal may then be mapped back onto the hypothesis network, updating the transition probabilities between spatial hypothesis based on the frequency-domain correlation between incoming data and expected sensor behavior at each location node. In one embodiment, this process may rely on trained neural encoders that project filtered spectral features into a lower-dimensional latent space for efficient hypothesis ranking. In another embodiment, the system may use dynamic amplitude update functions in Hilbert space (as introduced in FIGS. 26 and 33) to promote or suppress nodes based on cross-spectral coherence across multiple sensors.

The feedback loop illustrated in FIG. 34 may correspond to a recurrent updating mechanism or adaptive reweighting logic. This loop may be configured to continuously refine hypothesis confidence values as the filtered sensor data evolves, allowing for robust tracking even in conditions of partial occlusion, signal loss, or dynamic environmental interference. The loop may also support memory persistence, enabling short-term retention of path history or context-awareness for better forward trajectory inference.

In an alternative embodiment, the frequency-domain signal processing pipeline may be implemented on a neuromorphic processor where Fourier coefficients are encoded into spike patterns and filtered using biologically-inspired receptive fields. This low-power implementation may be particularly valuable for wearables, edge devices, or multi-agent swarm nodes operating in power-constrained environments.

Figure 35:
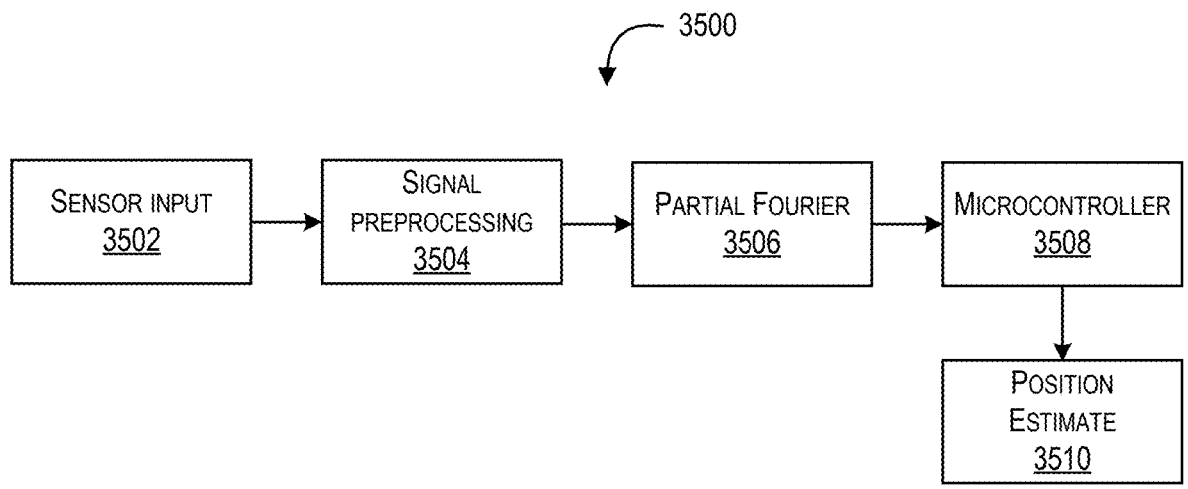
FIG. 35 illustrates a neuromorphic processor pipeline performing signal preprocessing, sparse representation, and microcontroller-based position estimation, in accordance with an embodiment of the present disclosure.

FIG. 35 illustrates a neuromorphic processor pipeline 3500 configured to perform sensor signal preprocessing, sparse frequency representation, and microcontroller-based position estimation in GPS-denied environments, in accordance with an embodiment of the present disclosure. The pipeline 3500 may be implemented as part of the neuromorphic processing unit and may operate in conjunction with the quantum-inspired fusion module 2410 and the predictive modeling module 2414 within the system 2400.

As depicted, the process begins with a sensor input 3502, which may correspond to raw signals received from one or more environmental and motion sensors such as magnetometers, accelerometers, barometers, radar, or fractal antenna subsystems. These sensors may be integrated into the navigation device or distributed across a collaborative multi-agent network. The incoming signals may include noise, artifacts, or variable sampling rates, particularly in dynamic or electromagnetically complex environments.

The raw data from the sensor input 3502 may be forwarded to a signal preprocessing unit 3504. The signal preprocessing unit 3504 may be configured to normalize, denoise, interpolate, or temporally align the incoming data. In one embodiment, the preprocessing step may also include feature extraction such as windowed energy computation, slope detection, or amplitude peak thresholding. In another embodiment, preprocessing may involve data compression or encoding into spike trains compatible with neuromorphic substrates.

Following preprocessing, the signal is passed to a partial Fourier transform block 3506. The partial Fourier block 3506 may be configured to compute a sparse or truncated frequency-domain representation of the signal. Unlike a full Fourier transform, the partial implementation may focus only on a selected set of frequency bins or ranges known to be relevant for motion characterization or environmental identification. This reduces computational burden and memory use, making it suitable for real-time embedded processing. In some implementations, this block may be replaced or supplemented with wavelet transforms or short-time Fourier transforms depending on the nature of the input signals.

The transformed and compressed data may then be fed into a microcontroller 3508, which may serve as the central logic unit for deriving the position estimate. The microcontroller 3508 may be a low-power, embedded processor designed to operate in mobile, wearable, or edge-based platforms. It may be configured to execute machine-learned models, rule-based state estimation algorithms, or hybrid probabilistic logic to generate a final position estimate 3510.

The position estimates 3510 may correspond to a two-dimensional or three-dimensional spatial coordinate, trajectory prediction, or anchor reference alignment. This estimate may be relayed to other modules such as the virtual anchor point module 2412 for validation, to the user interface module 2418 for AR rendering, or to the cybersecurity module 2416 for location-based ephemeral key generation.

In an embodiment, the pipeline 3500 may be fully or partially implemented on a neuromorphic chip comprising spiking neural networks, wherein the signal preprocessing 3504 and partial Fourier 3506 stages are embedded into synaptic weights and temporal filters. The microcontroller 3508 in such a system may represent a spiking decision layer that evaluates temporal spike patterns to compute the position estimate 3510. This enables extremely low power consumption while maintaining continuous positional tracking, which is critical in field operations, mission-critical wearables, or infrastructure-denied scenarios.

Figure 36:
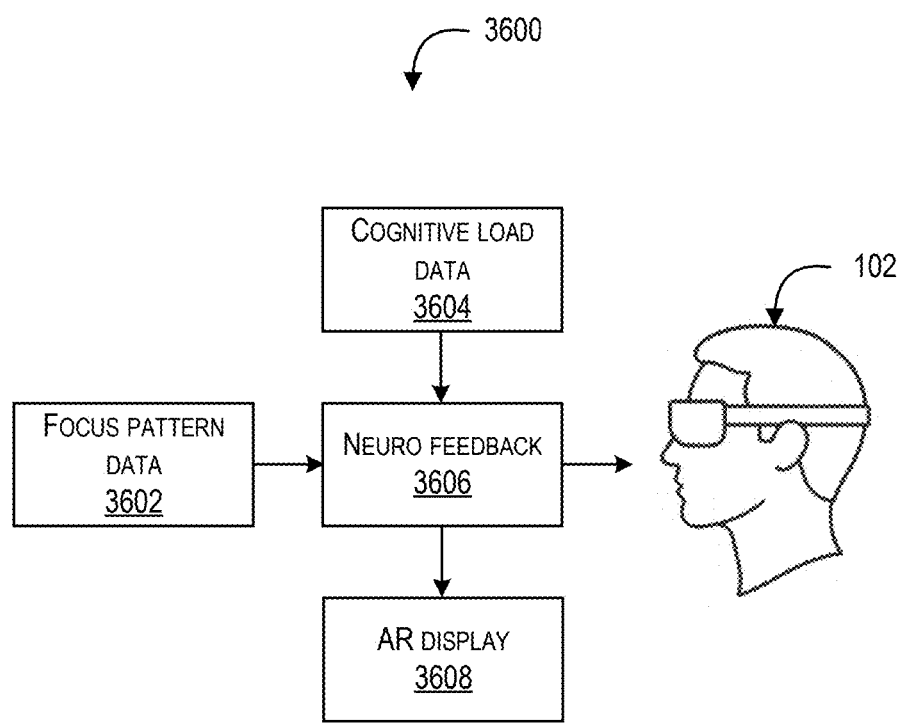
FIG. 36 illustrates an augmented reality (AR) overlay adapted using neurofeedback and focus pattern data to manage cognitive load, in accordance with an embodiment of the present disclosure.

FIG. 36 illustrates a cognitive-adaptive augmented reality (AR) system 3600 configured to adjust the AR display in real time based on neurofeedback and focus pattern data to manage user cognitive load, in accordance with an embodiment of the present disclosure. The AR system 3600 may be implemented as part of the user interface module 2418 and the neurofeedback sub-module of the present disclosure. The system 3600 may be particularly useful in high-stress, GPS-denied environments where continuous situational awareness is necessary but user overload must be avoided.

As depicted, the AR system 3600 may receive focus pattern data 3602, which may correspond to eye-tracking vectors, pupil dilation measurements, blink rates, and gaze fixation durations. These data points may be captured through embedded sensors in a head-mounted display worn by the user 102, such as smart glasses or a wearable visor. The focus pattern data 3602 may be used to infer which elements in the augmented field of view are receiving visual attention and which are being ignored, thereby serving as indicators of perceptual load and task engagement.

In parallel, the AR system 3600 may receive cognitive load data 3604, which may include electroencephalographic (EEG) readings, heart rate variability (HRV), skin conductance levels, or other biometric signals that correlate with mental effort, fatigue, or stress. These physiological inputs may be processed by wearable neuro-sensing hardware and interpreted in the context of environmental complexity, time-on-task, or recent decision-making activity.

The focus pattern data 3602 and cognitive load data 3604 may be jointly processed by a neurofeedback engine 3606. The neurofeedback engine 3606 may be configured to evaluate user mental state and engagement level in real time and determine how best to adjust the AR interface. In an embodiment, the engine 3606 may apply machine-learned heuristics, threshold-based logic, or probabilistic modeling to quantify user cognitive state and translate it into actionable display modifications. For example, if cognitive load is determined to be high while gaze is scattered across multiple elements, the system may suppress less relevant information or simplify navigation cues.

Based on the outputs of the neurofeedback engine 3606, the AR display 3608 may be adapted dynamically. The AR display 3608 may include visual overlays such as directional arrows, anchor point representations, environmental annotations, and status notifications. These elements may be modulated in density, brightness, opacity, animation speed, or screen position to match the user's current mental state and focus behavior. For example, in a low-load state, the system may increase the level of detail or introduce proactive suggestions, while in a high-load state, it may reduce visual clutter and emphasize only mission-critical anchors or warnings.

The system 3600 may support closed-loop feedback by continuously updating its cognitive model based on user responses, changes in gaze pattern, or biometric shifts. In another embodiment, the system may also communicate estimated cognitive state to other agents in a multi-agent network via the multi-agent collaboration module 2512, enabling distributed adjustment of task loads or anchor prioritization. Further, the adjustments made by the AR display 3608 may be logged in the data storage unit 2408 to refine future neuro-adaptive strategies.

Figure 37:
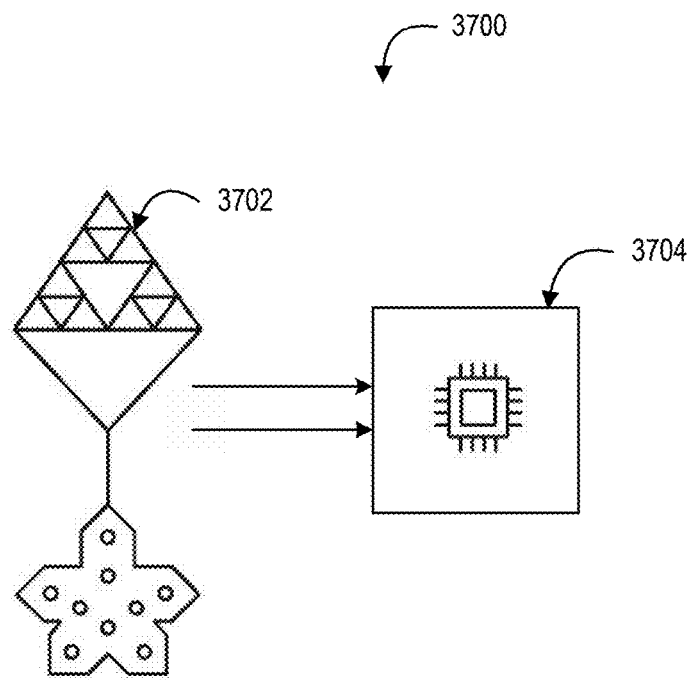
FIG. 37 illustrates a dual-mode World Magnetic Model (WMM) and gravity anomaly correction layer within the core positioning engine, in accordance with an embodiment of the present disclosure.

FIG. 37 illustrates a dual-mode correction architecture 3700 comprising a World Magnetic Model (WMM) component and a gravity anomaly correction layer integrated within the core positioning engine of the system, in accordance with an embodiment of the present disclosure. The architecture 3700 may be implemented as part of the predictive modeling module 2414 and the quantum-inspired fusion module 2410 within the system 2400. This dual-mode correction mechanism may be particularly valuable in environments characterized by magnetic drift, altitude inconsistencies, or underground navigation scenarios, where reliance on either a single geophysical model would result in degraded positioning accuracy.

As shown in FIG. 37, the architecture includes a symbolic representation 3702 of dual-model geophysical data sources. The upper structure in the symbol 3702 may represent a tessellated magnetic field model corresponding to the World Magnetic Model (WMM), which subdivides the Earth's magnetic field into regional zones based on spherical harmonics or localized grid mapping. This model may be used to provide magnetic declination, inclination, and field strength data that the predictive modeling module 2414 uses to estimate expected magnetic signatures at a given location and altitude.

The lower portion of the symbol 3702 may represent a gravity anomaly model that accounts for deviations in the Earth's gravitational field due to subsurface density variations, topographical formations, or geoid height irregularities. This model may be expressed using regional gravity maps, gravity vector fields, or geophysical survey datasets, and may be referenced by the system for altitude correction and position triangulation, particularly when barometric sensors are present. The incorporation of these gravity-based offsets may allow dynamic recalibration of vertical positioning data, especially when operating in subterranean, tunnel, or multi-level building environments.

The data from the dual-mode correction source 3702 may be processed by a core positioning engine 3704, which may correspond to a portion of the processing logic implemented within the microcontroller 3508 or a dedicated submodule of the quantum-inspired fusion module 2410. The core positioning engine 3704 may be configured to ingest both WMM-based magnetic reference data and gravity anomaly corrections and use them to augment the probability amplitude computations performed on candidate position hypotheses, as illustrated in FIGS. 26-27 and FIG. 33.

In one embodiment, the engine 3704 may use the WMM data to compare current magnetometer readings against predicted values and assign confidence scores to matching hypotheses. Simultaneously, it may use gravity correction layers to adjust barometric sensor offsets or altitude-related variables within the fusion model. When both layers agree on a correction, the associated node's amplitude may be reinforced; if they conflict, the predictive modeling module 2414 may trigger uncertainty expansion or fallback to inertial references.

The dual-mode correction architecture 3700 may be updated dynamically based on user movement, regional boundaries, or anomaly alerts derived from environment forecasting module 2510. Further, corrections may be applied in real time on resource-constrained devices through compressed lookup tables, parameterized functions, or integration with the neuromorphic signal pipeline described in FIG. 35.

Figure 38:
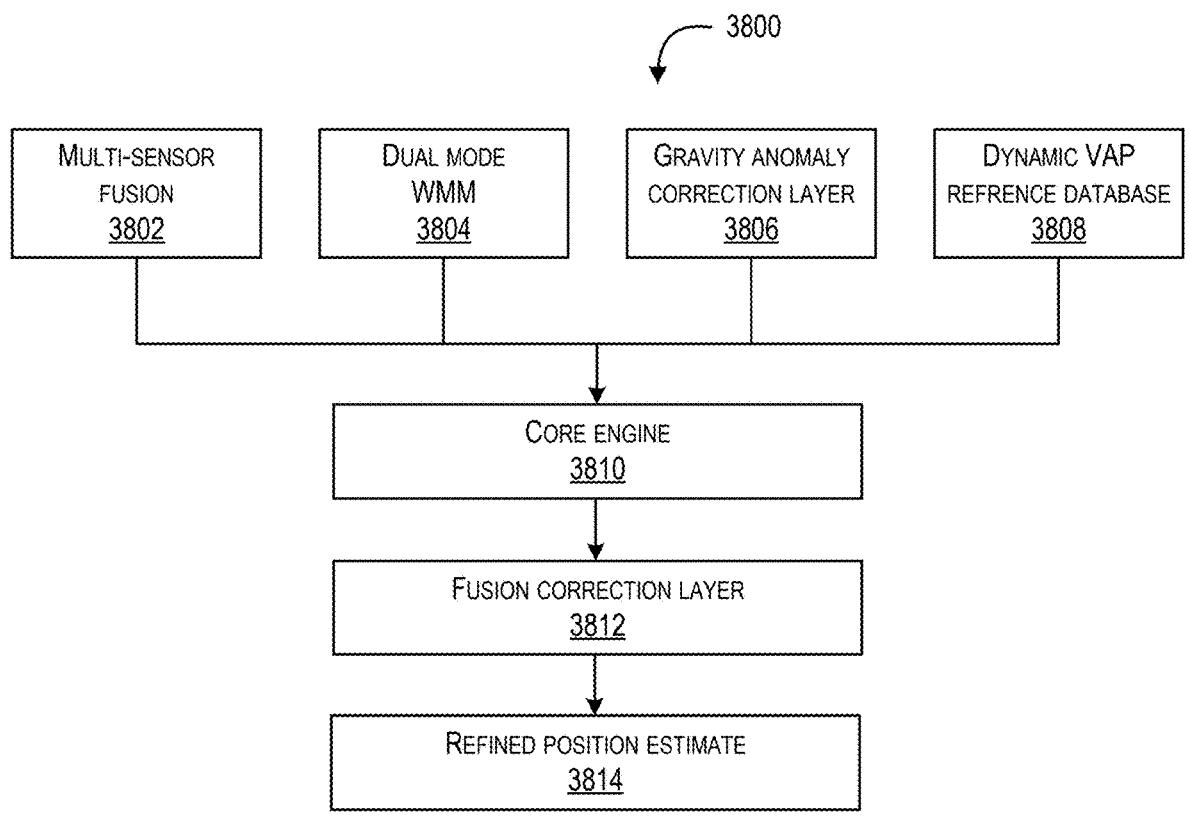
FIG. 38 illustrates a multi-stage fusion pipeline producing a refined position estimate through dynamic anchor reference selection and environmental correction, in accordance with an embodiment of the present disclosure.

FIG. 38 illustrates a multi-stage fusion pipeline 3800 configured to produce a refined position estimate through dynamic anchor reference selection and environmental correction, in accordance with an embodiment of the present disclosure. The multi-stage fusion pipeline 3800 may operate within the predictive modeling module 2414 and the quantum-inspired fusion module 2410 of the system 2400 and may utilize environmental correction and VAP triangulation logic.

The fusion pipeline 3800 may ingest multiple upstream inputs, beginning with a multi-sensor fusion module 3802. The multi-sensor fusion module 3802 may be configured to aggregate sensor data from various sources including, but not limited to, magnetometers, inertial measurement units (IMUs), barometers, LiDAR, radar, and visual odometry systems. The fused data may be represented in a unified state space for probabilistic inference, with intermediate outputs potentially feeding into the particle-based reweighting processes described in FIG. 28.

Alongside sensor fusion, the pipeline may also utilize data from a dual-mode World Magnetic Model (WMM) 3804. The dual-mode WMM 3804 may refer to a dynamically adjustable magnetic reference model with both coarse and fine-grained spatial resolution capabilities. This dual-mode configuration allows the system to switch between global and localized magnetic declination predictions based on environmental complexity or proximity to known magnetic anomalies. This model may correspond to the upper geometry shown in FIG. 37 and may interface directly with the predictive modeling module 2414.

Additionally, a gravity anomaly correction layer 3806 may feed into the pipeline, providing corrections to altitude estimation and sensor bias adjustments using local gravity models. These corrections may be generated using data sources such as geoid height maps, satellite gravity data, or survey-based field measurements. The gravity anomaly correction layer 3806 may adjust barometric sensor readings and inertial drift models to improve vertical accuracy, particularly when operating in multilevel structures or subterranean domains.

The pipeline may also interface with a dynamic VAP reference database 3808. This database may store virtual anchor point (VAP) metadata including persistent topological features, historical anchor accuracy metrics, and recent updates derived from reinforcement learning feedback loops (as described in FIG. 30). The reference database 3808 may be dynamically updated based on operator input, environmental change detection, or collaborative agent contributions from modules such as the multi-agent collaboration module 2512.

These upstream data sources may be processed by a core engine 3810. The core engine 3810 may include algorithms for probabilistic amplitude assignment, hypothesis graph navigation, Kalman filtering, and trajectory pruning. In an embodiment, the core engine 3810 may apply weighting adjustments based on signal fidelity, timestamp synchronization, and environmental threat level (as may be provided by the environment forecasting engine 3208 of FIG. 32). The core engine 3810 may produce a preliminary position estimate with associated uncertainty bounds.

This output may then pass through a fusion correction layer 3812, which may apply corrections based on inter-module conflict resolution, anchor consistency validation, or neuromorphic post-processing (as described in FIG. 35). The fusion correction layer 3812 may be configured to remove outlier hypotheses, integrate backward trajectory correction, or perform smoothing across time intervals to produce a stable and confidence-ranked estimate.

The final output of the pipeline 3800 may be a refined position estimate 3814. This refined estimate may reflect a high-confidence navigation result suitable for visualization through the AR display of the user interface module 2418 or for use in automated decision-making, route guidance, or multi-agent coordination. The estimate may include both 2D and 3D coordinates, timestamp metadata, and accuracy metrics expressed as confidence ellipses or positional entropy values.

Figure 39:
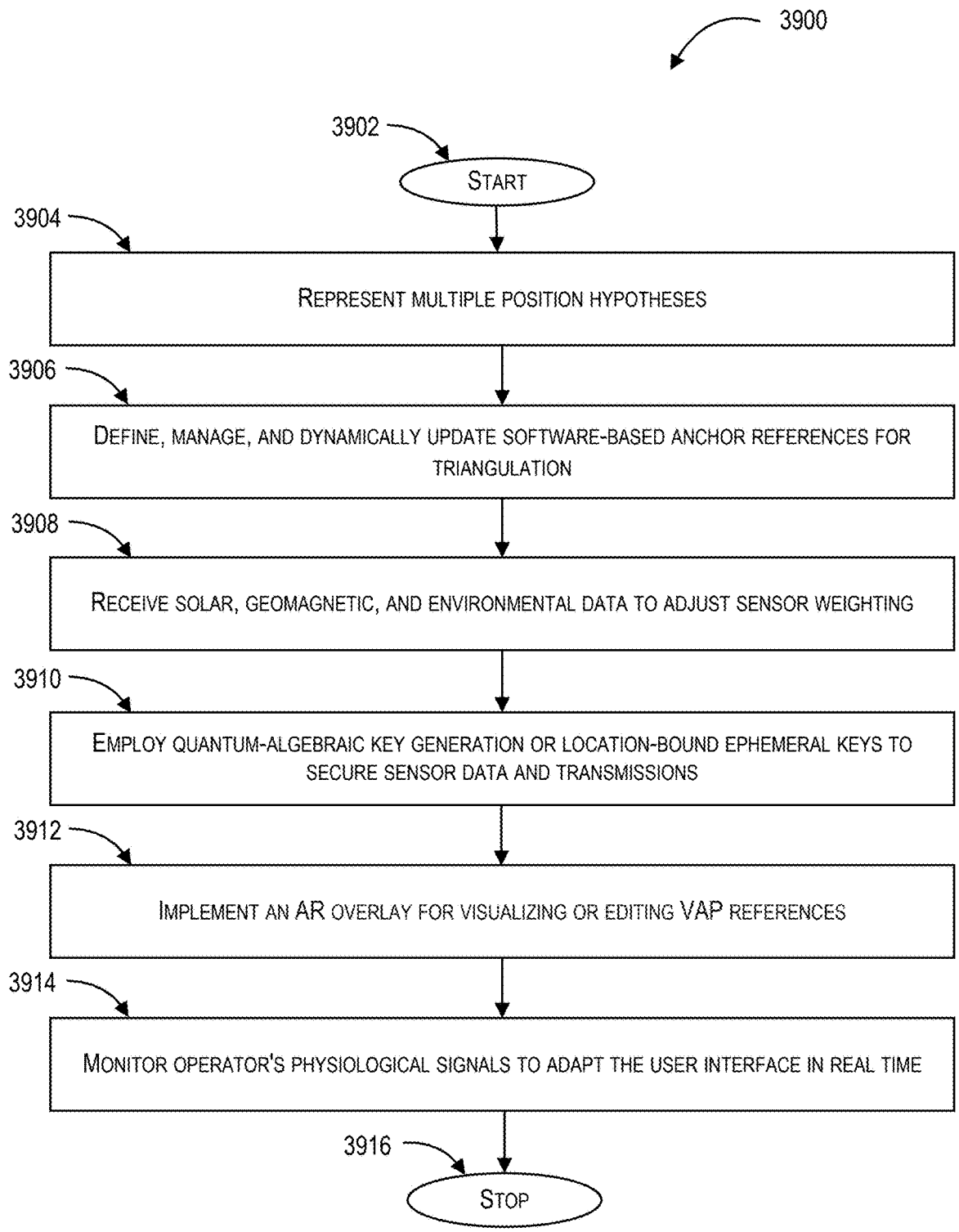
FIG. 39 illustrates a flowchart of a method for GPS-denied navigation including virtual anchor point editing, quantum-algebraic security, predictive adjustment, and cognitive adaptive interface, in accordance with an embodiment of the present disclosure.

FIG. 39 illustrates a flowchart 3900 of a method for GPS-denied navigation, the method incorporating quantum-inspired positioning, predictive sensor adjustment, secure inter-agent communication, and cognitive-adaptive augmented reality interfaces, in accordance with an embodiment of the present disclosure. The method 3900 may correspond to the operations enabled by the system 2400. The flowchart 3900 may be executed by a processing system embedded within a wearable, mobile, or edge device. The method begins at step 3902

At step 3904, the system may represent and maintain multiple position hypotheses. This representation may be implemented using wavefunction-like expansions and amplitude-based filtering within the quantum-inspired fusion module. In an embodiment, the system may assign evolving probability amplitudes to multiple hypothetical position states based on temporal coherence and spatial signal convergence.

At step 3906, the method may define, manage, and dynamically update software-based anchor references for triangulation. These anchor references, or Virtual Anchor Points (VAPs), may be implemented using the virtual anchor point module. The VAPs may be updated using multi-resolution field fingerprints and feature-based environmental maps. In one embodiment, the anchor updates may also incorporate bio-inspired heuristics or reinforcement learning loops (such as those illustrated in FIG. 30) to reposition anchors in response to environmental changes or operator actions.

At step 3908, the system may receive solar, geomagnetic, and environmental data, and proactively adjust sensor weighting or fallback modes based on forecasted disturbances. These operations may be performed by the predictive modeling module, in conjunction with the environmental forecasting engine 3208 described in FIG. 32. The predictive modeling module may alter the sensor fusion weighting strategy based on detected or predicted geomagnetic storms, solar flares, or ionospheric variations to ensure continuous positioning accuracy.

At step 3910, the method may employ quantum-algebraic key generation and location-derived ephemeral keys to secure sensor data and inter-device transmissions. These cryptographic protections may be executed by the cybersecurity module, and may involve dynamic ephemeral key derivation based on local magnetic anomalies, time-based entropy, or agent-specific parameters. A representative framework for such encryption is depicted in FIG. 31. In one embodiment, the ephemeral keys may be rotated periodically based on amplitude mismatch thresholds, and may also be used to secure multi-agent communications when operating in edge-computing scenarios.

At step 3912, the system may implement an AR overlay for visualizing or editing virtual anchor point (VAP) references. The AR overlay may be rendered through the user interface module and updated in real-time using anchor metadata, environmental layers, and predicted paths. This step may correspond to the neuroadaptive interface flow illustrated in FIG. 36, where the overlay content is personalized based on current mission priorities or operator context.

At step 3914, the system may monitor one or more physiological signals of an operator to adapt the user interface in real time. These signals may include EEG data, eye tracking, and heart rate variability. The neurofeedback sub-module of the user interface module may analyze the cognitive load derived from such data to dynamically modulate AR complexity, density, or opacity, thereby avoiding cognitive overload and improving situational awareness. Finally, at step 3916, the method may terminate.

In various embodiments, the above steps may be supplemented by sub-processes such as secure amplitude data sharing among collaborative agents, gravity anomaly-based altitude correction, and dual-mode WMM integration for magnetically complex navigation, all of which contribute to a refined, adaptive, and secure navigation experience in GPS-denied environments.

Figure 40:
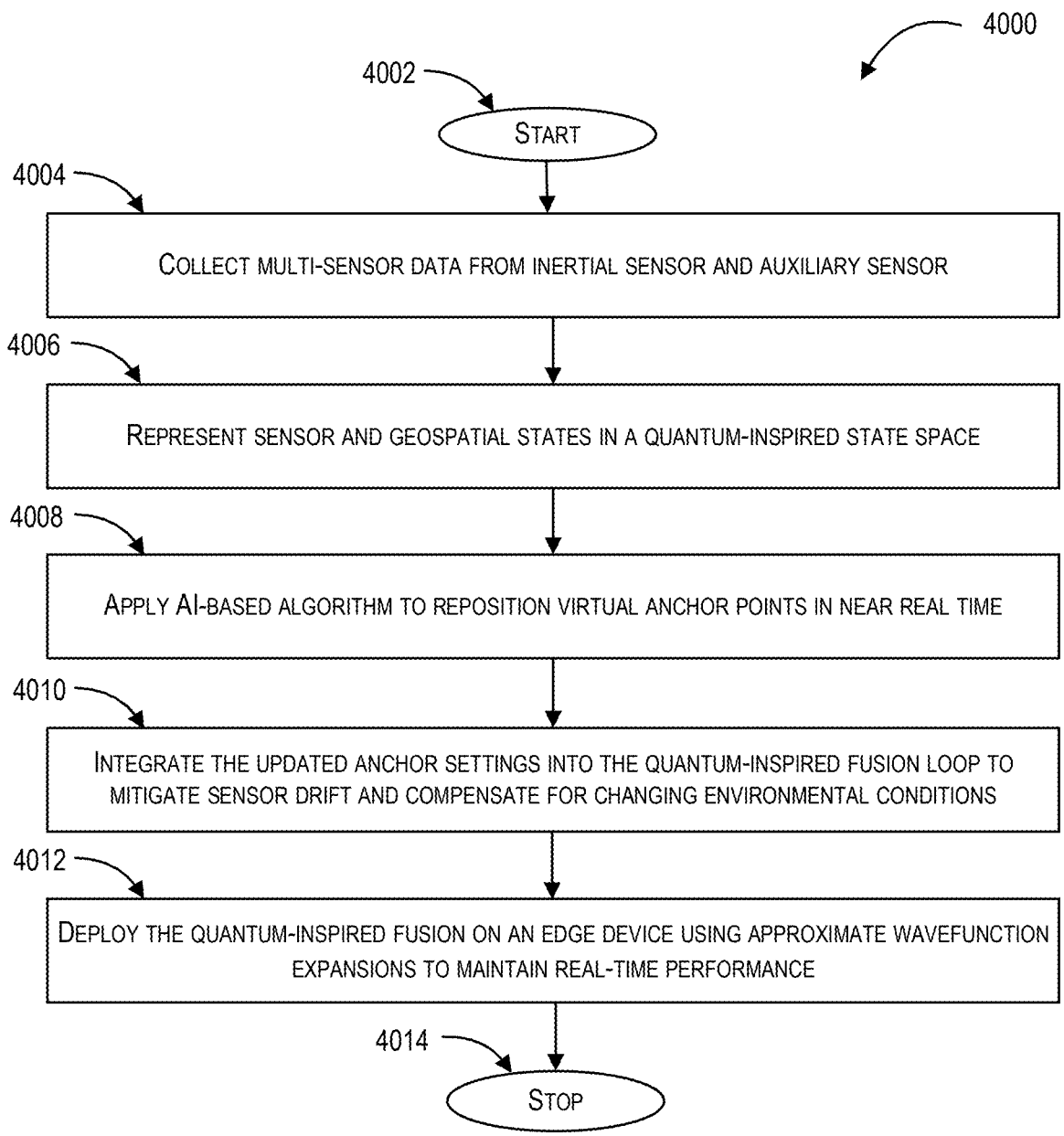
FIG. 40 illustrates a flowchart of a method for optimizing virtual anchor points using multi-sensor input, AI-based repositioning, and wavefunction-based edge fusion, in accordance with an embodiment of the present disclosure.

FIG. 40 illustrates a flowchart 4000 depicting a method of optimizing anchor references in a GPS-denied navigation system using quantum-inspired sensor fusion, reinforcement learning, and edge-based wavefunction approximations, in accordance with an embodiment of the present disclosure. The method 4000 may correspond to the operations performed by various modules of the system 2400, particularly the quantum-inspired fusion module and the virtual anchor point module, in conjunction with auxiliary modules such as the predictive modeling module and user interface module. The method begins at step 4002

At step 4004, the method may include collecting multi-sensor data from at least one inertial sensor and one auxiliary sensor. The auxiliary sensors may be selected from a group consisting of: magnetometers, LiDAR units, cameras, radar sensors, barometers, and fractal antenna signal receivers. This multi-sensor input may be acquired in real time and may be streamed into the sensor data store of the data storage unit. The raw data may serve as input for downstream processing, including adaptive reweighting (as described in FIG. 28) and signal-space transformation.

At step 4006, the method may include representing sensor and geospatial states in a quantum-inspired state space. This may involve encoding position hypothesis as vector states within a Hilbert space and computing amplitude updates based on sensor error metrics, uncertainty propagation, or spatial decorrelation functions. This abstraction allows the quantum-inspired fusion module to perform probabilistic inference over trajectory paths rather than discrete observations, in line with the path-integral framework disclosed in relation to FIG. 26 and FIG. 27.

At step 4008, the method may apply a bio-inspired or artificial intelligence algorithm to reposition or reweight virtual anchor points in near real time. The algorithm may be selected from a group comprising reinforcement learning, genetic evolution, and swarm intelligence models. In an embodiment, the anchor reconfiguration may be governed by policy updates triggered through reward feedback loops (as illustrated in FIG. 30), optimizing placement based on environmental complexity, signal-to-noise ratios, and user behavior. The repositioning logic may reside within the virtual anchor point module.

At step 4010, the updated anchor references may be integrated into the quantum-inspired sensor fusion loop to mitigate sensor drift and compensate for environmental fluctuations. This integration may involve adjusting the amplitude reweighting curves, correcting historical trajectory bias, or enabling environment-adaptive fallback modes. In one embodiment, this integration may incorporate additional data streams from the predictive modeling module (see FIG. 32) and gravity anomaly correction logic (as described in FIG. 38).

At step 4012, the method may deploy the quantum-inspired fusion on an edge device. The edge deployment may be optimized through approximate wavefunction expansions or selective amplitude discarding to maintain real-time responsiveness while respecting memory and power constraints. This functionality may enable wearable, mobile, or IoT-constrained applications to utilize the full sensor fusion architecture of the system with reduced computational overhead, as further depicted in the neuromorphic pipeline of FIG. 35. At step 4014, the method may terminate.

In various embodiments, this method may be extended to include auxiliary operations. For example, the system may utilize a compact fractal antenna comprising hybrid Sierpiński-Koch geometries and may dynamically tune impedance via a cognitive AI algorithm monitoring reflection coefficient or VSWR (see FIG. 37). Furthermore, predictive modeling of geomagnetic disturbances may use solar flare and Kp-index data to adapt sensor reliance in real time. Finally, the user interface may be adapted based on physiological data, such as EEG or eye-tracking inputs, to modulate AR overlays (see FIG. 36) and reduce cognitive overload.

Figure 41:
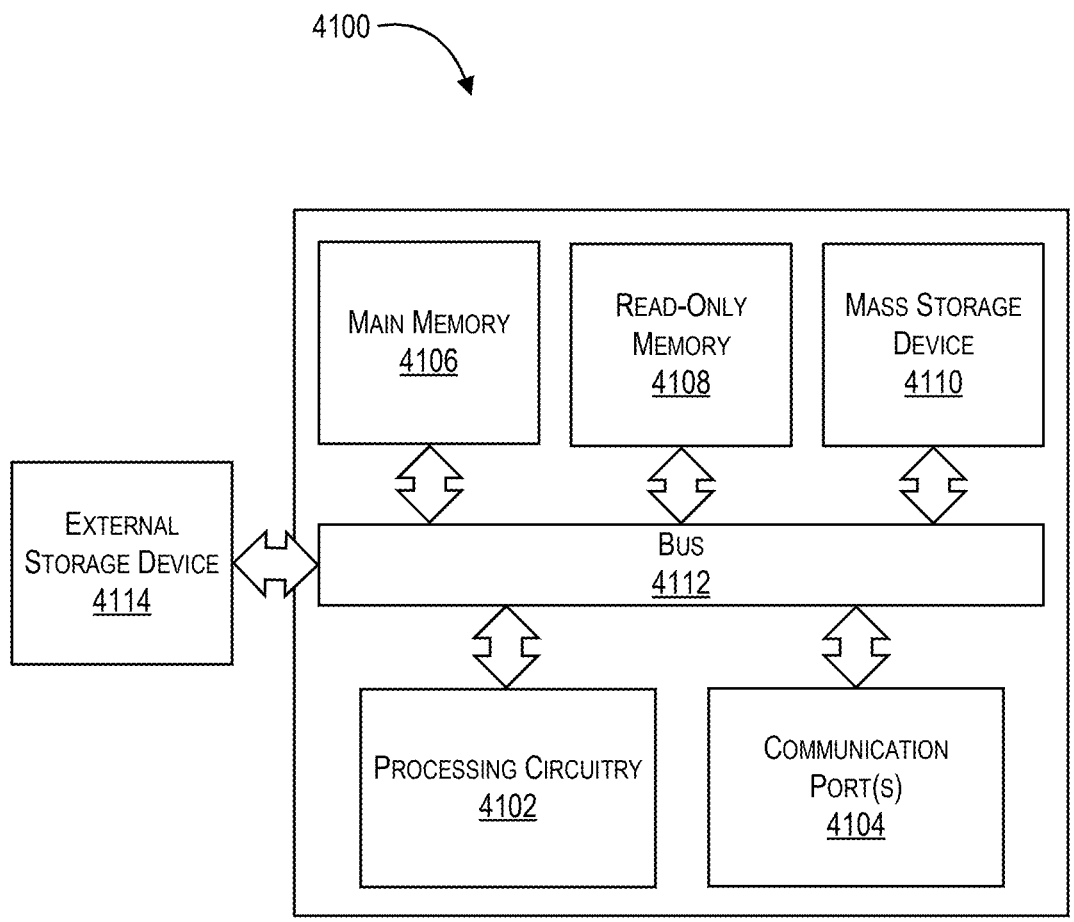
FIG. 41 illustrates an exemplary computer unit in which or with which embodiments of the present disclosure may be utilized.

FIG. 41 illustrates an exemplary computer system in which or with which embodiments of the present disclosure may be utilized. Depending upon the implementation, the various process and decision blocks described above may be performed by hardware components, embodied in machine-executable instructions, which may be used to cause a general-purpose or special-purpose processor programmed with the instructions to perform the steps, or the steps may be performed by a combination of hardware, software and/or firmware. As shown in FIG. 41, the computer system 4100 includes an external storage device 4114, a bus 4112, a main memory 4106, a read-only memory 4108, a mass storage device 4110, a communication port(s) 4104, and a processing circuitry 4102.

Those skilled in the art will appreciate that the computer system 4100 may include more than one processing circuitry 4102 and one or more communication ports 4104. The processing circuitry 4102 should be understood to mean circuitry based on one or more microprocessors, microcontrollers, digital signal processors, programmable logic devices, Field-Programmable Gate Arrays (FPGAs), Application-Specific Integrated Circuits (ASICs), etc., and may include a multi-core processor (e.g., dual-core, quad-core, Hexa-core, or any suitable number of cores) or supercomputer. In some embodiments, the processing circuitry 4102 is distributed across multiple separate processors or processing units, for example, multiple of the same type of processing units (e.g., two Intel Core i7 processors) or multiple different processors (e.g., an Intel Core i5 processor and an Intel Core i7 processor). Examples of the processing circuitry 4102 include, but are not limited to, an Intel® Itanium® or Itanium 2 processor(s), AMD® Opteron® or Athlon MP® processor(s), Motorola® lines of processors, System on Chip (SoC) processors, or other future processors. The processing circuitry 4102 may include various modules associated with embodiments of the present disclosure.

The communication port 4104 may include a cable modem, Integrated Services Digital Network (ISDN) modem, a Digital Subscriber Line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 4104 may be any RS-232 port for use with a modem-based dialup connection, a 10/100 Ethernet port, a Gigabit, or a 10 Gigabit port using copper or fiber, a serial port, a parallel port, or other existing or future ports. The communication port 4104 may be chosen depending on a network, such as a Local Area Network (LAN), Wide Area Network (WAN), or any network to which the computer system 4100 may be connected.

The main memory 4106 may include Random Access Memory (RAM) or any other dynamic storage device commonly known in the art. Read-only memory (ROM) 4108 may be any static storage device(s), e.g., but not limited to, a Programmable Read-Only Memory (PROM) chips for storing static information, e.g., start-up or BIOS instructions for the processing circuitry 4102.

The mass storage device 4110 may be an electronic storage device. As referred to herein, the phrase "electronic storage device" or "storage device" should be understood to mean any device for storing electronic data, computer software, or firmware, such as random-access memory, read-only memory, hard drives, optical drives, Digital Video Disc (DVD) recorders, Compact Disc (CD) recorders, BLU-RAY disc (BD) recorders, BLU-RAY 3D disc recorders, Digital Video Recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement the main memory 4106. The mass storage device 4110 may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 4112 communicatively couples the processing circuitry 4102 with the other memory, storage, and communication blocks. The bus 4112 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 4102 to the software system.

Optionally, operator and administrative interfaces, e.g., a display, keyboard, and a cursor control device, may also be coupled to the bus 4112 to support direct operator interaction with the computer system 4100. Other operator and administrative interfaces may be provided through network connections connected through the communication port(s) 4104. The external storage device 4114 may be any kind of external hard drives, floppy drives, IOMEGA® Zip Drive, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

The computer system 4100 may be accessed through a user interface. The user interface application may be implemented using any suitable architecture. For example, it may be a stand-alone application wholly implemented on the computer system 4100. The user interfaces application and/or any instructions for performing any of the embodiments discussed herein may be encoded on computer-readable media. Computer-readable media includes any media capable of storing data. In some embodiments, the user interface application is client-server-based. Data for use by a thick or thin client implemented on an electronic device computer system 4100 is retrieved on-demand by issuing requests to a server remote to the computer system 4100. For example, computer system 4100 may receive inputs from the user via an input interface and transmit those inputs to the remote server for processing and generating the corresponding outputs. The generated output is then transmitted to the computer system 4100 for presentation to the user.

While embodiments of the present disclosure have been illustrated and described, it will be clear that the disclosure is not limited to these embodiments only. Numerous modifications, changes, variations, substitutions, and equivalents will be apparent to those skilled in the art without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, the terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, utilized, or combined with other elements, components, or steps that are not expressly referenced. Where the specification claims refer to at least one of something selected from the group consisting of A, B, C . . . And N, the text should be interpreted as requiring only one element from the group, not A plus N, or B plus N, etc.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions, or examples, which are included to enable a person having ordinary skill in the art to make and use the disclosure when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest scope consistent with the principles and novel features disclosed herein. It is contemplated that additional embodiments are within the spirit and true scope of the disclosed subject matter.

What is claimed is:

1. A navigation system for operation in GPS-denied environments, the navigation system comprising:
    one or more sensors configured to generate sensor data;
    a quantum-inspired fusion module configured to represent and maintain multiple position hypothesis using wave-function-like expansions and amplitude-based filtering;
    a virtual anchor point (VAP) module configured to define, manage, and dynamically update software-based anchor references for position triangulation and drift correction;
    a predictive modeling module configured to receive solar, geomagnetic, and environmental data and proactively adjust sensor weighting and fallback modes based on forecasted disturbances;
    a cybersecurity module configured to employ quantum-algebraic key generation and location-derived ephemeral keys to secure sensor data and inter-device transmissions; and
    a user interface module, comprising at least one of:
        an augmented reality (AR) configured to overlay to visualize and allow editing of virtual anchor points in real time; and
        a neurofeedback sub-module configured to monitor one or more physiological signals of an operator and dynamically adapt the AR overlay based on estimated cognitive load;
    wherein the quantum-inspired fusion module is operatively integrated with the VAP module to enhance positional accuracy in the absence of GPS, and
    wherein the cybersecurity module secures sensor fusion operations using location-bound cryptographic mechanisms.

2. The navigation system of claim 1, further comprising a fractal antenna sub-module configured to support secure inter-agent communication during operation in an adaptive edge-computing mode;
    wherein a multi-agent consensus mechanism is employed such that each agent shares partial amplitude data and high-likelihood position hypothesis with one or more neighboring agents, thereby enabling a network-wide consensus to converge on a common position estimate in the absence of GPS and large-scale wireless infrastructure; and
    wherein the cybersecurity module is further configured to encrypt shared amplitude data using location-derived cryptographic keys.

3. The navigation system of claim 1,
    wherein the cybersecurity module is further configured to implement quantum-inspired cryptographic handshake protocols tied to location states; and
    wherein ephemeral keys are established between at least two agents and are periodically rotated based on amplitude mismatch thresholds derived from the quantum-inspired fusion module, thereby preventing unauthorized spoofing in a multi-agent positioning network.

4. The navigation system of claim 1,
    wherein gravity anomaly data is utilized to enhance altitude correction by referencing local geoid models or gravity anomaly maps; and
    wherein barometric sensor offsets are dynamically updated based on referenced gravity data to maintain three-dimensional positioning accuracy in GPS-denied environments.

5. The navigation system of claim 1,
    wherein the predictive modeling module is integrated with an advanced location intelligence engine; and
    wherein solar and geomagnetic forecasting data are fused with dynamic VAP triangulation and dual-mode World Magnetic Model (WMM) corrections, thereby enabling improved drift correction in subterranean, multi-floor, or corridor-based navigation environments.

6. The navigation system of claim 1,
    wherein the quantum-inspired fusion module is configured to perform trajectory-level denoising and map-matching using a path-integral approach,
    wherein a plurality of motion trajectories are evaluated in parallel, and probability amplitudes are assigned based on constructive and destructive interference among the trajectories, thereby enhancing noise immunity and position accuracy compared to discrete-point estimation.

7. The navigation system of claim 1, wherein the predictive modeling module maintains a hierarchy of magnetic-anomaly reference maps at multiple spatial resolutions, and is configured to select an optimal resolution level based on environmental complexity to improve convergence time and localization accuracy in magnetically dynamic environments.

8. The navigation system of claim 1, wherein the virtual anchor point (VAP) module is further configured to extract persistent topological features from field data using multi-resolution homology techniques, and to generate topological barcodes that support robust anchor matching in environments with changing or ambiguous magnetic signatures.

9. The navigation system of claim 1,
wherein the virtual anchor point (VAP) module is further configured to project high-dimensional magnetic field data into a manifold space using a learned non-linear embedding,
wherein position estimation is performed by comparing topological structures in the embedded manifold to stored anchor point representations.

10. The navigation system of claim 1, wherein the quantum-inspired fusion module is implemented, at least in part, using a neuromorphic processing unit comprising spiking neural networks, configured to encode magnetic and inertial sensor data as temporally coded spike trains and to produce position probability distributions through neuronal activation patterns, thereby enabling low-power operation suitable for edge-based or wearable deployments.

11. The navigation system of claim 1,
wherein the user interface module is further configured to adjust the augmented reality overlay based on an estimated cognitive load of the operator,
wherein the cognitive load is derived from one or more physiological signals including eye-tracking, electroencephalography (EEG), or heart rate variability, and
wherein the system adapts the visual density, transparency, or complexity of the virtual anchor point overlays in real time to minimize cognitive overload.

12. A navigation method for operation in GPS-denied environments, the navigation method comprising:
representing and maintaining multiple position hypothesis using wavefunction-like expansions and amplitude-based filtering;
defining, managing, and dynamically updating software-based anchor references for position triangulation and drift correction;
receiving solar, geomagnetic, and environmental data, and proactively adjusting sensor weighting and fallback modes based on forecasted disturbances;
employing quantum-algebraic key generation and location-derived ephemeral keys to secure sensor data and inter-device transmissions;
implementing an AR overlay for visualizing and editing virtual anchor point (VAP) reference; and
monitoring one or more physiological signals of an operator and dynamically adapting the AR overlay based on estimated cognitive load;
wherein the act of representing multiple position hypothesis is performed in conjunction with the updated virtual anchor points to improve positional accuracy in the absence of GPS; and
wherein the cryptographic securing of sensor data is based on location-derived ephemeral key generation.

13. The navigation method of claim 12, further comprising:
supporting secure inter-agent communication during operation in an adaptive edge-computing mode, wherein a multi-agent consensus mechanism is employed such that each agent shares partial amplitude data and high-likelihood position hypothesis with one or more neighboring agents, thereby enabling a network-wide consensus to converge on a common position estimate in the absence of GPS and large-scale wireless infrastructure; and
encrypting shared amplitude data using location-derived cryptographic keys.

14. The navigation method of claim 12, further comprising implementing quantum-inspired cryptographic handshake protocols tied to location states, wherein ephemeral keys are established between at least two agents and are periodically rotated based on amplitude mismatch thresholds, thereby preventing unauthorized spoofing in a multi-agent positioning network.

15. The navigation method of claim 12,
wherein gravity anomaly data is utilized to enhance altitude correction by referencing local geoid models or gravity anomaly maps; and
wherein barometric sensor offsets are dynamically updated based on the referenced gravity data to maintain three-dimensional positioning accuracy in GPS-denied environments.

16. The navigation method of claim 12, further comprising integrating with an advanced location intelligence engine, wherein solar and geomagnetic forecasting data are fused with dynamic VAP triangulation and dual-mode World Magnetic Model (WMM) corrections, thereby enabling improved drift correction in subterranean, multi-floor, or corridor-based navigation environments.

17. A method of optimizing anchor references in a GPS-denied navigation system, the method comprising:
collecting multi-sensor data from at least one inertial sensor and one auxiliary sensor selected from the group consisting of: magnetometer, LiDAR, camera, radar, barometer, and fractal antenna signals;
representing sensor and geospatial states in a quantum-inspired state space, wherein amplitude updates are computed based on sensor error metrics;
applying a bio-inspired or artificial intelligence algorithm selected from the group consisting of reinforcement learning, genetic evolution, and swarm intelligence to reposition or reweight virtual anchor points in near real time;
integrating the updated anchor references into a quantum-inspired sensor fusion process to reduce sensor drift and improve positional accuracy under changing environmental conditions; and
optionally deploying at least part of the quantum-inspired sensor fusion process on an edge device with constrained computational resources, using approximate wavefunction expansions or selective amplitude discarding to maintain real-time responsiveness;
wherein the repositioning or reweighting of anchor references is refined through a combination of bio-inspired heuristics and reinforcement learning models, and
wherein the quantum-inspired fusion process conforms to a Hilbert-space-based representation of sensor and location states.

18. The method of claim 17, further comprising:
utilizing a compact fractal antenna comprising a hybrid of Sierpiński and Koch geometries to achieve multi-band electromagnetic resonance; and
dynamically adapting the impedance of the antenna using a cognitive artificial intelligence algorithm configured to monitor one or more of: reflection coefficients and voltage standing wave ratios (VSWR);
wherein the antenna is configured to facilitate robust communication and sensor signal acquisition in GPS-denied environments, and
wherein ephemeral cryptographic key distribution is performed over the multi-band antenna channels to enable secure data transmission in a multi-agent navigation network.

19. The method of claim 17, further comprising:
applying predictive modeling based on real-time solar activity and geomagnetic disturbance forecasts; and
dynamically adjusting the reliance on magnetometer-based data by triggering fallback to inertial sensor data or virtual anchor point-based references upon detection of solar flare intensity or solar-wind velocity thresholds exceeding a predefined limit, thereby maintaining navigation accuracy in the presence of forecasted geomagnetic anomalies.

20. The method of claim 17, further comprising:
monitoring physiological signals of an operator, the signals comprising at least one of: electroencephalographic (EEG) activity, eye-tracking data, and heart-rate variability;
estimating a current cognitive load level of the operator based on the physiological signals; and
dynamically modifying an augmented reality (AR) overlay by reducing or enhancing the visualization of virtual anchor points in real time in accordance with the estimated cognitive load, thereby preventing cognitive overload and improving usability in high-stress or complex operational environments.

\* \* \* \* \*